(12) United States Patent
Jung

(10) Patent No.: US 10,740,798 B2
(45) Date of Patent: Aug. 11, 2020

(54) MOBILE TERMINAL AND OPERATING METHOD THEREFOR

(71) Applicant: LG ELECTRONICS INC., Seoul (KR)

(72) Inventor: Sunhye Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 15/555,452

(22) PCT Filed: Mar. 27, 2015

(86) PCT No.: PCT/KR2015/003076
§ 371 (c)(1),
(2) Date: Sep. 1, 2017

(87) PCT Pub. No.: WO2016/140393
PCT Pub. Date: Sep. 9, 2016

(65) Prior Publication Data
US 2018/0033050 A1    Feb. 1, 2018

(30) Foreign Application Priority Data
Mar. 4, 2015    (KR) .......................... 10-2015-0030572

(51) Int. Cl.
*G06Q 30/02* (2012.01)
(52) U.S. Cl.
CPC ............................... *G06Q 30/0267* (2013.01)
(58) Field of Classification Search
None
See application file for complete search history.

(56) References Cited

U.S. PATENT DOCUMENTS

| 7,624,166 | B2 * | 11/2009 | Foote | ................... | H04B 10/116 |
| | | | | | 463/47 |
| 8,970,492 | B2 * | 3/2015 | Butner | .................. | G06F 3/0488 |
| | | | | | 345/157 |

(Continued)

FOREIGN PATENT DOCUMENTS

| KR | 10-1106057 B1 | 1/2012 |
| KR | 10-2013-0064953 A | 6/2013 |

(Continued)

OTHER PUBLICATIONS

PCT International Application No. PCT/KR2015/003076 International Search Report dated Nov. 27, 2015, 4 pages.

*Primary Examiner* — Alexandru Cirnu
(74) *Attorney, Agent, or Firm* — Lee, Hong, Degerman, Kang & Waimey

(57) ABSTRACT

An operating method for a mobile terminal, according to one embodiment of the present disclosure, comprises the steps of: executing a signage application for providing a digital signage service; accessing a server according to the execution of the signage application; receiving information on the digital signage service from the accessed server; and displaying a main screen for managing a digital signage device on the basis of the received information, wherein the main screen includes approval state information for providing approval states of a plurality of items and error state information of one or more digital signage devices managed by the server.

11 Claims, 93 Drawing Sheets

(56) References Cited

U.S. PATENT DOCUMENTS

2009/0144157 A1\* 6/2009 Saracino ................ G06Q 30/02
705/14.73
2014/0067549 A1 3/2014 Park et al.

FOREIGN PATENT DOCUMENTS

| KR | 10-2013-0128566 A | 11/2013 |
|----|-------------------|---------|
| KR | 10-2014-0076274 A | 6/2014  |

\* cited by examiner

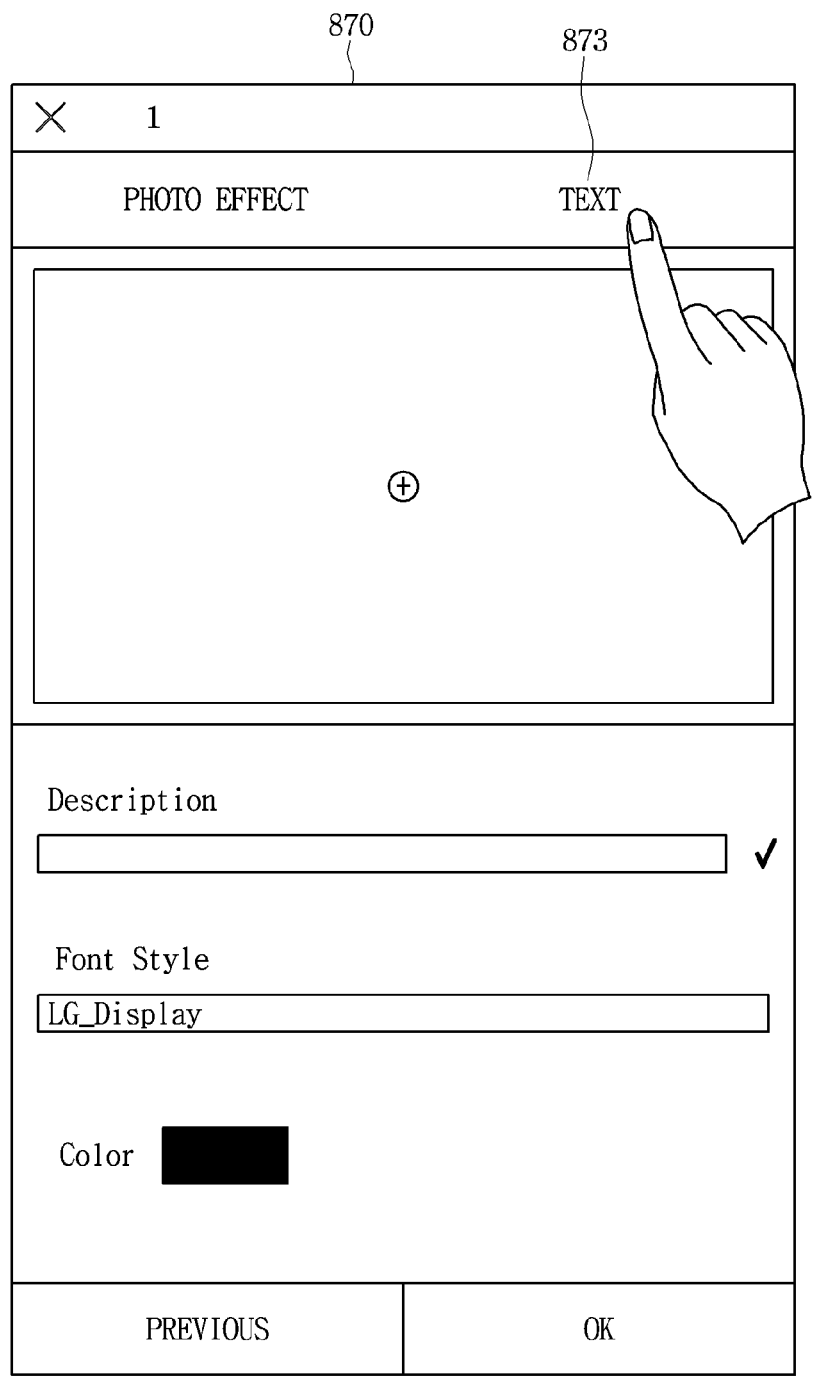

FIG. 15C

| | 2/1 | 2/2 | 2/3 | 2/4 | 2/5 | 2/6 | 2/7 |
|---|---|---|---|---|---|---|---|
| 12am | | | | | ① | | |
| 12:30am | | | | | | | |
| 1am | | | | | | | |
| 1:30am | | | | | | | |
| 2am | | | | | ④ | | |
| 2:30am | | | | | | | |
| 3am | | | | | | | |
| 3:30am | | | | | ③ | | |
| 4am | | | | | | | |
| 4:30am | | | | | | | |
| 5am | | | | | | | |
| 5:30am | | | | | | | |
| 6am | | | | | | | |
| 6:30am | | | | | | | |
| 7am | | | | | | | |
| 7:30am | | | | | | | |

2015-02-01~2015-02-07 | 30m | Weekly

OK  NEXT

| | 2/1 | 2/2 | 2/3 | 2/4 | 2/5 | 2/6 | 2/7 |
|---|---|---|---|---|---|---|---|
| 12am | | | | | ① | | |
| 12:30am | | | | | | | |
| 1am | | | | | | | |
| 1:30am | | | | | | | |
| 2am | | | | | ④ | | |
| 2:30am | | | | | | | |
| 3am | | | | | | | |
| 3:30am | | | | | ③ | | |
| 4am | | | | | | | |
| 4:30am | | | | | | | |
| 5am | | | | | | | |
| 5:30am | | | | | | | |
| 6am | | | | | | | |
| 6:30am | | | | | | | |
| 7am | | | | | | | |
| 7:30am | | | | | | | |

Date range: 2015-02-01 ~ 2015-02-07, 30m, Weekly

OK  NEXT

| ✕ | 1 |

Time Setting ☐ All Day

Starting at
[▼]

Ending at
[▼]

☐ Repeat

⦿ Every Day    ○ Every Week

☑ Mon  ☑ Tue  ☑ Wed  ☑ Thu
☑ Fri  ☑ Sat  ☑ Sun

○ Every Month

Repeat until
[▼]

PREVIOUS    NEXT

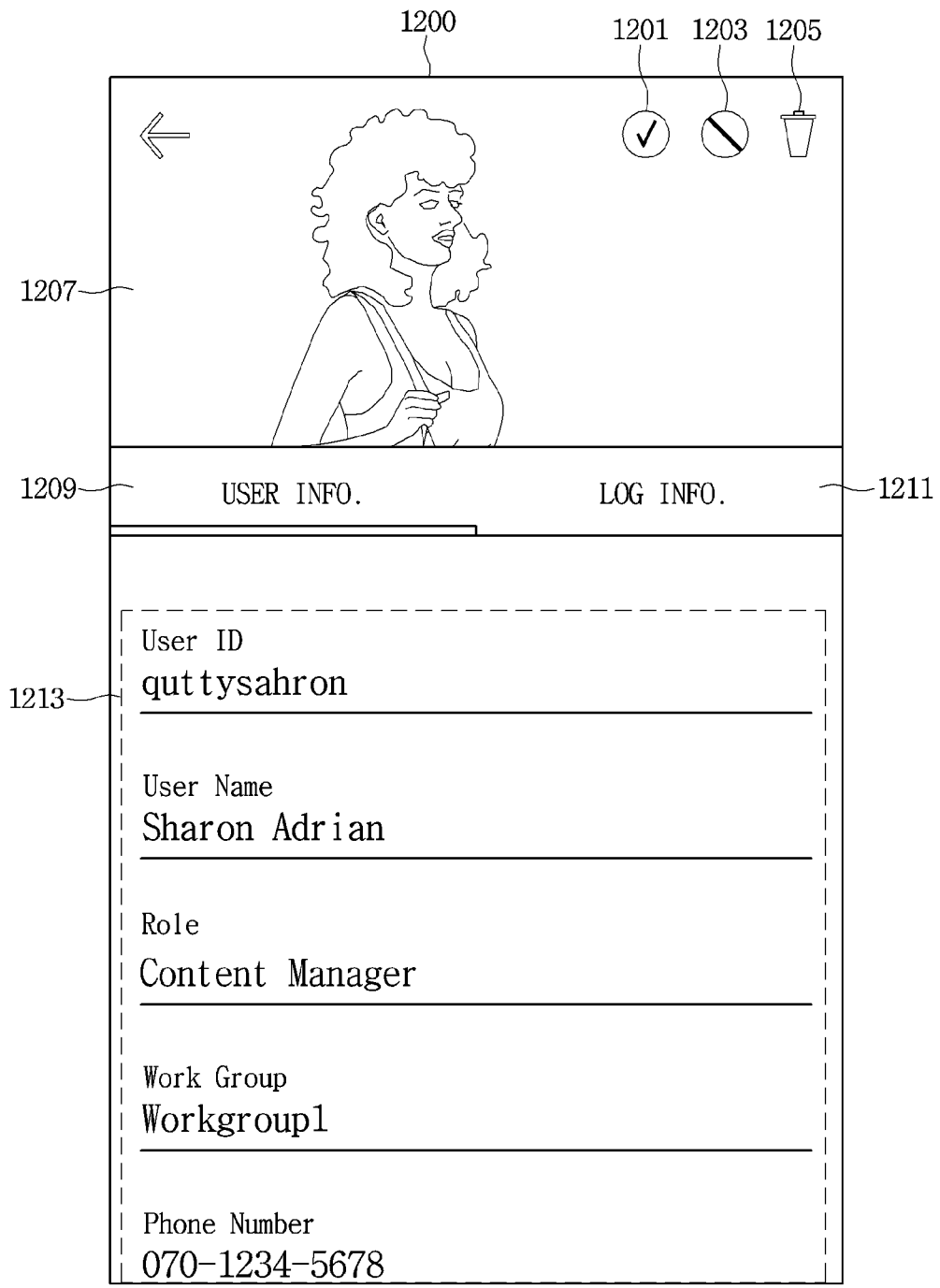

FIG. 29B

```
                    1390
                      \
┌─────────────────────────────────────────┐
│  ✕   New_Distribution_1001              │
├─────────────────────────────────────────┤
│    Last Edited                        ▽ │  ← 1391
├─────────────────────────────────────────┤
│    Player List/                         │
├─────────────────────────────────────────┤
│    Folders                            ▽ │
├─ ─ ─ ─ ─ ─ ─ ─ ─ ─ ─ ─ ─ ─ ─ ─ ─ ─ ─ ─ ─┤
│  Schedule Items                         │
│                                         │
│     ( 🍔 )  [5 Items] New Schedule-20141201       ○ │
│             2014-12-01~2014-12-05/Set-top Box   │
│             No reference                        │
│                                         │
│     ( 🍔 )  [2 Items] New Schedule-20141101       ○ │
│             2014-12-01~2014-12-05/Set-top Box   │
│             No reference                        │
│                                         │
│     ( ⊕ )  [3 Items] New Schedule-20141124       ○ │
│             2014-12-01~2014-12-05/TV            │
│             No reference                        │
│                                         │
│     ( ⊕ )  [4 Items] New Schedule-20141110       ○ │
├─────────────────────────────────────────┤
│                                   NEXT  │
└─────────────────────────────────────────┘
```

1393 points to the Schedule Items list region.

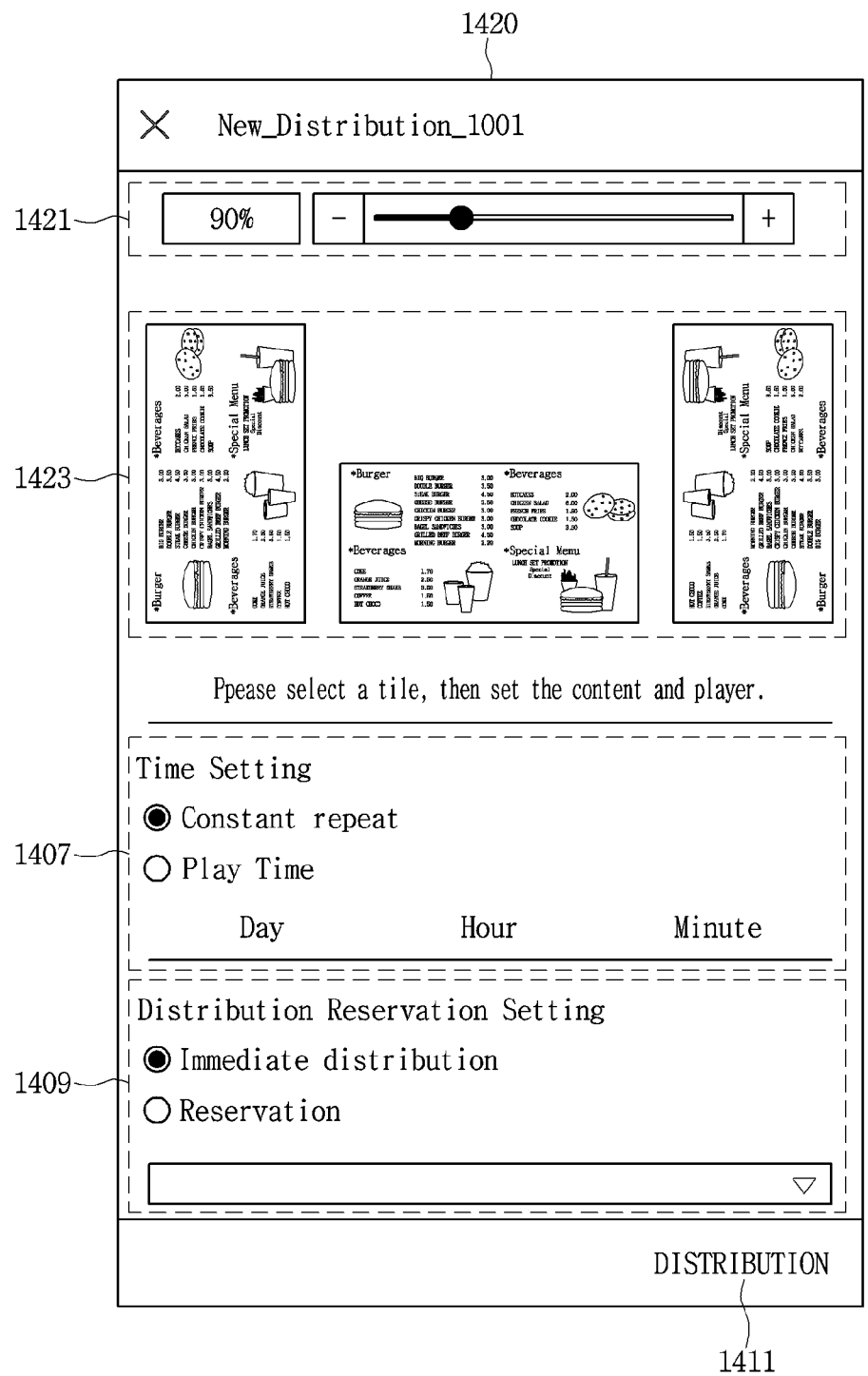

<content manager logged-in>

<content manager logged-in>

MOBILE TERMINAL AND OPERATING METHOD THEREFOR

CROSS-REFERENCE TO RELATED APPLICATIONS

This application is the National Stage filing under 35 U.S.C. 371 of International Application No. PCT/KR2015/003076, filed on Mar. 27, 2015, and also claims the benefit of earlier filing date and right of priority to Korean Patent Application No. 10-2015-0030572, filed on Mar. 4, 2015, the contents of which is hereby incorporated by reference herein in its entirety.

TECHNICAL FIELD

The present disclosure relates to a mobile terminal and an operating method therefor.

BACKGROUND ART

A digital signage may be defined as a system for outputting predetermined information on screens of a plurality of display devices through centralizing management, for allowing each display device to be provided in a stationary status at a specific place and to be used by visitors visiting the place, and for additionally providing information required by the visitors through the active participation of the visitors. In particular, the digital signage is to provide, in the form of a digital image, specific information as well as broadcast programs in public places, such as airports, hotels, hospitals, and subway stations, through a communication tool that is able to induce marketing, advertising, training effects, and customer experience of companies. In addition, the digital signage is to integrally provide even software or a management platform, which is able to control main functions, to an existing display device for commercial digital information.

The digital signage is to exhibit various types of content or commercial advertisements as display devices, including liquid crystal displays (LCD), plasma display panels (PDP), and organic light emitting diodes, are installed in places, such as predetermined outdoor places or street furniture. The digital signage is currently installed in all places, such as apartment elevators, subway stations, subway insides, bus insides, universities, banks, convenience stores, discount stores, and shopping malls, in which the flow of human traffic is present.

However, the related art has a difficulty in integrally managing a digital signage device which provides a digital signage service.

DISCLOSURE

Technical Problem

An object of the present disclosure is to solve aforementioned problems and other problems.

Another object of the present disclosure is to provide a mobile terminal capable of easily managing a digital signage service through a mobile terminal interworking with a server for managing the digital signage service.

Technical Solution

According to an embodiment of the present disclosure, an operating method of a mobile terminal includes executing a signage application for providing a digital signage service, accessing a server as the signage application is executed, receiving information on the digital signage service from the accessed server, and displaying a main screen for managing a digital signage device based on the received information. The main screen includes approval status information for providing approval statuses of a plurality of items and information on error statuses of one or more digital signage devices managed by the server.

According to an embodiment of the present disclosure, a mobile terminal includes a touch screen, and a controller that executes a signage application for providing a digital signage service, accesses a server as the signage application is executed, receives information on the digital signage service from the accessed server, and displays a main screen for managing a digital signage device based on the received information. The main screen includes approval status information for providing approval statuses of a plurality of items and information on error statuses of one or more digital signage devices managed by the server.

Advantageous Effects

According to various embodiments of the present disclosure, the digital signage service can be easily managed through the mobile terminal interworking with the server for managing the digital signage service.

DESCRIPTION OF DRAWINGS

FIGS. 7 to 35 are views illustrating user interface screens provided in the case that a specific menu is selected on a menu providing screen according to an embodiment of the present disclosure.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals, such as cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMds)), and the like.

However, it can be easily understood by a person skilled in the art that the feature according to an embodiment disclosed in the present specification may be applicable to stationary terminals such as digital TV, desktop computers, digital signage and the like except the case the feature is applied to only a mobile terminal.

Figure 1:
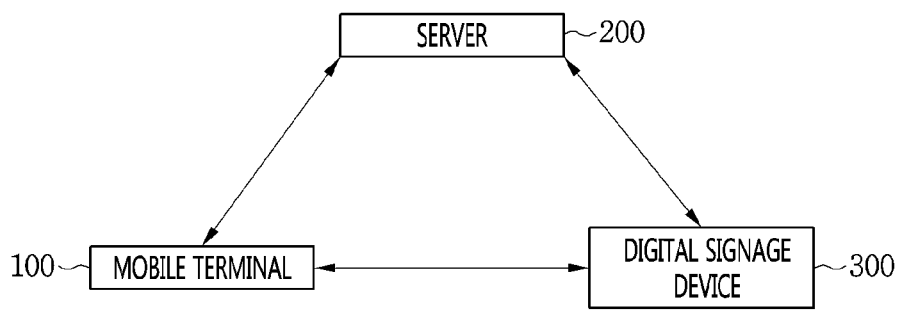
FIG. 1 is a view illustrating a digital signage system according to an embodiment of the present disclosure.

FIG. 1 is a view illustrating a digital signage system according to an embodiment of the present disclosure.

A digital signage system 10 may include a mobile terminal 100, a server 200, and a digital signage device 300.

The mobile terminal 100 may be connected with the server 200 over a wired or wireless network to exchange information therebetween. In the case that the mobile terminal 100 is connected with the server 200 over the wireless network, the wireless network may be the wireless Internet. In the mobile terminal 100, a signage application may be installed to manage the digital signage device 300 through the server 200. The mobile terminal 100 may manage the digital signage device 300 by accessing the server as the signage application is executed.

The server 200 may provide information on the digital signage device 300 to the mobile terminal 100. The server 200 may store information received from the mobile terminal 100 and may transmit the received information to the digital signage device 300. The server 200 may periodically collect the information on the digital signage device 300 and may transmit the collected information to the mobile terminal 100.

The digital signage device 300 is a digital video device which provides a broadcast program and specific information in public places such as airports, hotels, and hospitals through a communication tool that can induce marketing advertising, training effects, and customer experience of companies.

The digital signage device 300 may include at least one of a player and a display device. The player may include any one of a set-top box and a TV. If the player is the set-top box, the digital signage device 300 may include a display device such as a video wall or a monitor to display a video output from the set-top box. If the player is the TV, the digital signage device 300 may be the TV.

Hereinafter, description will be made with reference to FIG. 2.

Figure 2:
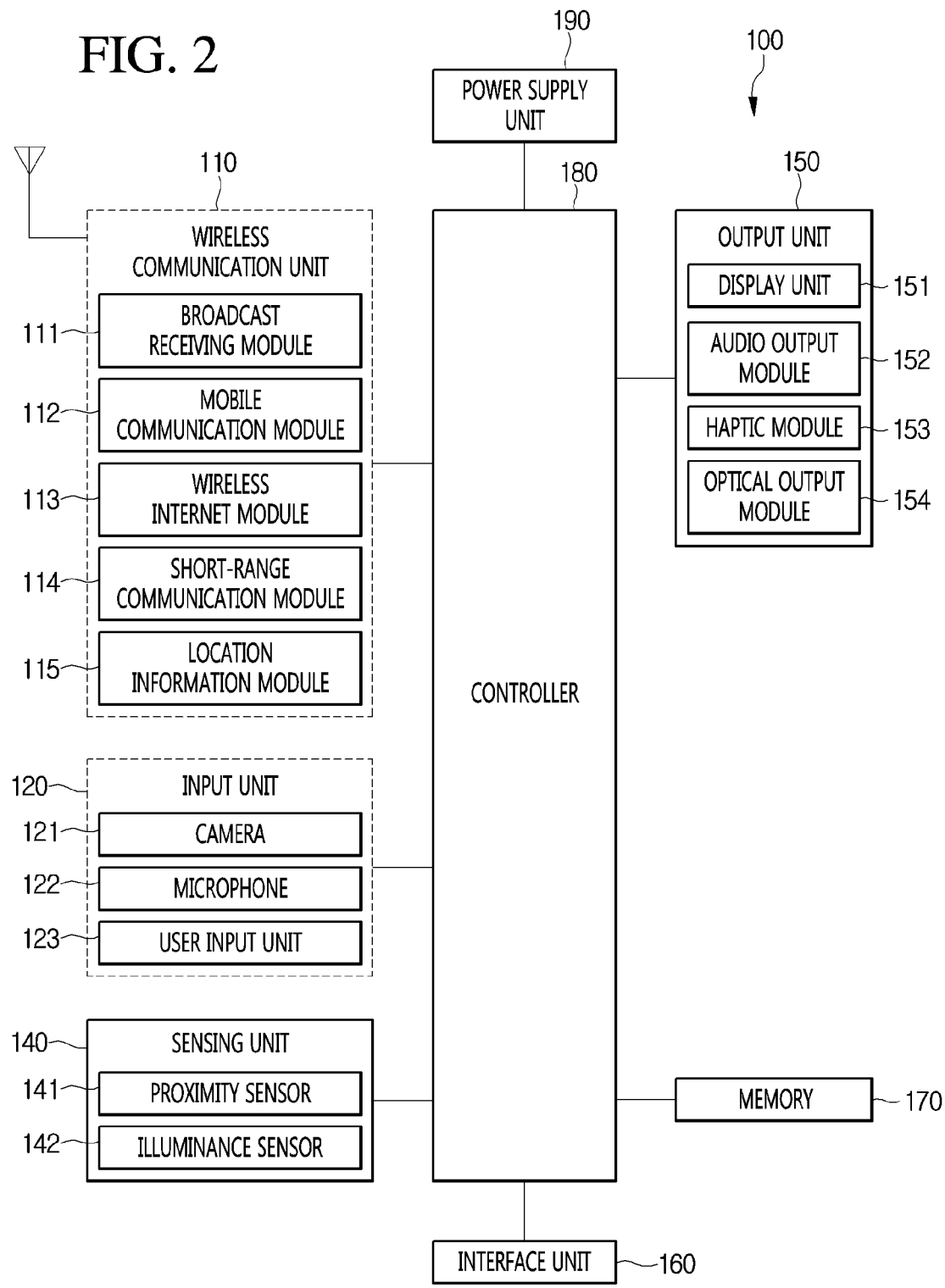
FIG. 2 is a block diagram illustrating a mobile terminal according to the present disclosure.

FIG. 2 is a block diagram illustrating the mobile terminal related to the present disclosure.

The mobile terminal 100 may include a wireless communication unit 110, an input unit 120, a sensing unit 140, an output unit 150, an interface unit 160, a memory 170, a controller 180, and a power supply unit 190. It is understood that implementing all of components illustrated in FIG. 2 is not a requirement, and that greater or fewer components may alternatively be implemented.

In more detail, among the components, the wireless communication unit 110 typically includes one or more components which permit wireless communication between the mobile terminal 100 and a wireless communication system, between the mobile terminal 100 and another mobile terminal 100, or between the mobile terminal 100 and an external server. In addition, the wireless communication unit 110 may include at least one module to connect the mobile terminal 100 with at least one network.

The wireless communication unit 110 may include at least one of a broadcast receiving module 111, a mobile communication module 112, a wireless Internet module 113, a short-range communication module 114, and a location information module 115.

The input unit 120 includes a camera 121 or an image input unit for inputting an image signal, a microphone 122, which is to input an audio signal, and a user input unit 123 (for example, a touch key, a push key, a mechanical key, and the like) for allowing a user to input information. Voice data or image data collected by the input unit 120 may be analyzed and processed by the control command of the user.

The sensing unit 140 may include at least one sensor configured to sense at least one of internal information of the mobile terminal, the surrounding environment of the mobile terminal, user information, and the like. For example, the sensing unit 140 is shown having a proximity sensor 141 and an illumination sensor, a touch sensor, an acceleration sensor, a magnetic sensor, a G-sensor, a gyroscope sensor, a motion sensor, an RGb sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal 100 disclosed in the present specification may utilize information, which is sensed by at least two sensors among the above sensors, in the form of the combination of the information.

The output unit 150 is to generate outputs such as audio, video, tactile output, and the like. The output unit 150 may include at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160 may include at least one of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform suitable control functions associated with a connected external device, in response to the external device being connected to the interface unit 160.

The memory 170 is typically implemented to store data to support various functions of the mobile terminal 100. The memory 170 may store application programs or applications executed in the mobile terminal 100, data or instructions for operations of the mobile terminal 100, and the like. At least some of these application programs may be downloaded from an external server via wireless communication. At least other application programs may be installed within the mobile terminal 100 at time of manufacturing or shipping, which is typically the case for basic functions of the mobile terminal 100 (for example, receiving a call, outgoing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components described above, or driving application programs stored in the memory 170.

In addition, the controller 180 may control at least some of components described with reference to FIG. 2 in order to drive an application program stored in the memory 170. In addition, the controller 180 may operate the combination of at least two of components included in the mobile terminal 100 to drive the application program.

The power supply unit 190 can receive external power or internal power under the control of the controller 180 to supply appropriate power to components included in the mobile terminal 100. The power supply unit 190 may include a battery, and the battery may be embedded in the terminal body, or be detachable from the terminal body.

At least some of the components may interwork with each other to realize the operation, the control, or the control method of the mobile terminal according to various embodiments to be described below. The operation, the control, or the control method of the mobile terminal may be realized in the mobile terminal by the driving of at least one application preprogram stored in the memory 170.

[[UX Part Start]]

Prior to the description of various embodiments realized through the mobile terminal 100 described above, the described components will be described in more detail below with reference to FIG. 2.

Regarding the wireless communication unit 110, the broadcast receiving module 111 of the wireless communication unit 110 is typically configured to receive a broadcast signal and/or broadcast associated information from an external broadcast managing server via a broadcast channel. The broadcast channel may include a satellite channel or a terrestrial channel. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from at least one of a base station, an external terminal, and a server on a mobile communication network constructed based on technical standards for mobile communication or a communication scheme (e.g., Global System for Mobile communication (GSM), code division Multi access (cdMa), code division Multi access 2000 (cdMa2000), Enhanced Voice-data Optimized or Enhanced Voice-data Only (EV-dO), Wideband cdMa (WcdMa), High Speed downlink Packet access (HSdPa), High Speed Uplink Packet access (HSUPa), Long Term Evolution (LTE), Long Term Evolution-advanced (LTE-a).

The wireless signals may include voice call signals, video call signals, or various formats of data to support communication of text and multimedia messages.

The wireless Internet module 113 is referred to as a module for wireless Internet access. This module may be internally or externally coupled to the mobile terminal 100. The wireless Internet module 113 may transmit and/or receive wireless signals via communication networks according to wireless Internet technologies.

For example, the wireless Internet technology may include Wireless LAN (WLaN), Wireless Fidelity (Wi-Fi), Wi-Fi Direct, Digital Living Network Alliance (DLNA), Wireless Broadband (WiBro), Worldwide Interoperability for Microwave Access (dLNa), High Speed Downlink Packet Access (HSdPa), HSUPa (High Speed Uplink Packet Access), Long Term Evolution (LTE), LTE-a (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, Wibro, HSdPa, HSUPa, GSM, cdMa, WcdMa, LTE, LTE-a and the like, through a mobile communication network, the wireless Internet module 113, which performs such wireless Internet access through the mobile communication network, may be a kind of the mobile communication module 112.

The short-range communication module 114 is configured to facilitate short-range communications and supports short range communication by using at least one of BLUETOOTH™, Radio Frequency IDentification (RFId), Infrared Data Association (Irda), Ultra-WideBand (UWb), ZigBee, Near Field Communication (NFc), Wireless-Fidelity (Wi-Fi), Wi-Fi Direct, Wireless USb (Wireless Universal Serial Bus), and the like. The short-range communication module 114 supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. The short-range wireless communication network may be wireless personal area networks.

In this case, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense (or recognize) the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. For example, if the GPS module is utilized, the mobile terminal may obtain data related to the position of the mobile terminal by using a signal sent from a GPS satellite. Alternatively, if the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used to acquire the position of the mobile terminal (or current position). The location information module 115 is not limited to a module to directly acquire or calculate the position of the mobile terminal.

The input unit 120 may be configured to permit various types image information (or signal), audio information (or signal), data, input of information input from a user. The mobile terminal 100 may include one or a plurality of cameras 121 to input the image information. The camera 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The processed voice data can be processed in various manners according to a function (application program) being executed in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

Meanwhile, the sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal 100 based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen (or a touch key provided in addition to the touch screen). Whether to execute the same or different control according to the object which provides a touch input may be decided based on a current operating status of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

Meanwhile, the camera 121, which serves as an element of the input unit 120, typically includes at least one a camera sensor (ccd, cMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data received from the wireless communication unit 110 in a call signal receiving mode, a communication mode, a recording mode, a voice recognition mode, a broadcast receiving mode, and the like or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

The haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip, which stores various information for authenticating authority of using the mobile terminal 100, and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD, DX memory, or the like), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

Meanwhile, as described above, the controller 180 may typically control the general operations of the mobile terminal 100. For example, the controller 180 may set or release a lock status for restricting a user from inputting a control command with respect to applications when a status of the mobile terminal meets a preset condition.

The controller 180 can also perform the controlling and processing associated with voice calls, data communications, video calls, and the like, or can perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, a communication system, which is operable through the mobile terminal 100 according to the present disclosure, will be described.

First, such communication systems utilize different wireless interfaces and/or physical layers. Examples of such wireless interfaces utilized by the communication systems include Frequency Division Multiple Access (FDMA), Time Division Multiple Access (TDMA), Code Division Multiple Access (CDMA), and Universal Mobile Telecommunications System (UMTS) (especially, Long Term Evolution (LTE), Long Term Evolution-advanced (LET-a), or Global System for Mobile Communications (GSM)) and the like.

The following description will be limited to CDMA for the convenience of explanation. However, it is obvious that the present disclosure is applicable to all communication systems including an Orthogonal Frequency division Multiplexing (OFDM) wireless communication system as well as a CDMA wireless communication system.

The CDMA wireless communication system may include at least one terminal 100, at least one base station (BS) (which may be named Node b or Evolved Node b), at least one base station controller (BSC), and a mobile switching center (MSC). The MSC is configured to be connected with a conventional Public Switch Telephone Network (PSTN) and the BSC. The BSC is coupled to the BS via a backhaul line. The backhaul line may be configured in accordance with at least one several known interfaces including, for example, E1/T1, ATM, IP, PPP, Frame Relay, HDSL, ADSL, or xDSL. Hence, a plurality of BSCs may be included in the CDMA wireless communication system.

Each bS may include one or more sectors, each sector having an omni-directional antenna or an antenna pointed in a particular direction radially away from the bS. Alternatively, each sector may include two or more different antennas. Each bS may be configured to support a plurality of frequency assignments, with each frequency assignment having a specific spectrum (e.g., 1.25 MHz, 5 MHz, etc.)

The intersection of sector and frequency assignment may be referred to as a cdMA channel. The bS may also be referred to as Base Station Transceiver Subsystems (bTSs). In this case, one bSc and at least one bS may be collectively referred to "bS". The bS may represent a "cell site". Alternatively, individual sectors of a specific bS may be called a plurality of cell sites.

A broadcasting transmitter (BT) transmits a broadcast signal to the terminals 100 operating within the system. The broadcast receiving module 111 as illustrated in FIG. 2 is typically configured inside the terminal 100 to receive broadcast signals transmitted by the BT.

In addition, a Global Positioning System (GPS) may be connected with a CDMA wireless communication system to determine the location of the mobile terminal 100. The satellite 300 helps the CDMA wireless communication system to detect the location of the mobile terminal 100. Useful location information may be acquired by two or less or two or more satellites. In this case, the location of the mobile terminal 100 may be tracked by using all tacking technologies including a GPS tracking technology. In addition, at least one of GPS satellites may selectively or additionally perform satellite DMB transmission.

A location information module 115 provided in the mobile terminal is to detect, compute or identify the location of the mobile terminal, whose typical example is a Global Position System (GPS) module, or Wireless Fidelity (WiFi) module. If necessary, the location information module 115 may function as another module of the wireless communication unit 110 in order to acquire data related to the location of the mobile terminal additionally or through substitution.

The GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite has been extensively used. In addition, the GPS module 115 continuously calculates the current position in real time and calculates velocity information. However, the location of the mobile terminal may not be exactly measured using a GPS module in a shadow zone, such as an interior, of a satellite signal. Accordingly, a WiFi positioning system (WPS) may be utilized in order to compensate for location determination based on a GPS scheme.

The WiFi positioning system (WPS) refers to a location determination technology based on a wireless local area network (WLAN) using WiFi as a technology for tracking the location of the mobile terminal 100 by using a WiFi module provided in the mobile terminal 100 and a wireless access point (aP) 320 for transmitting and receiving a wireless signal to and from the WiFi module.

The WiFi positioning system may include a WiFi location determination server, the mobile terminal 100, a wireless access point (aP) connected to the mobile terminal 100, and a database stored with any wireless aP information The mobile terminal 100 connected with the wireless aP may transmit a location information request message to the WiFi location determination server.

The WiFi location determination server may extract the information of the wireless aP connected to the mobile terminal 100 based on the location information request message (or signal) of the mobile terminal 100. Information related to the wireless aP connected with the mobile terminal 100 may be transmitted to the WiFi location determination server through the mobile terminal 100 or transmitted to the WiFi location determination server from the wireless aP.

The information on the wireless aP extracted based on the location information request message of the mobile terminal 100 may be at least one of MAC address, Service Set Identification (SSID), Received Signal Strength Indicator (RSSI), Reference Signal Received Power (RSRP), Reference Signal Received Quality (RSRQ), channel information, privacy, network type, signal strength, and noise strength.

The WiFi location determination server may receive the information of the wireless aP connected to the mobile terminal 100 as described above, and may extract wireless aP information corresponding to the wireless aP connected with the mobile terminal from the pre-established database. In this case, the information related to any wireless aPs stored in the database may be information such as MAC address, SSID, channel information, Privacy, Network Type, latitude and longitude coordinates of the wireless AP, the name of a building at which the wireless AP is located, a floor number, detailed indoor location information (availability of GPS coordinates), AP owner's address, a phone number, and the like. In this case, during the location determination procedure, to remove wireless aP provided by a mobile aP or an illegal Mac address, the WiFi location determination server may extract only a predetermined number of pieces of aP information sequentially from higher RSSI.

Thereafter, the WiFi location determination server may extract (or analyze) location information of the mobile terminal 100 by using at least one wireless aP information extracted from the database. The location information of the mobile terminal 100 may be extracted (or analyzed) by comparing the included information and the received wireless aP information.

To extract (or analyze) the location information of the mobile terminal 100, a cell-Id scheme, a fingerprint scheme, a triangulation scheme, and a landmark scheme may be utilized.

The cell-Id scheme is a scheme in which the location of a wireless aP representing the strongest signal intensity among information of surrounding wireless aPs collected by the mobile terminal is determined as the location of the mobile terminal. The cell-Id scheme may be simply realized, does not require additional costs, and may easily obtain location information. However, if the wireless aPs are installed with a lower density, the accuracy of the location determination may be degraded.

The fingerprint scheme is used to collect signal strength information by selecting a reference position from a service area, and to track a position of the mobile terminal using the signal strength information transmitted from the mobile terminal based on the collected information. In order to use the fingerprint scheme, it is common for the characteristics of radio signals to be pre-stored in the form of a database.

The trigonometry scheme is a scheme to calculate a position of a mobile terminal based on a distance between coordinates of at least three wireless APs and the mobile terminal. In order to measure the distance between the mobile terminal and the wireless APs, the signal strength may be converted into distance information, Time of Arrival (ToA) in which a wireless signal is transmitted, Time Difference of Arrival (TDoA) representing the time difference between signal transmission, Angle of Arrival (AoA) representing the transmission angle of the signal, or the like may be used.

The landmark scheme is a scheme to measure a position of a mobile terminal using a known landmark transmitter.

In addition to the above schemes, various algorithms may be used to extract (analyze) location information of the mobile terminal.

Such extracted location information of the mobile terminal 100 may be transmitted to the mobile terminal 100 through the Wi-Fi location determination server and thus the mobile terminal 100 may acquire location information.

The mobile terminal 100 can acquire location information by being connected to at least one wireless aP. The number of wireless aPs required to acquire location information of the mobile terminal 100 may be variously changed according to a wireless communication environment within which the mobile terminal 100 is positioned.

Hereinafter, the operating method of the digital signage system according to an embodiment of the present disclosure will be described with reference to FIG. 3.

Figure 3:
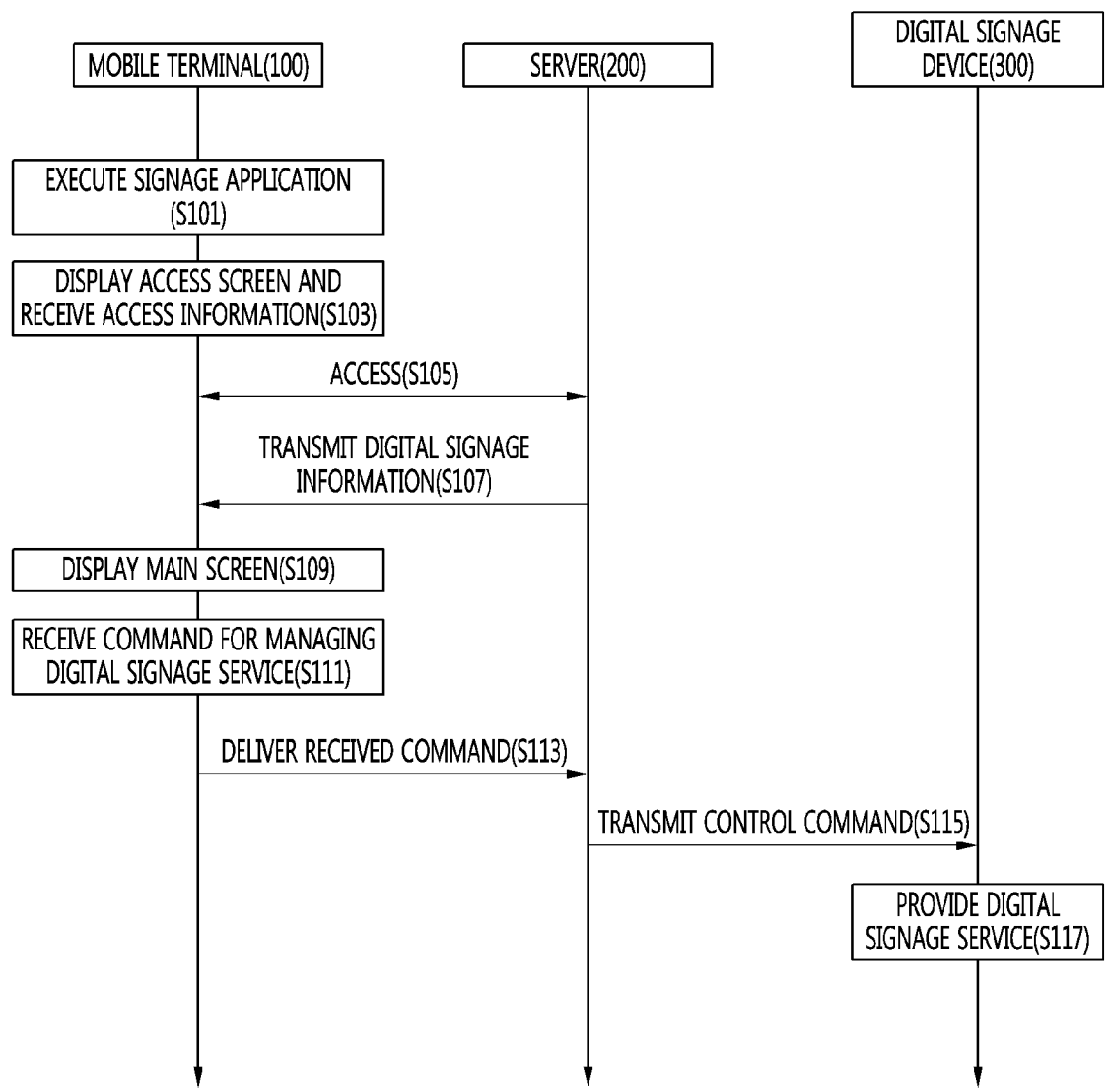
FIG. 3 is a ladder diagram illustrating an operating method of a digital signage system according to an embodiment of the present disclosure.

FIG. 3 is a ladder diagram illustrating the operating method of a digital signage system according to an embodiment of the present disclosure.

The controller 180 of the mobile terminal 100 executes a signage application (S101). The signage application may be an application to manage a digital signage device 300 for providing a digital signage service through a server 200.

The controller 180 of the mobile terminal 100 displays an access screen, which is to access the server 200 according to the execution of the application, on a display unit 151. As a touch input is received on the access screen, the mobile terminal 100 receives the access information (S103).

The controller 180 of the mobile terminal 100 accesses the server 200 by using the received access information (S105). Steps 101 to 105 will be described below with reference to FIG. 4.

Figure 4:
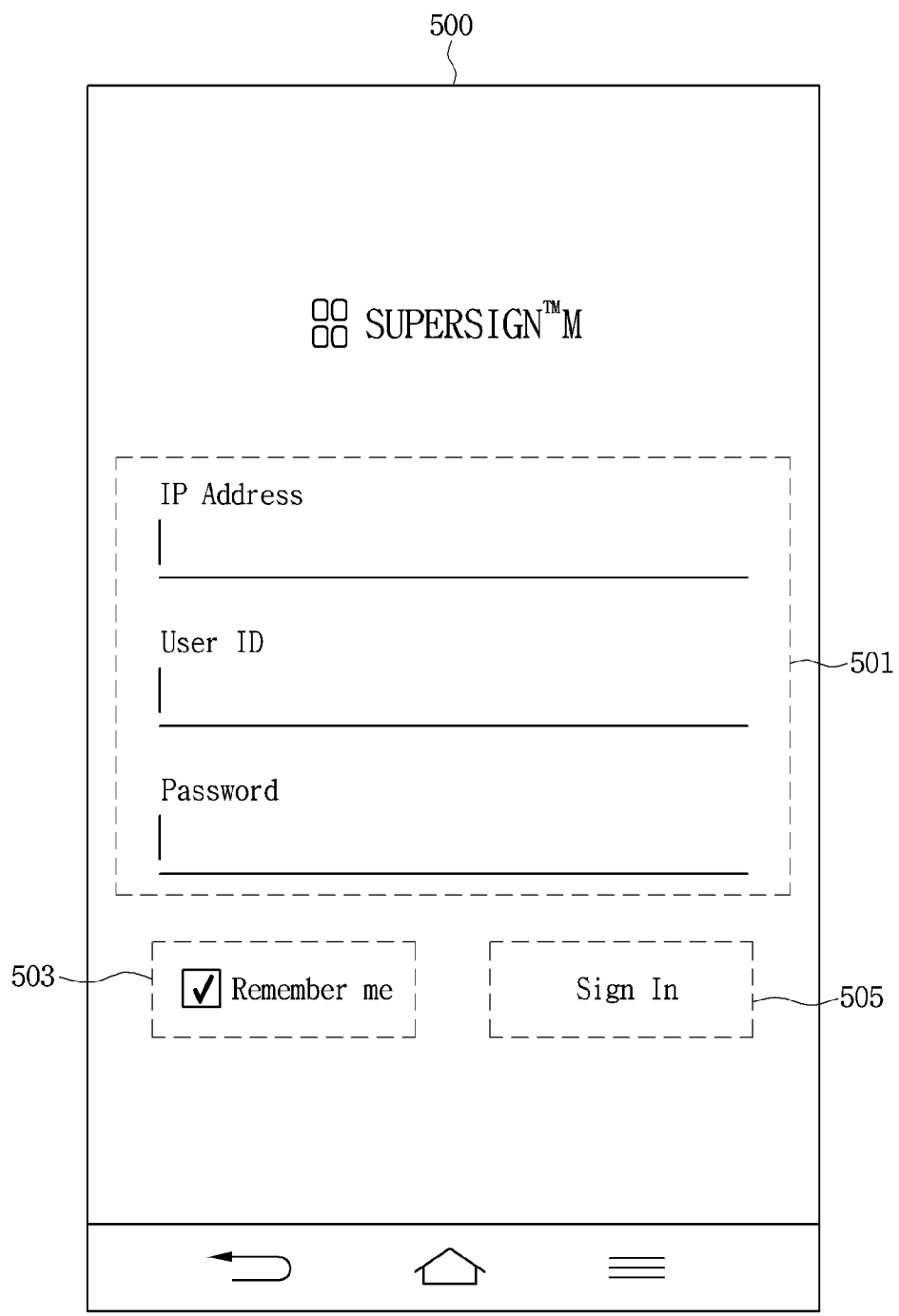
FIG. 4 is a view illustrating a user interface screen that provides an access screen for accessing a server according to an embodiment of the present disclosure.

FIG. 4 is a view illustrating a user interface screen that provides the access screen for accessing a server according to an embodiment of the present disclosure.

Referring to FIG. 4, an access screen 500 may include an access information input window 501 for accessing the server 200, an automatic log-in check button 503, and an access button 505.

The connection information input window 501 may include an IP address input window for inputting an IP address of the server 200, an Id input window for inputting an Id of a user for log-in, and a password input window for inputting a password for log-in. The access information may include the IP address of the server 200, and the Id and the password of the user.

The automatic log-in check button 503 may be a button used to allow the user to automatically log in without again inputting the information input to the access information input window by storing the information, when the user logs in again.

The access button 505 may be a button used to input an instruction for accessing the server 200.

The user may input the access information into the access information input window 501 and selects the access button 505 such that the mobile terminal 100 accesses the server 200.

Hereinafter, description will be made again with reference to FIG. 3.

The controller 180 of the mobile terminal 100 receives digital signage information from the accessing server 200 (S107) and controls the display 151 to display a main screen based on the received information (S109).

According to an embodiment, the digital signage information may include information used to control the digital signage device 300 for providing a digital signage service, which will be described later. Hereinafter, the main screen will be described with reference to FIG. 5.

Figure 5:
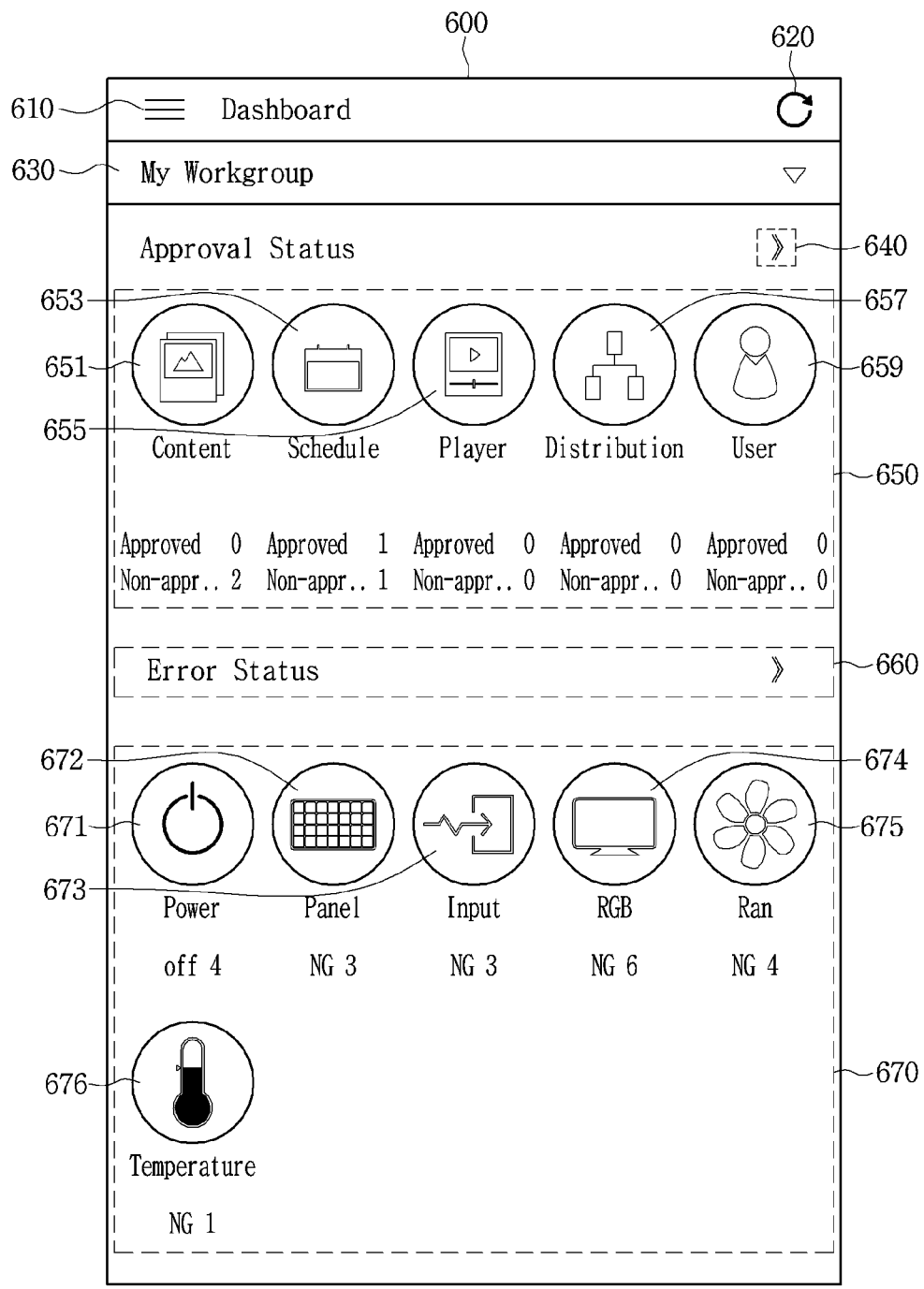
FIG. 5 is a view illustrating a main screen for a digital signage service according to an embodiment of the present disclosure.

FIG. 5 is a view illustrating a main screen for a digital signage service according to an embodiment of the present disclosure.

Referring to FIG. 5, the controller 180 may display a main screen 600 on the display unit 151. The main screen 600 may include a menu button 610, a refresh button 620, a workgroup button 630, a whole approval status view button 640, a menu icon list 650, a whole error status view button 660, and an error status icon list 670.

The menu button 610 may be a button for providing a plurality of menus, which will be described later.

The refresh button 620 may be a button to update information displayed on the main screen 600. When a touch input for selecting the refresh button 620 is received, the controller 180 requests for the updated information from the server 200, receives the response to the request, and updates the information displayed on the main screen 600.

The workgroup button 630 may be a button for displaying a workgroup under working and for changing the workgroup.

The whole approval status view button 640 may be a button for providing the list of all approval states.

The menu icon list 650 may be a list for providing an approval status corresponding to each of a plurality of menu icons 651 to 659. The menu icon list 650 may include the menu icons 651 to 659. The content menu icon 651 may be a menu for providing an approval status of media content for the digital signage service. A schedule menu icon 653 may be a menu for providing an approval status for a schedule in which media content the digital signage service is reproduced in the digital signage device 300. A player menu icon 655 may be a menu for providing an approval status for a player which is a kind of the digital signage device 300 for providing the digital signage service. A distribution menu icon 657 may be a menu for providing a distribution approval state. A user menu icon 659 may be an icon for providing an approval status of a user who manages the digital signage system. Information on an approval number and a disapproval number may be further provided at one side of each menu icon.

The whole error status view button 660 may be a button for providing error statuses of digital signage devices failed among all digital signage devices included in the digital signage system 10.

The error status icon list 670 may be a list for providing information on the digital signage devices failed according to an error type. The error status icon list 670 may include a power icon 671, a panel icon 672, an input icon 673, an RGb icon 674, a fan icon 675, and a temperature icon 676.

The power icon 671 may be an icon for providing the list of devices powered-off. The name ('Power') of the power icon and the number of digital signage devices which are powered off may be displayed at one side of the power icon 671.

The panel icon 672 may be an icon for providing the list of digital signage devices in which errors occur on the panels thereof. The name ('Panel') of the panel icon 672 and the number (NG 3) of the digital signage devices in which errors occur on the panels thereof may be displayed at one side of the panel icon 672.

The input icon 673 may be an icon for providing a device list of the digital signage devices 300 having errors related to the inputs thereof. The name ('Input') of the input icon 673 and the number (NG 3) of the digital signage devices having the input-related errors may be displayed at one side of the input icon 673.

The RGb icon 674 may be an icon for providing the list of digital signage devices in which errors occur in RGb sensors thereof. The name ('RGb') of the RGb icon 674 and the number (NG6) of the digital signage devices in which errors occur in the RGb sensors thereof may be displayed at one side of the RGb icon 674.

The fan icon 675 may be an icon for providing the list of the digital signage devices 300 in which errors occur in fans thereof. The name ('Fan') of the fan icon 675 and the number (NG 4) of the digital signage devices, in which the errors occur in the fans thereof, may be displayed at one side of the fan icon 675.

The temperature icon 676 may be an icon for providing the list of digital signage devices in which errors occur in temperatures thereof. The name ('Temperature') of the temperature icon 676 and the number (NG1) of the digital signage devices, in which the error occurs in the temperature, may be displayed at one side of the temperature icon 676.

Hereinafter, the description will be made with reference to FIG. 3 again.

The controller 180 of the mobile terminal 100 receives an instruction for managing the digital signage service on the main screen 600 (S111) and delivers the received instruction to the server 200 (S113). According to an embodiment, the instruction for managing the digital signage service may be a user input inputted onto a screen provided according to the execution of a signage application. The user input may include a touch input.

The server 200 creates a control instruction for controlling the operation of the digital signage device 300 based on the instruction received from the mobile terminal 100, and transmits the created control instruction to the digital signage device 300 (S115).

The digital signage device 300 provides the digital signage service according to the control instruction received from the server 200 (S117).

Hereinafter, various digital signage management screens provided under the request for selecting the button or the list on the main screen 600 will be described. In addition, description will be made on the assumption that the request for selecting a specific item is the touch input of the user.

FIG. 6 is a view illustrating a user interface screen provided in the case that a menu button on the main screen is selected according to an embodiment of the present disclosure.

Figure 6A:
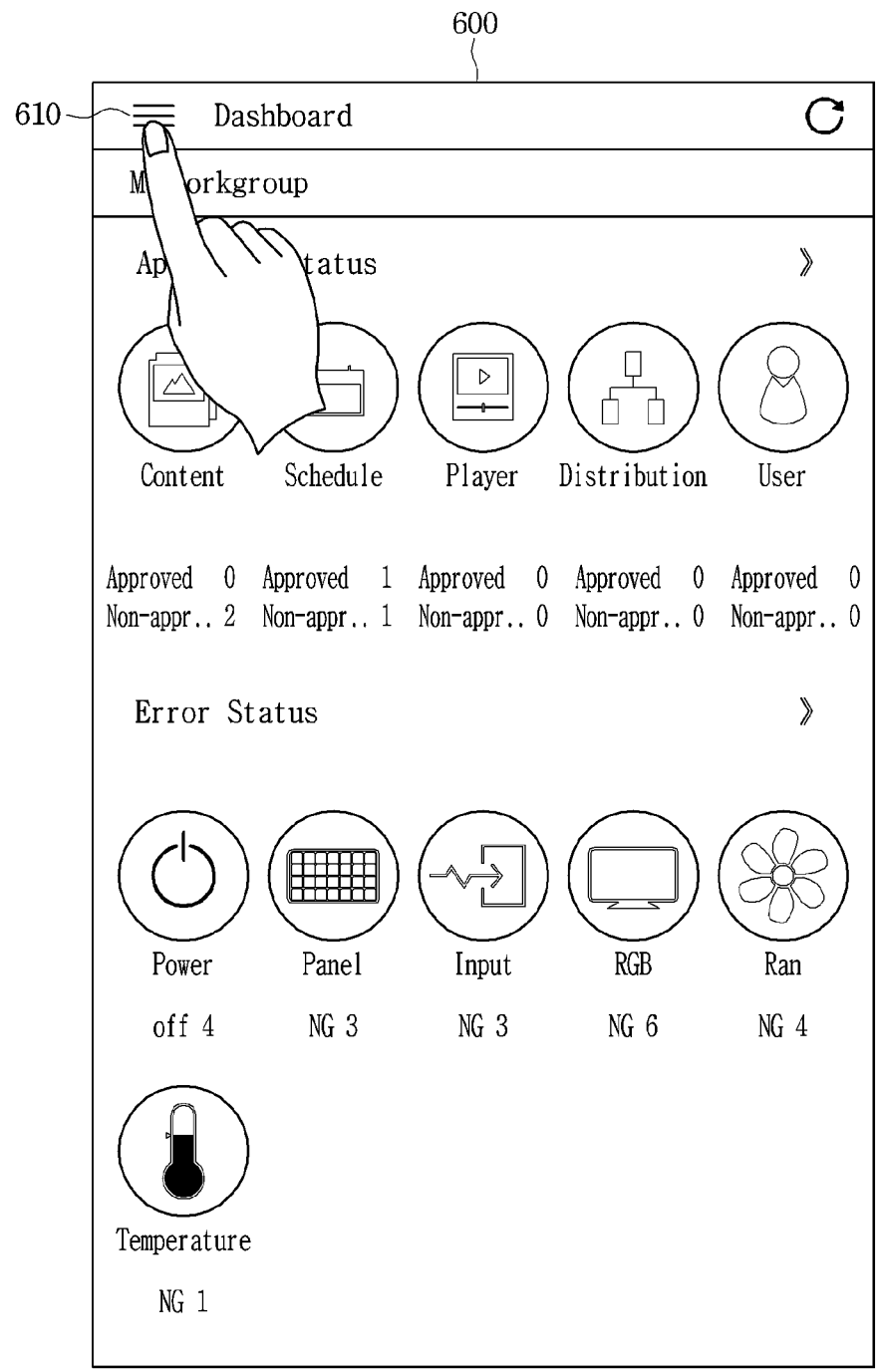
FIG. 6 is a view illustrating a user interface screen provided in the case that a menu button on a main screen is selected according to an embodiment of the present disclosure.
Figure 6B:
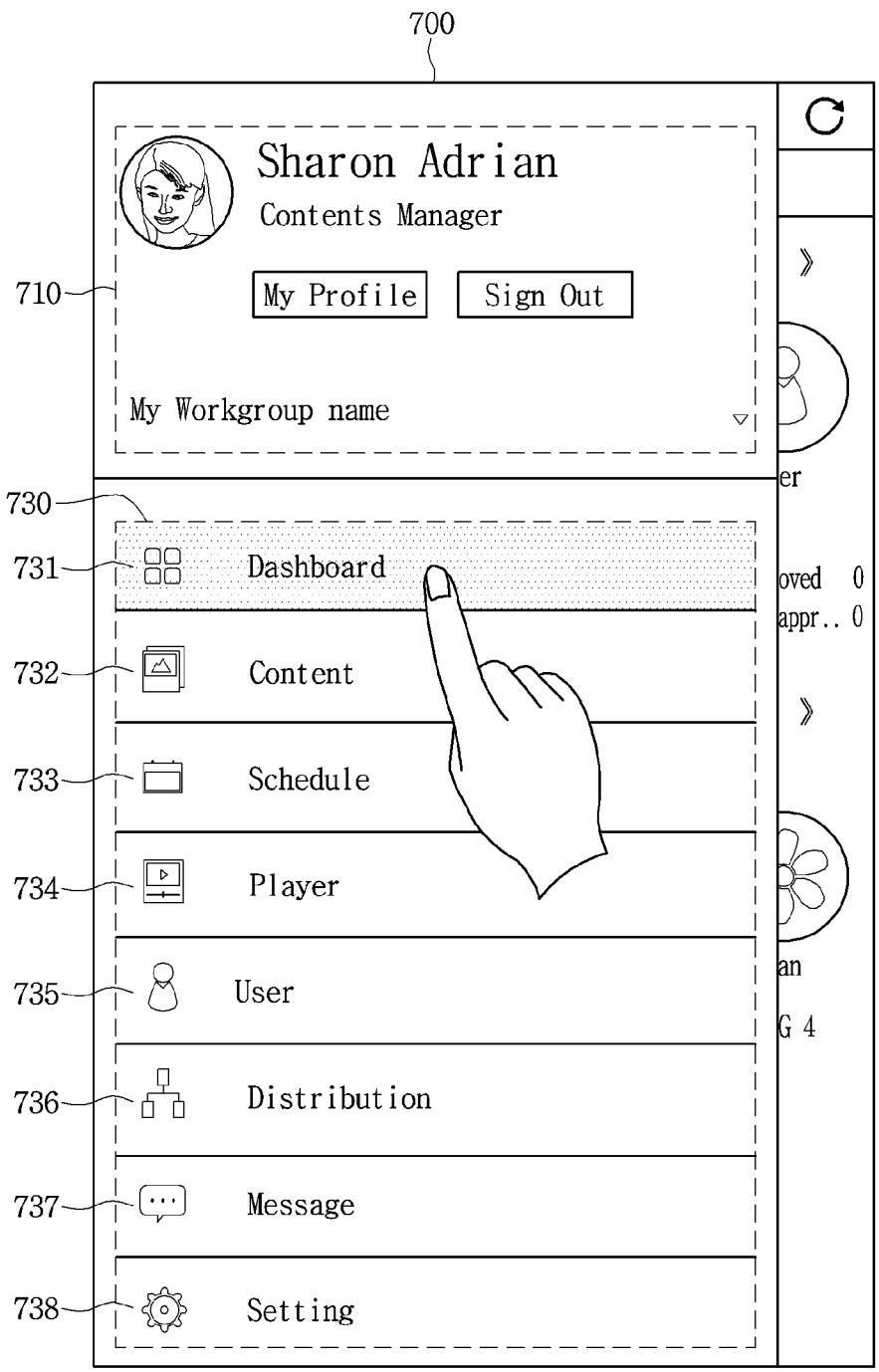

In the case that a menu button 610 is selected on the main screen 600 as illustrated in FIG. 6aA the controller 180 may display a men providing screen 700 through the display unit 151 as illustrated in FIG. 6B. The menu providing screen 700 may include a user information area 710 and a menu list area 730.

The user information area 710 is an area for providing the information on a user who has logged in. The user information area 710 may include information on the name of a user, the authority of the user (contents manager), the profile of the user, a log-out button, and a workgroup of the user. A menu list area 730 may include a menu list including a plurality of menus. The menu list area 730 may include a dashboard menu 731, a content menu 732, a schedule menu 733, a player menu 734, a user menu 735, a distribution menu 736, a message menu 737, and a setting menu 738.

The dashboard menu 731 may be a menu for returning to the menu screen 600 illustrated in FIG. 6A. In other words, in the case that the dashboard menu 731 is selected, the controller 180 may display the menu screen 600. The content menu 732 may be a menu for providing the list of a content item to be provided by the digital signage device 300. The schedule menu 733 may be a menu for providing a schedule item list. The player menu 734 may be a menu for providing player items. The user menu 735 may be a menu for providing the user item list. The distribution menu 735 may be a menu for providing a distribution item list. The message menu 737 may be a menu for setting a message to be transmitted to a specific player item on a player item list. The setting menu 738 may be a menu for the typical settings of the digital signage application.

FIGS. 7 to 35 are views illustrating user interface screens provided in the case that a specific menu is selected on a menu providing screen according to an embodiment of the present disclosure.

Figure 7A:
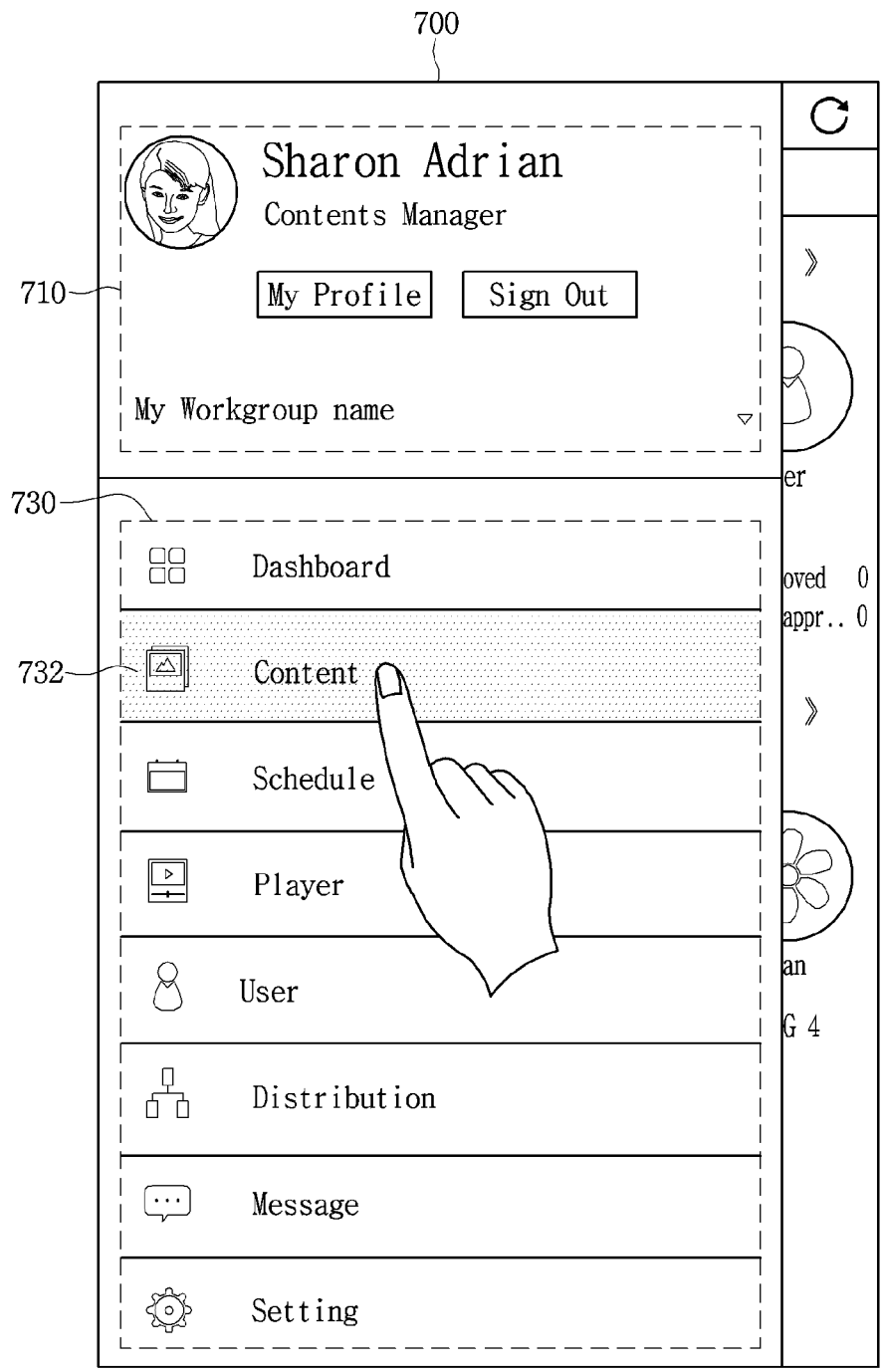
Figure 7B:
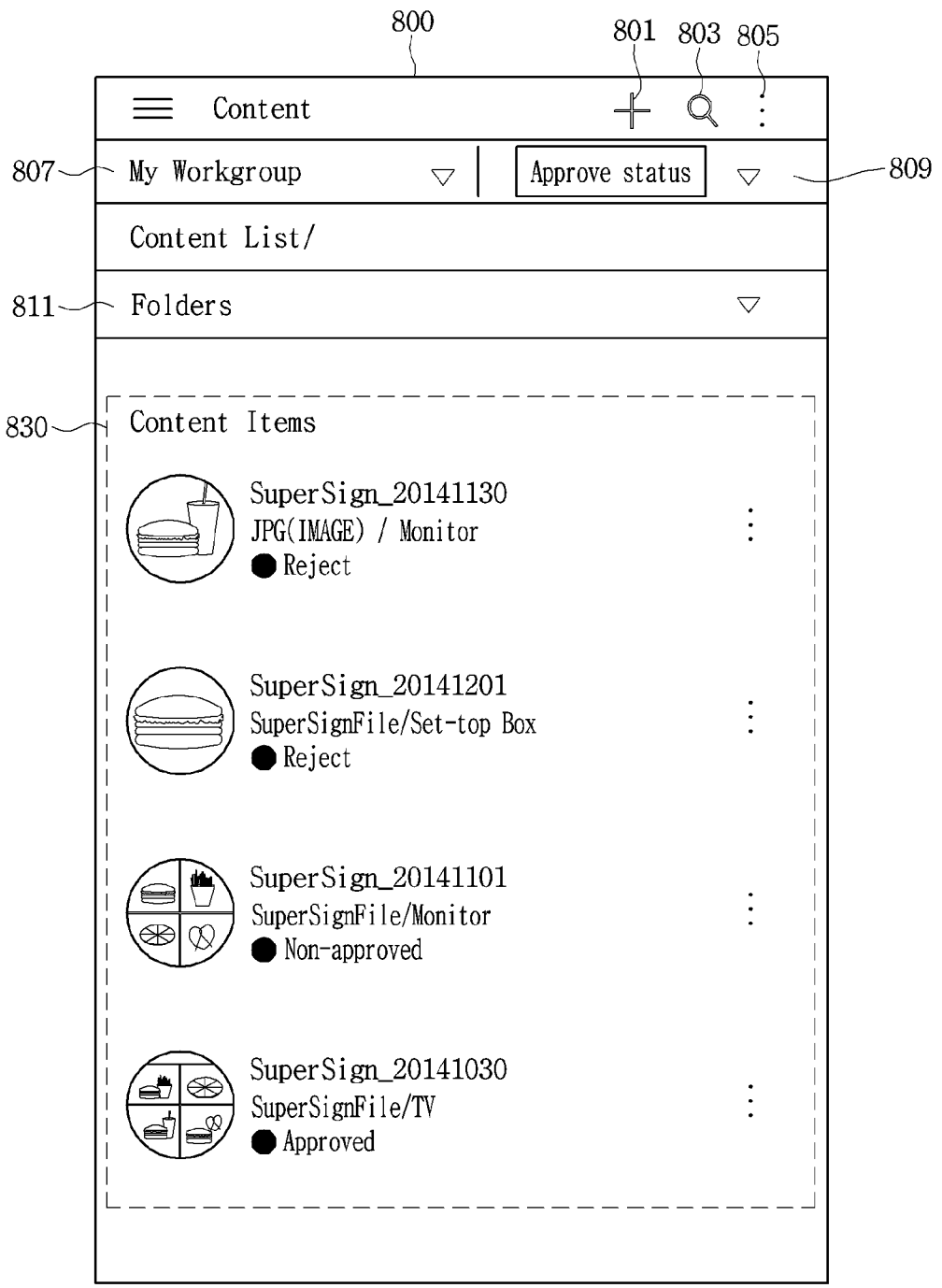

In the case that a content menu 732 is selected as illustrated in FIG. 7A, the controller 180 may display a content screen 800 as illustrated in FIG. 7B. The content screen 800 may include a content item addition icon 801, a content item search icon 803 for providing a function of searching for a content item, a content item sort icon 805, a workgroup button 807 for selecting a work group, an approval status button 809 for sorting the content items according to approval or disapproval status, a folder button 811 for selecting a specific folder among a plurality of folders belonging to the work group, and a content item list 830.

Figure 8A:
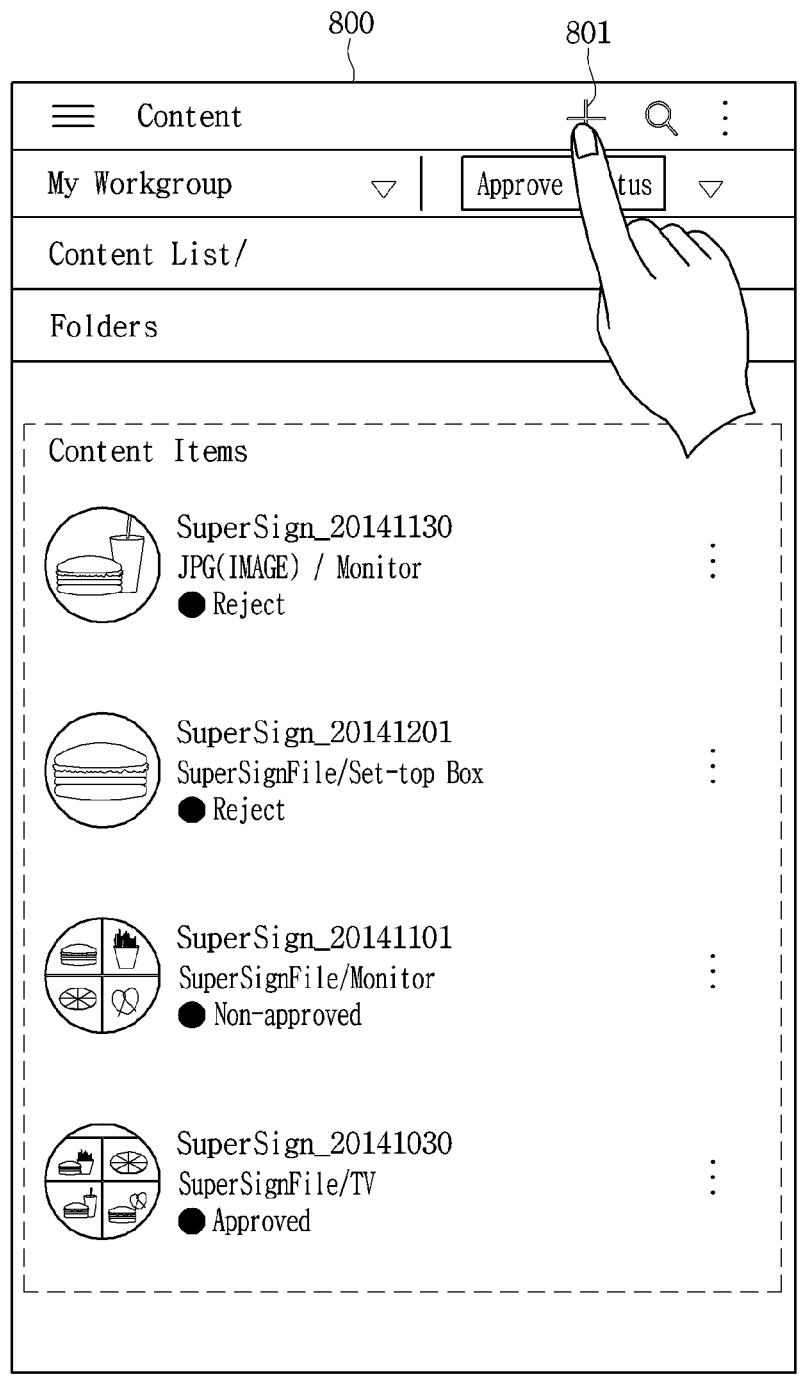
Figure 8B:
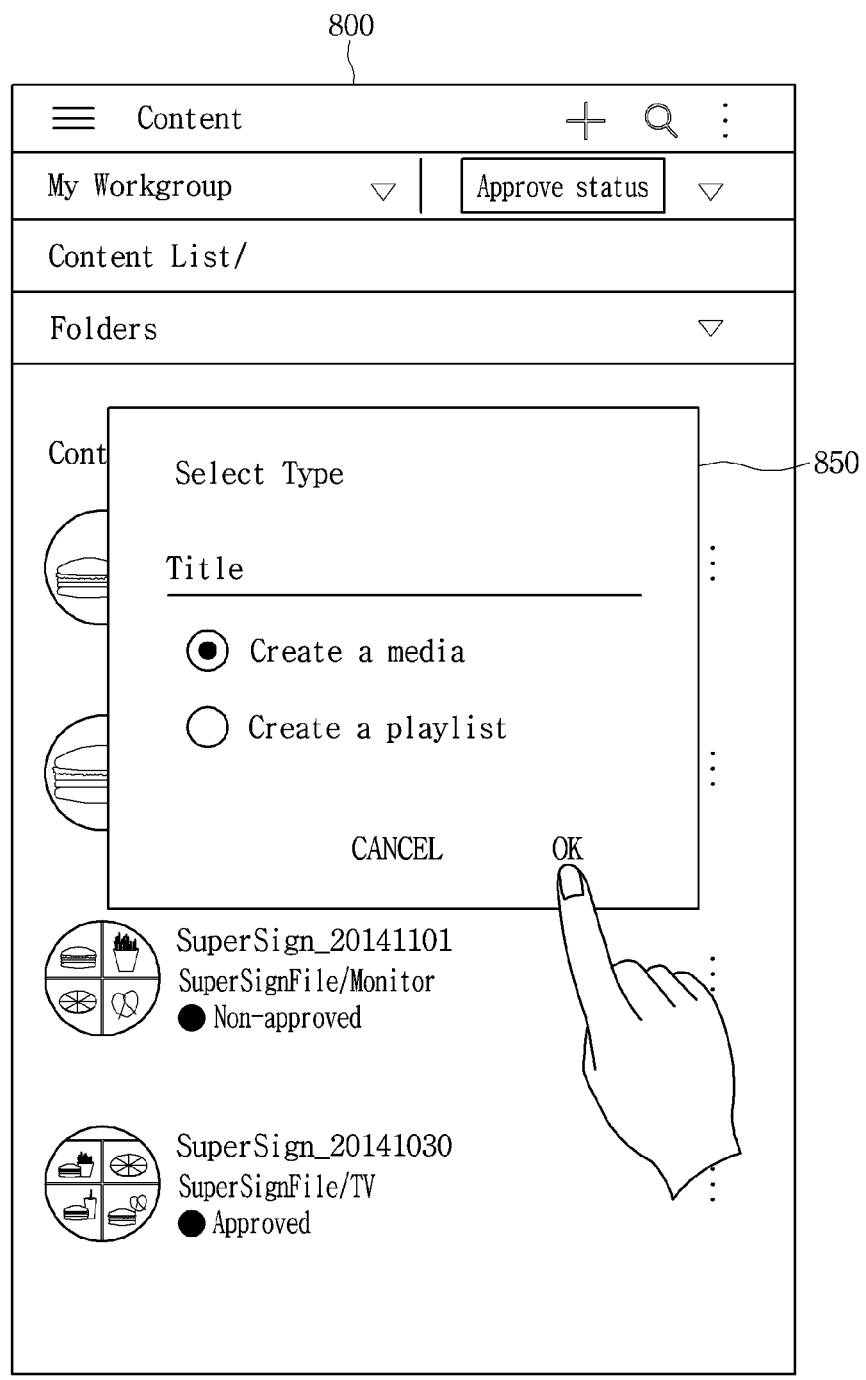
Figure 8C:
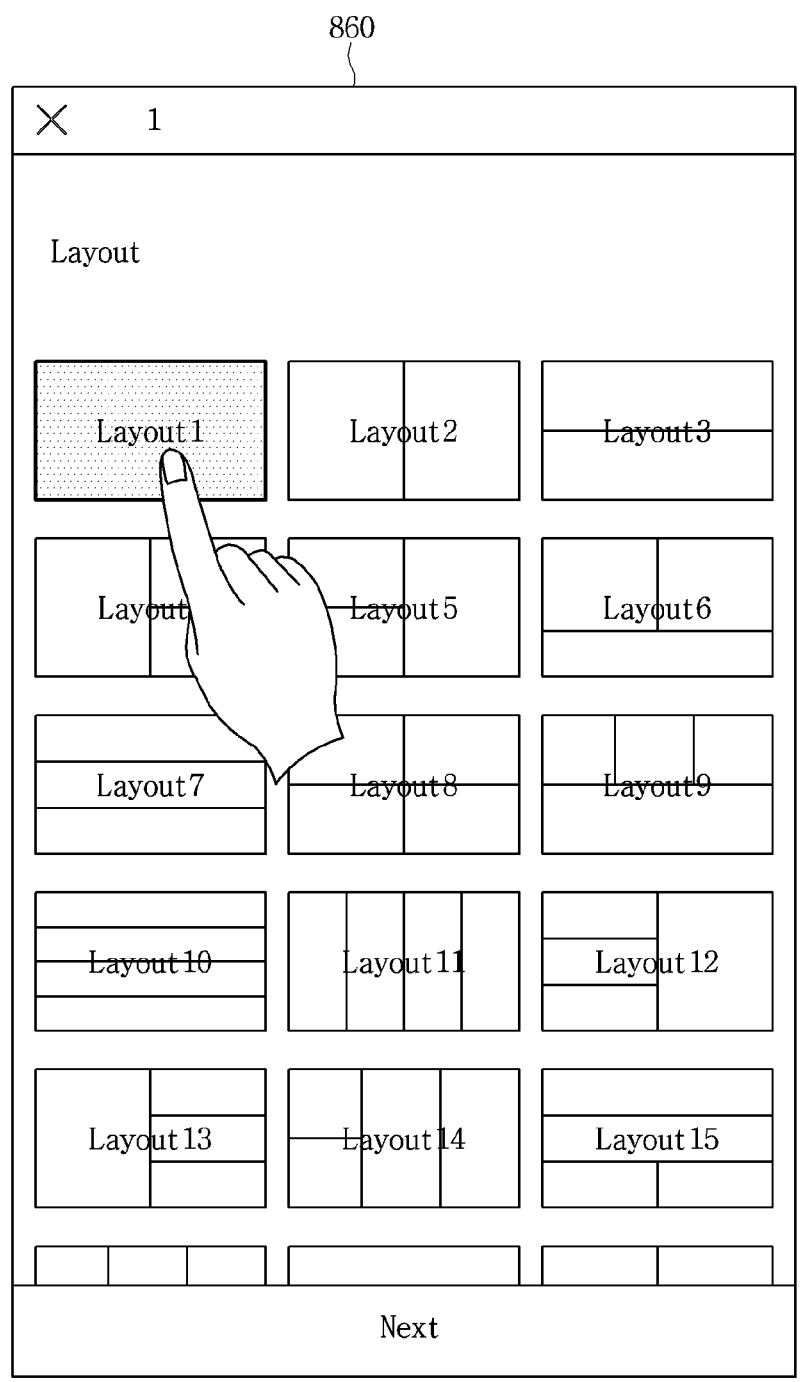
Figure 8D:
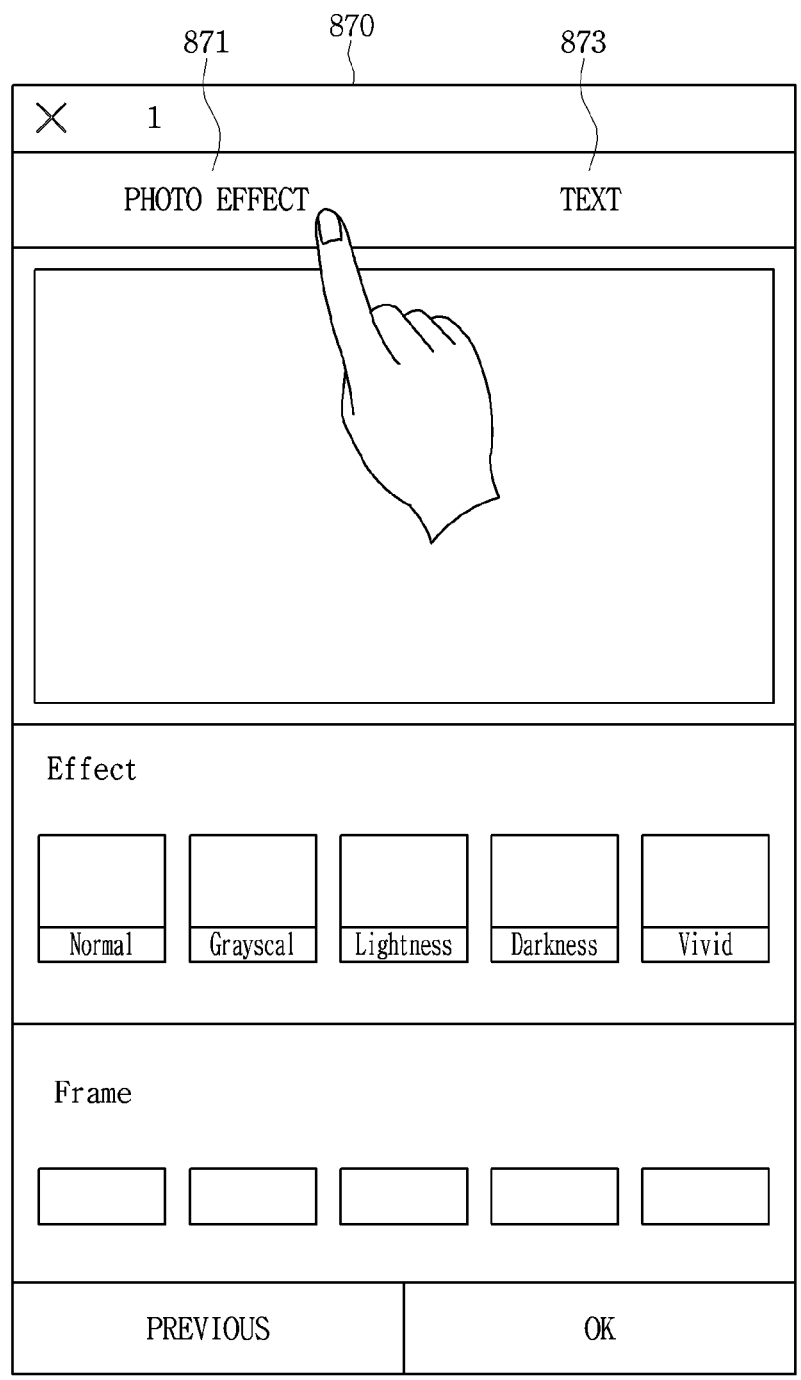

In the case that the content item addition icon 801 is selected as illustrated in FIG. 8A, the controller 180 may display a content creation window 850 for creating a content item or a player list on the content screen 800 as illustrated in FIG. 8B. The content creation window 850 may include a title input item, a content item for selecting a type to be created, and a player list item. If the title is input into the content creation window 850 and the content item is selected, the controller 180 may display a layout screen for setting the layout of the content item as illustrated in FIG. 8C. The layout screen 860 may include a layout list. In the case that any one layout is selected from the layout list, the controller 180 may display a content editing screen 870 for editing a content item based on the selected layout as illustrated in FIG. 8D. The content editing screen 870 may include an effect button 871 for providing various visual effects to the content item and a text button 873 for inputting a text to be input into the content item. In the case that the effect button 871 is selected, the controller 180 may provide, as illustrated in FIG. 8D, a content insertion item for inserting media content to be reproduced in the digital signage device 300 and items for setting a visual effect of the content item and the frame of the content item. According to an embodiment, the media content to be inserted through the content insertion item may be a photo or a moving picture stored in the memory 170 of the mobile terminal 100. In the case that the insertion item is selected, the controller 170 may execute a gallery application for providing photos or moving pictures stored in the memory 170.

The user may insert the photos or the moving pictures into the content insertion item through the executed gallery application. In the case that the text button 873 is selected, the controller 180 may provide, as illustrated in FIG. 9, items for setting a text, a font, a style, and color to be input into the content item.

Figure 10A:
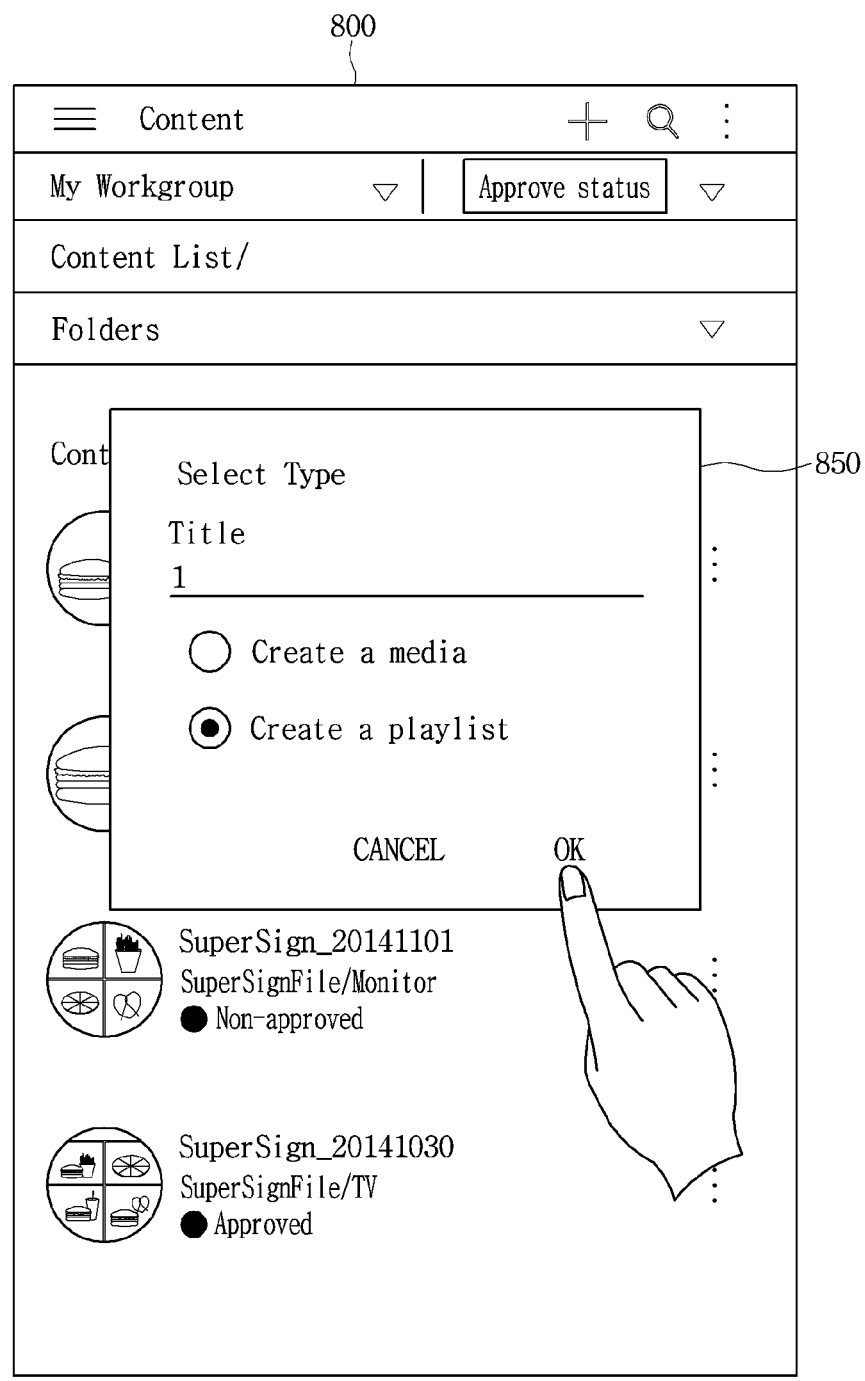
Figure 10B:
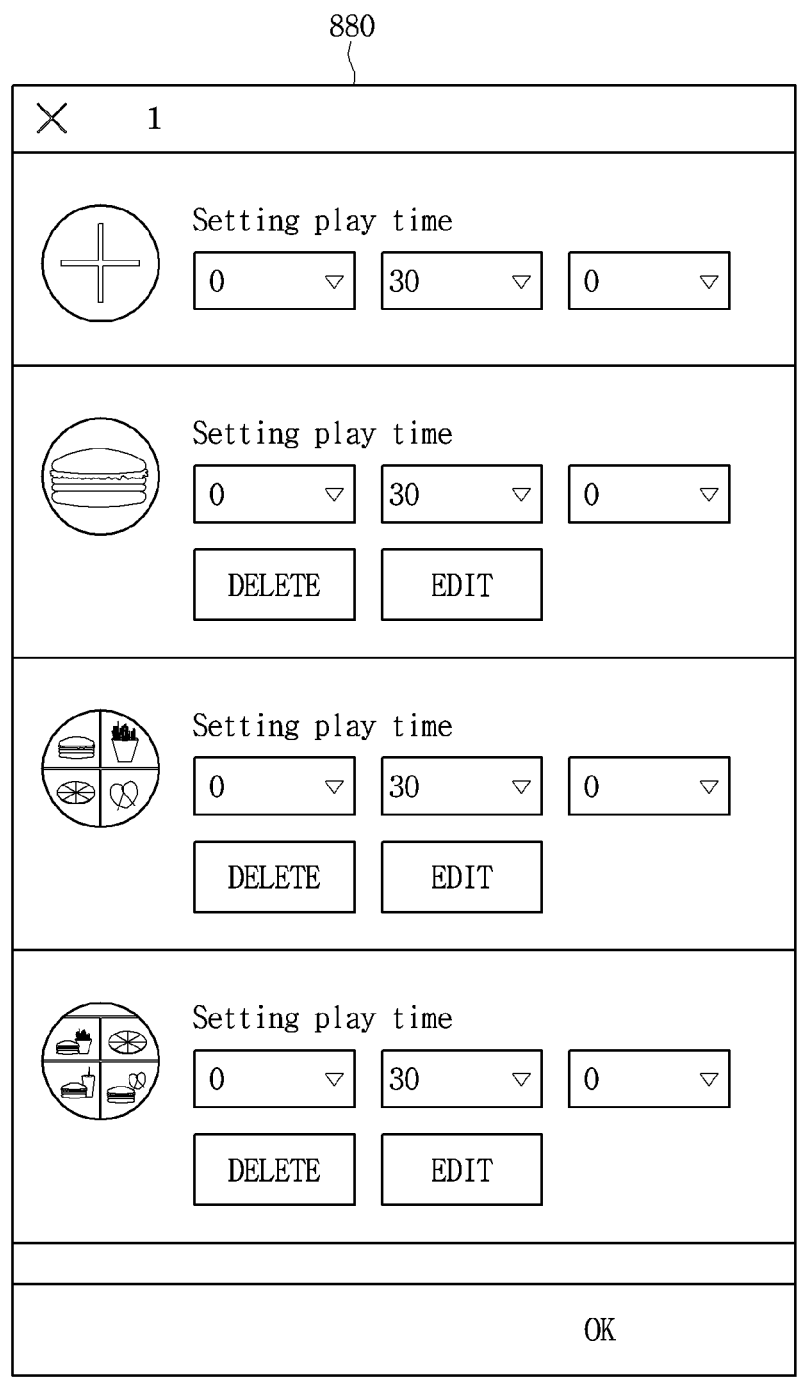
Figure 11A:
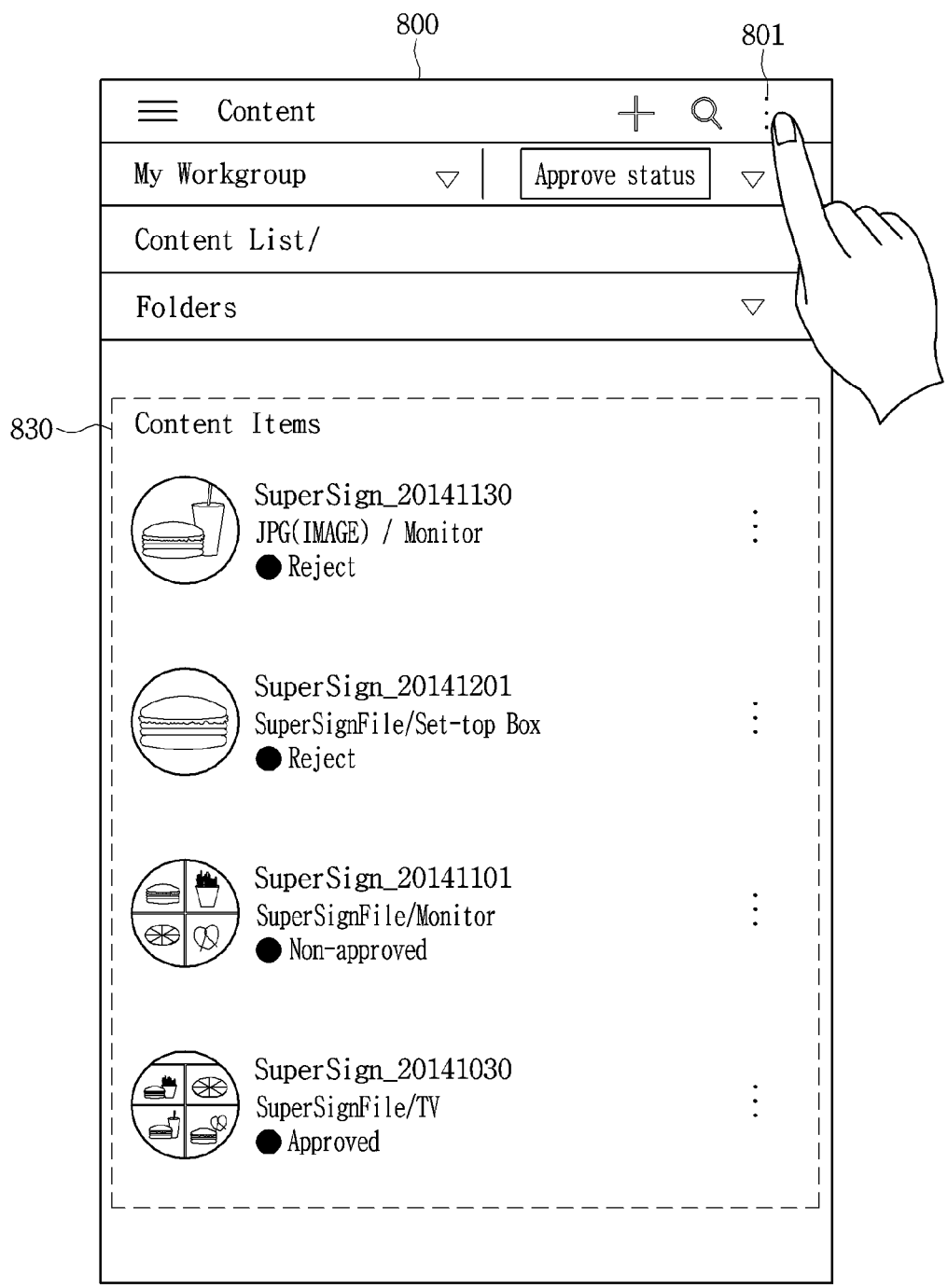
Figure 11B:
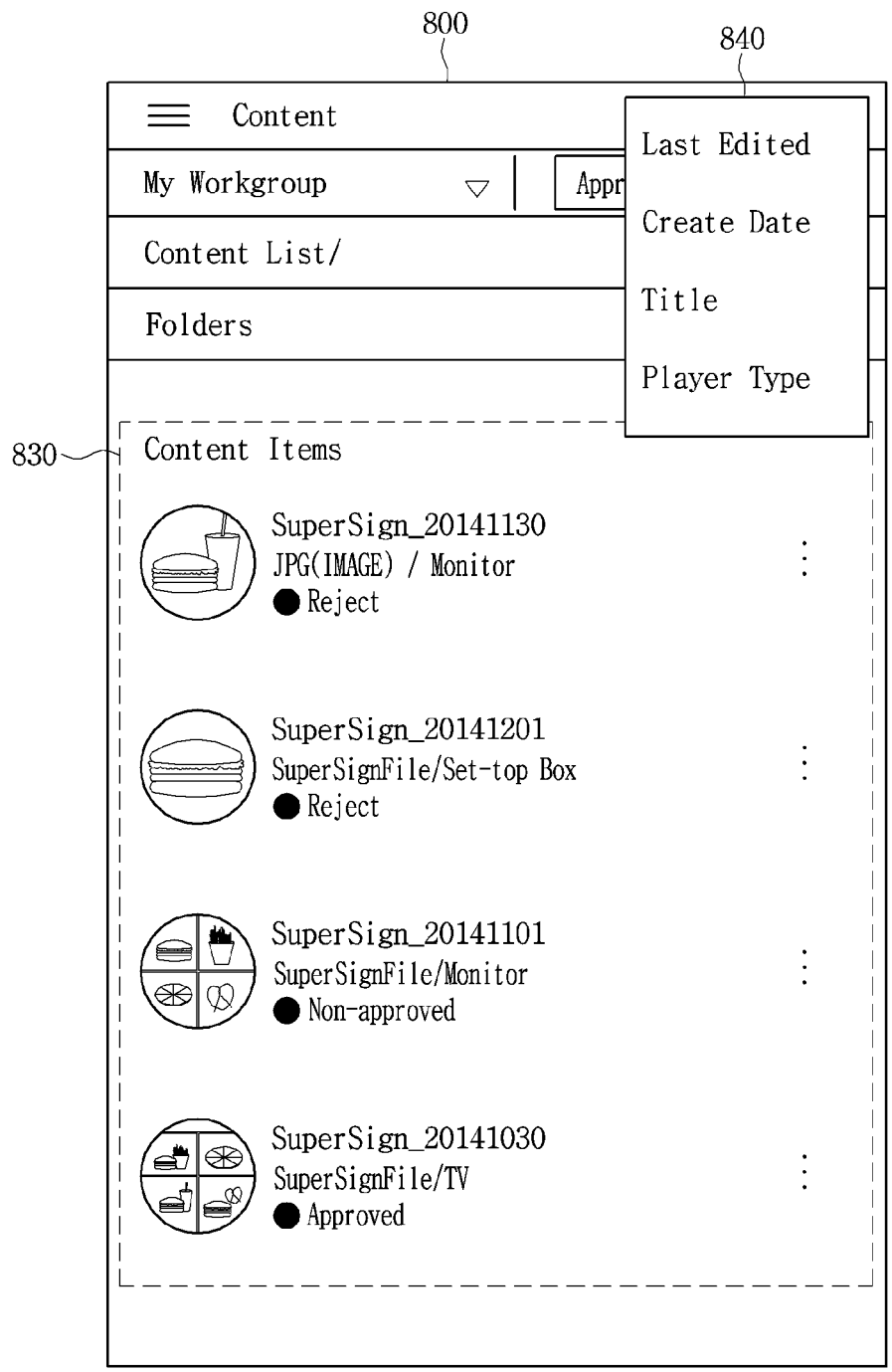

In the case that the title is input into the content creation window 850 and the content item is selected as illustrated in FIG. 10A, the controller 180 may display a reproduction time editing screen 890 allowing a user to edit reproduction time of the content item as illustrated in FIG. 10B.

Meanwhile, in the case that the content item sort icon 840 is selected on the content screen 800 as illustrated in FIG. 10A, the controller 180 displays a content sort list 840 for sorting content items included in the content item list 830 according to a specific criterion as illustrated in FIG. 10B.

The content sort list 840 may include lists of <Last Edited> for sorting content items in the latest edited order, <created date> for sorting the content items in creation order of the content items, <title> for sorting the content items according to the titles of the content items, and <Player Type> for sorting the content items according to player types.

Hereinafter, description will be made with reference to FIG. 12.

Figure 12A:
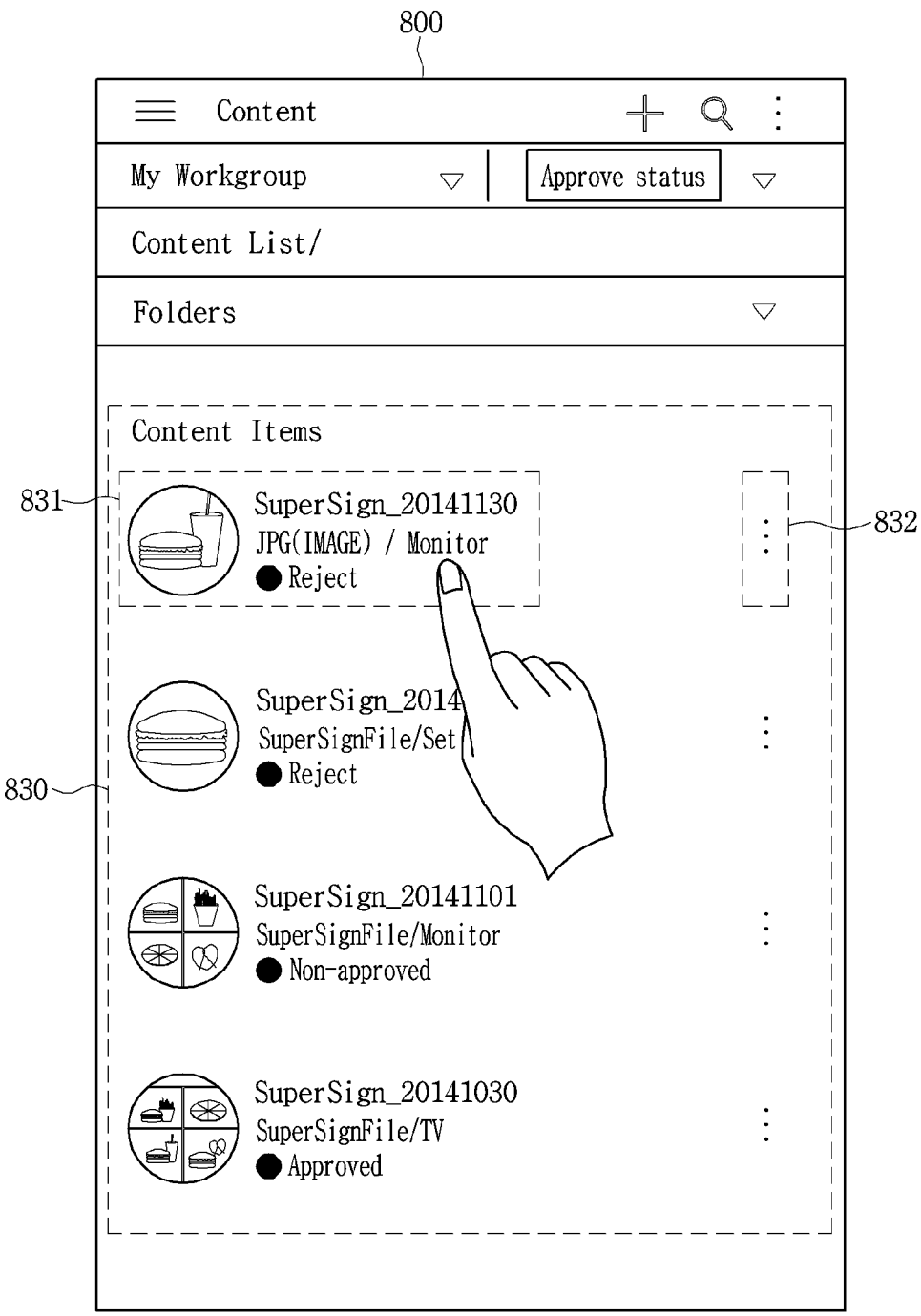
Figure 12B:
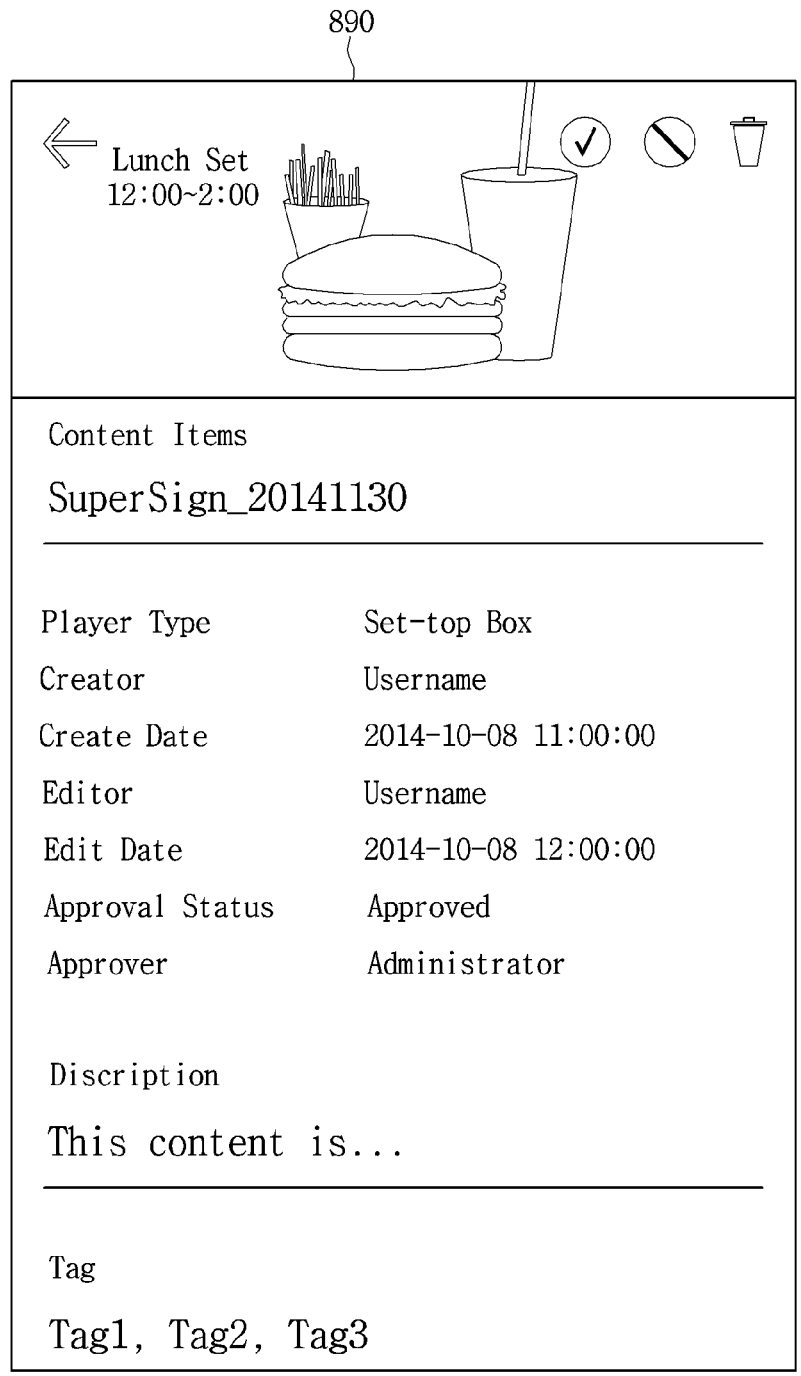

Referring to FIG. 12A, a content item list 830 may include information on a plurality of content items. The information on each content item may include a title of the content item, a type of the content item (e.g., a moving picture or an image), a type of a player (e.g., a monitor, a TV, or a set-top box), and information on an approval status (e.g., approval, disapproval, or rejection). If a first content item 831 is selected, the controller 180 may display a content item detail information screen 890 for the detailed information on the content item illustrated in FIG. 12B. The content item detail information screen 890 may include information on the title, the player type, the creator, the creation date, the editor, the editing date, the approval state, the approver, the content, and the tag of the selected first content item.

Hereinafter, description will be made with reference to FIG. 13.

Figure 13A:
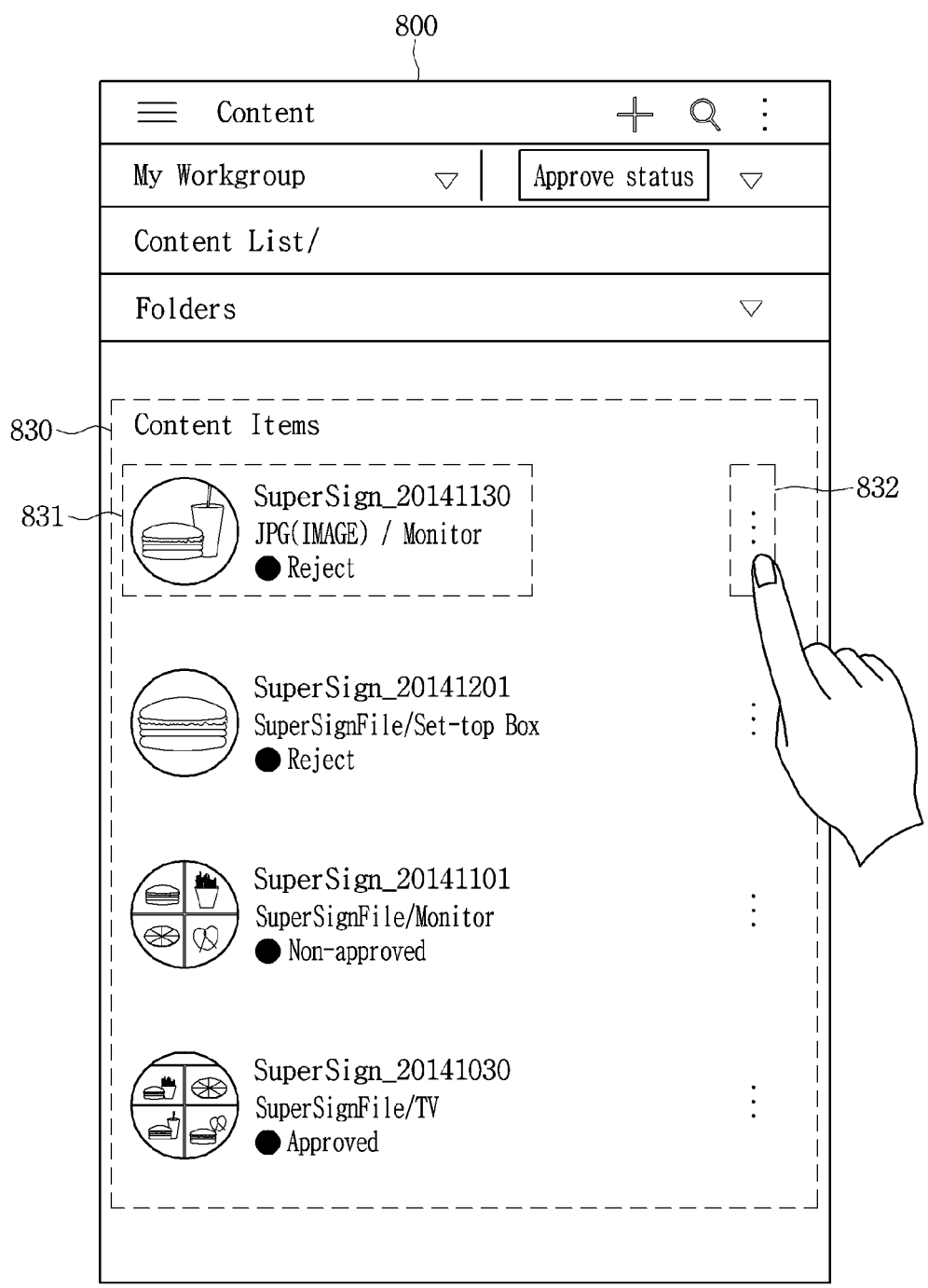
Figure 13B:
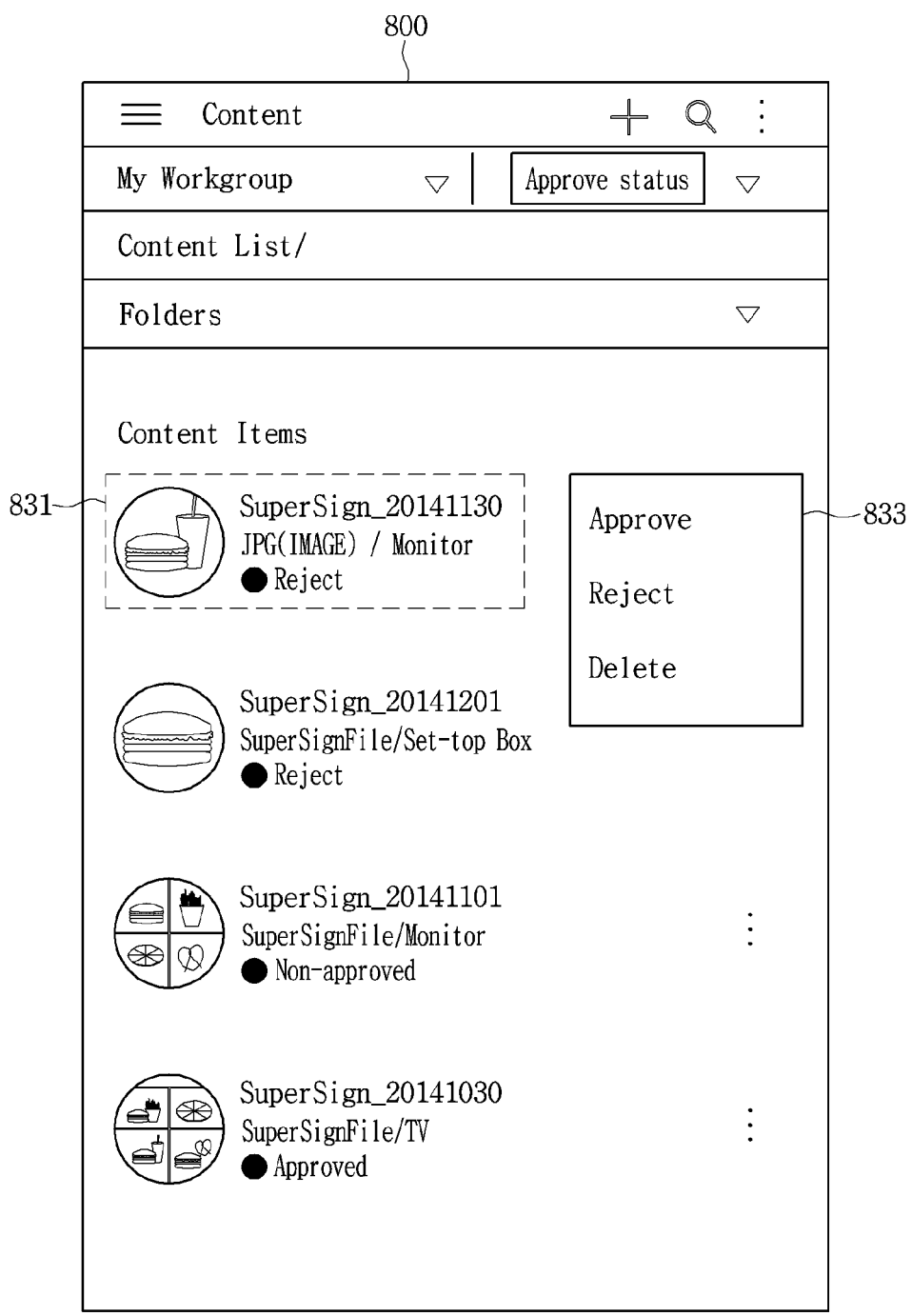

Referring to FIG. 13A, an approval setting icon 832 may be further displayed at one side of a first content item 831. In the case that the approval setting icon 832 is selected, the controller 189 may display approval setting for setting the approval of the first content item 831 as illustrated in FIG. 13B. An approval setting window 833 may include an approval tap for the approval of a content item, a rejection tap for rejecting the content item, and a deletion tap for deleting the content item. If the approval tap is selected, the controller 180 may approve the first content item 831. The controller 180 may transmit, to the server 200, an approval completion request representing that an approval is completed with respect to the first content item 831. The server 200 may transmit, to the digital signage device 300, a reproduction request allowing the digital signage device 300 to reproduce media content corresponding to the approved first content item 831 according to the approval completion request received from the mobile terminal 100. The digital signage device 300 may reproduce the media content corresponding to the approved first content item 831 according to the reproduction request received from the server 200.

Even in the following embodiment, In the case that the approval tap is selected, the controller 180 may transmit, to the server 200, an approval completion request representing that an approval is completed with respect to a schedule item, a player item, or a distribution item. The server 200 may transmit, to the digital signage device 300, a reproduction request allowing the digital signage device 300 to reproduce media content corresponding to the relevant item according to the approval completion request received from the mobile terminal 100. The digital signage device 300 may reproduce the media content corresponding to each approved item according to the reproduction request received from the server 200.

Hereinafter, description will be made with reference to FIG. 14.

Figure 14A:
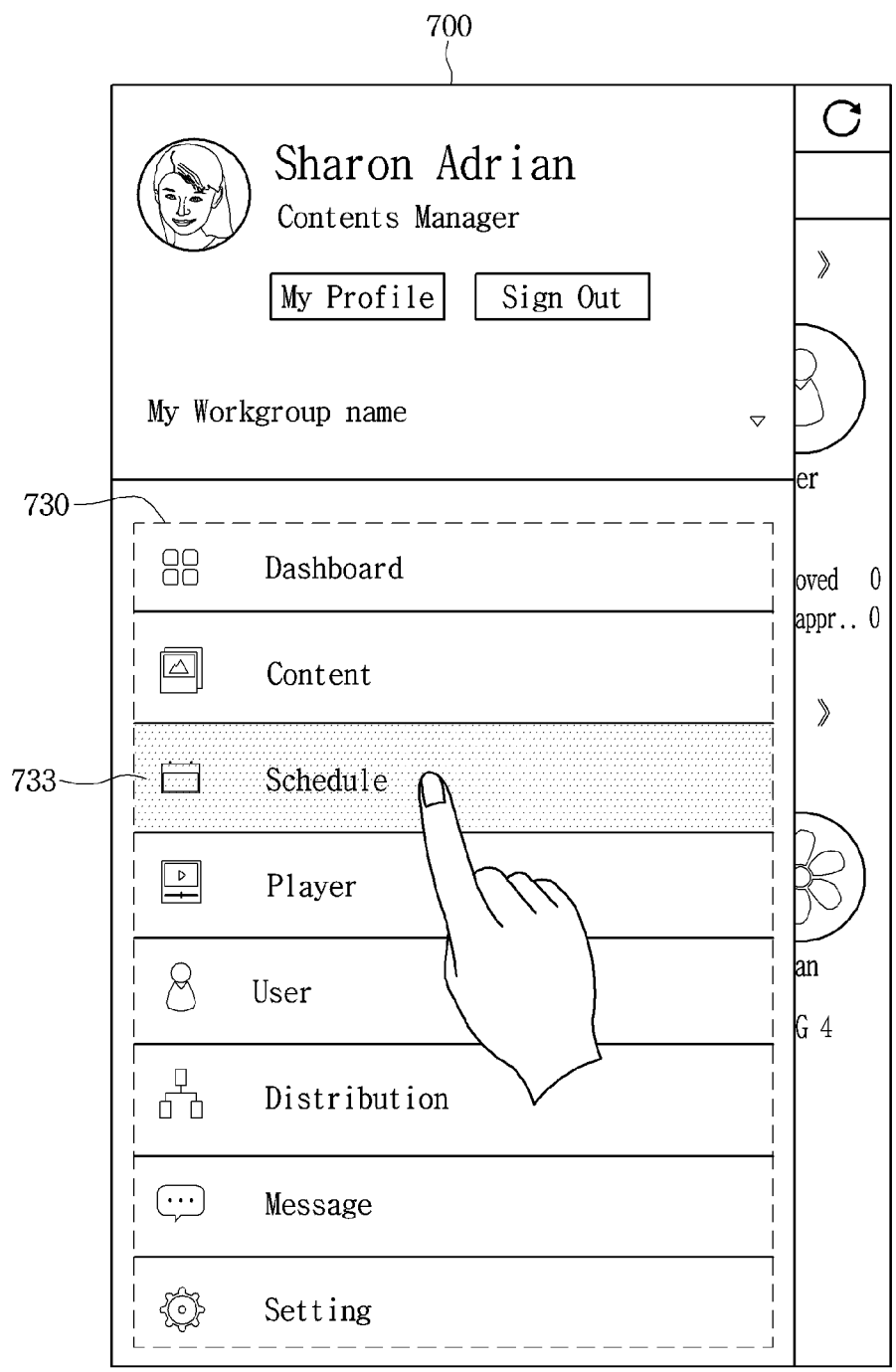
Figure 14B:
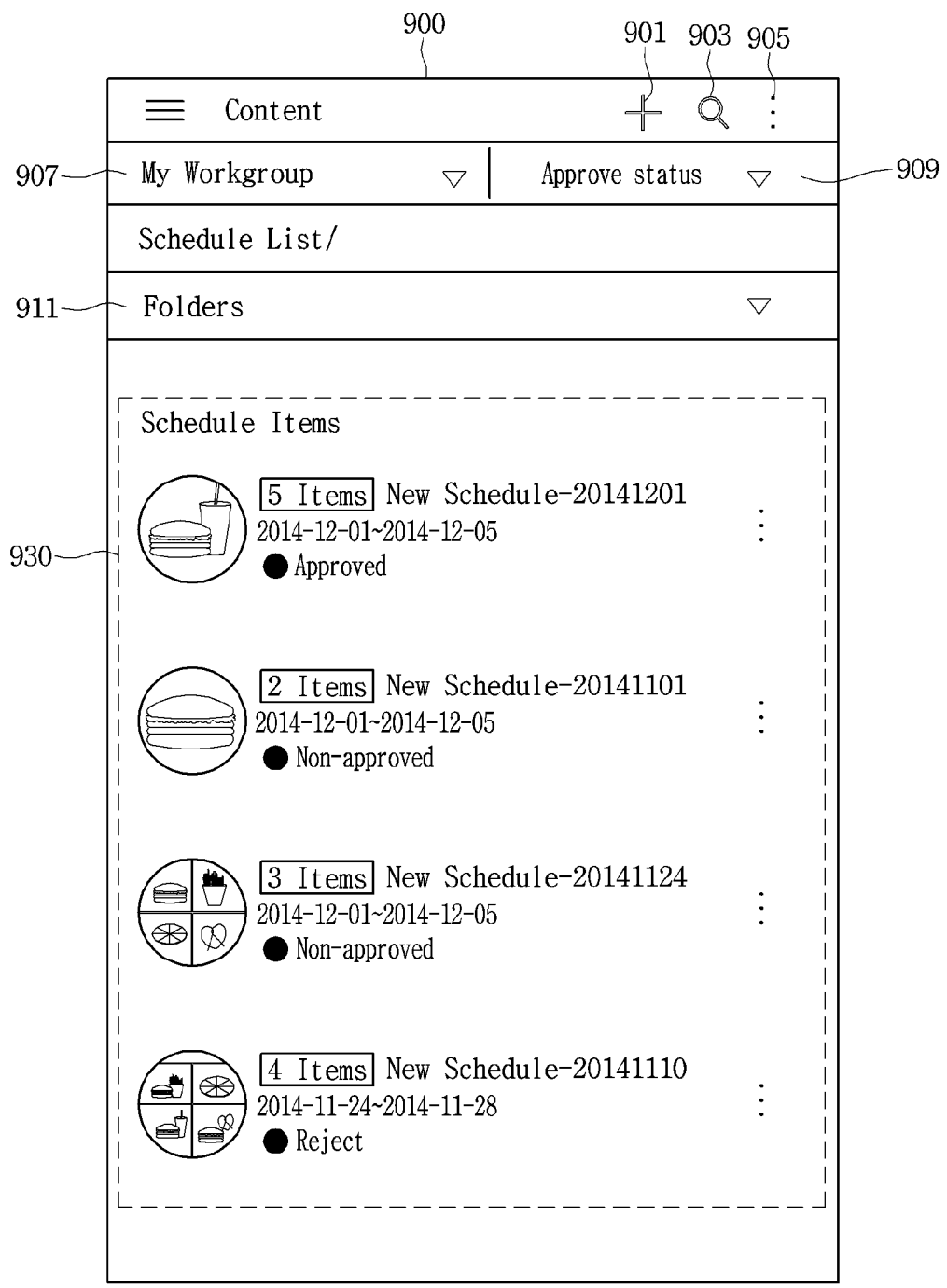

In the case that a schedule menu 733 is selected from the menu providing screen 700 of FIG. 14A, the controller 180 may display a schedule screen 900 as illustrated in FIG. 14B. The schedule screen 900 may include a schedule item addition icon 901, a schedule item search icon 903 for providing a function of searching for a schedule item, a schedule item sort icon 905, a workgroup button 907 for selecting a working group, an approval status button 909 for sorting schedule items according to an approval status or a disapproval state, a folder button 911 for selecting a specific folder among a plurality of folders belonging to the work group, and a schedule item list 930

Hereinafter, description will be made with reference to FIG. 15.

Figure 15A:
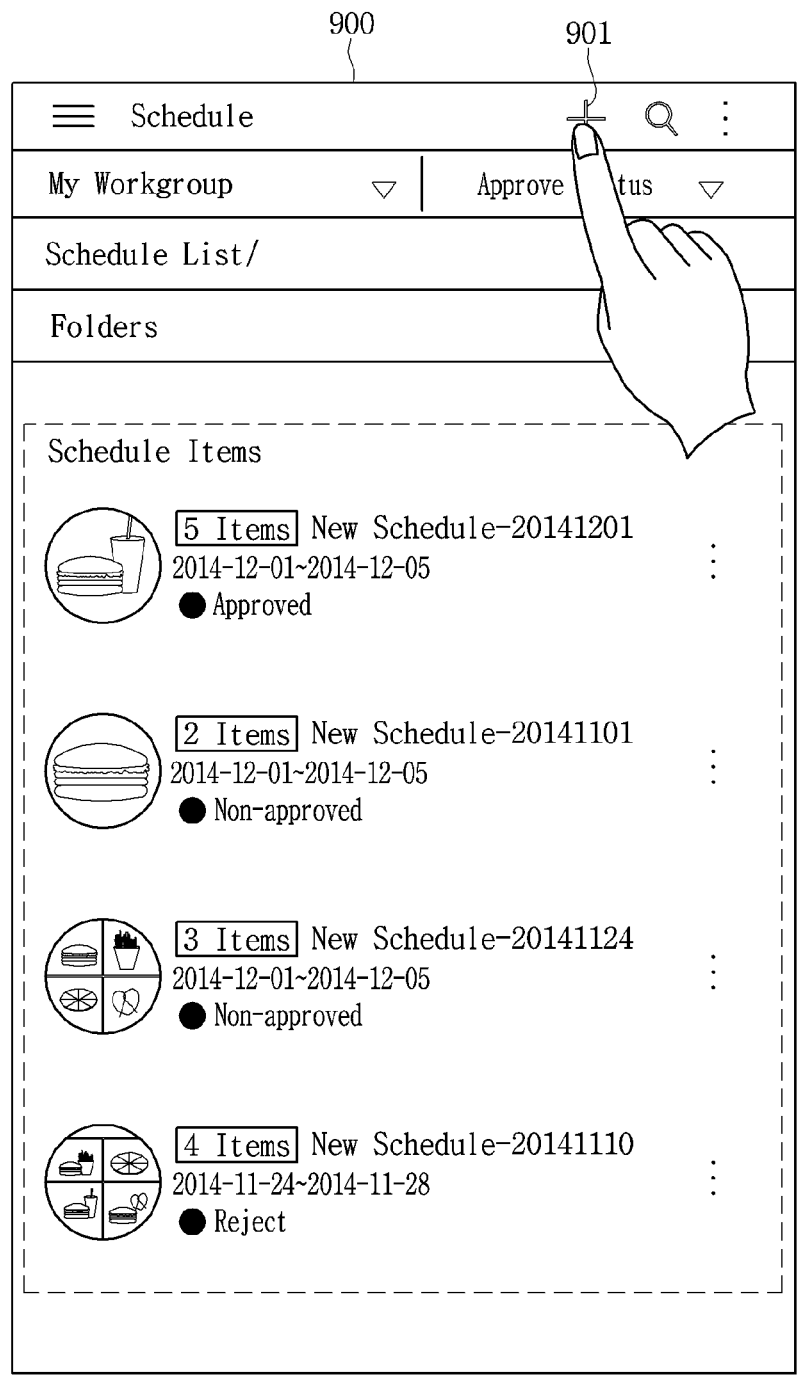
Figure 15B:
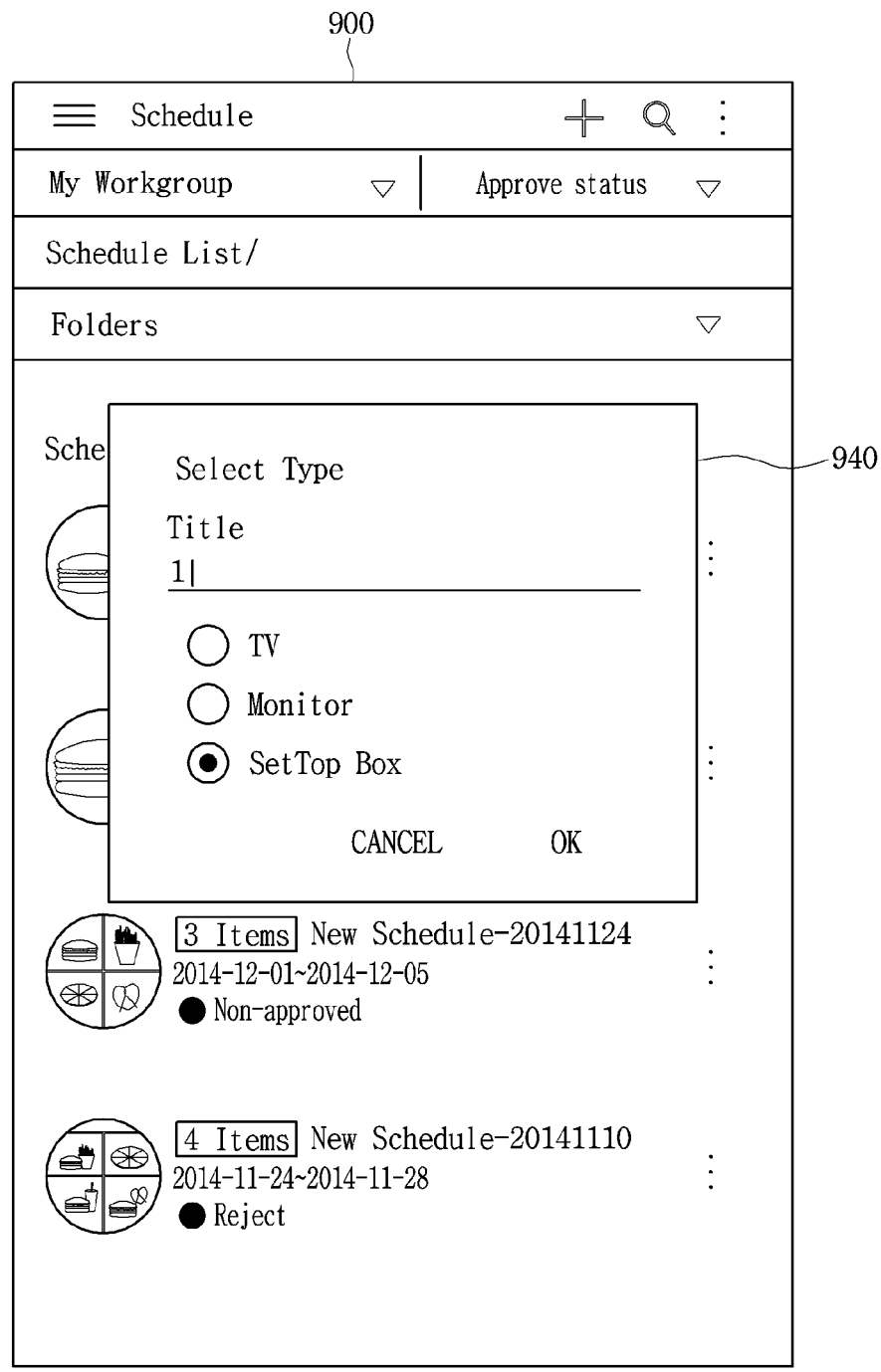

As illustrated in FIG. 15A, in the case that the schedule item addition icon 901 is selected, the controller 180 may display a schedule creation window 850 on the schedule screen 900 as illustrated in FIG. 15B.

The schedule creation window 950 may include a title input item and a player type selection item allowing the player type of a schedule item to be created. If a title is input into the schedule creation window 950, and if any one player type is selected among a TV, a monitor, and a set-top box, the controller 180 may display a schedule setting screen 950 allowing the setting of a content item provided from the digital signage device 300 as illustrated in FIG. 15C. The schedule setting screen 950 may include a date and a plurality of time durations formed by sub-dividing the date. The specific date may include a plurality of time slots corresponding to specific time duration.

Hereinafter, description will be made with reference to FIG. 16.

Figure 16B:
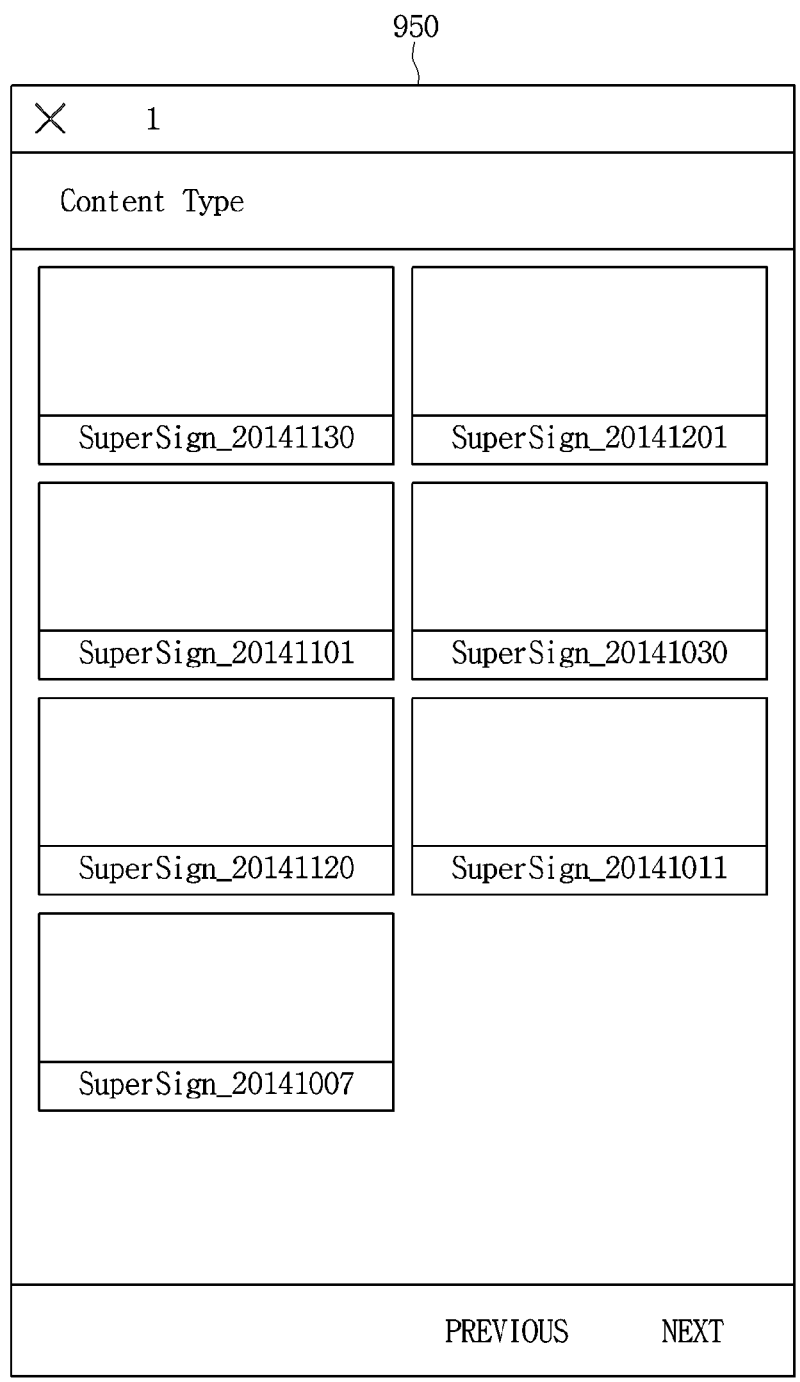

In the case that a time slot corresponding to the specific time duration of the specific date is selected as illustrated in FIG. 16A, the controller 180 may display a content item providing screen 960 allowing the selection of a content item to be reproduced at a time corresponding to the time slot as illustrated in FIG. 16B. In the case that the specific content item is selected from the content item providing screen 960, the controller 180 may display a detailed schedule setting screen 970 allowing the setting of a reproduction starting time, a reproduction termination time, and a repetition cycle of the selected content item as illustrated in FIG. 16C.

Hereinafter, description will be made with reference to FIG. 17.

Figure 17A:
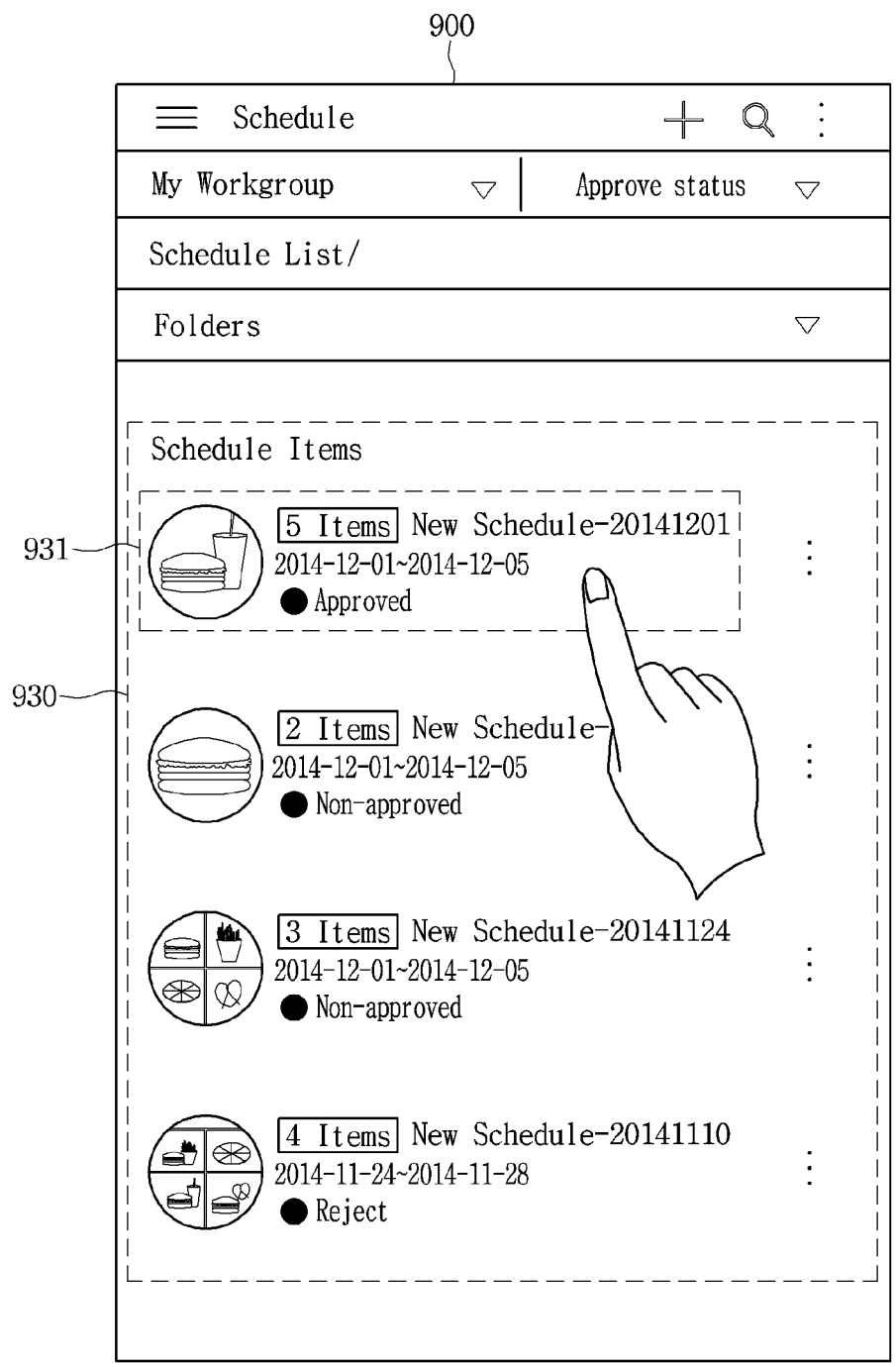
Figure 17B:
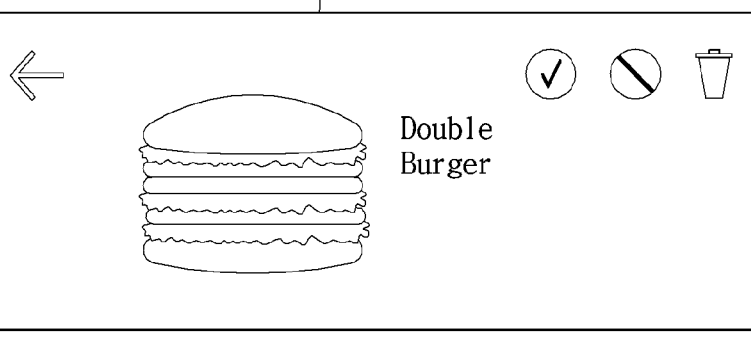

Referring to FIG. 17A, the schedule item list 930 may include information on a plurality of schedule items. The information on each schedule item may include a title, a schedule period, and information (e.g., approval, disapproval, or rejection) on an approval status of a schedule item. If the schedule item 931 is selected, the controller 180 may display a schedule item detail information screen 980 as illustrated in FIG. 17B. The schedule item detail information screen 980 may include a title and a player type of the selected schedule item, a period in which a content item is reproduced, a creator, a creation date, an editor, an editing date, an approval state, an approval, the content of a content item, and information on the tag.

Hereinafter, description will be made with reference to FIG. 18.

Figure 18A:
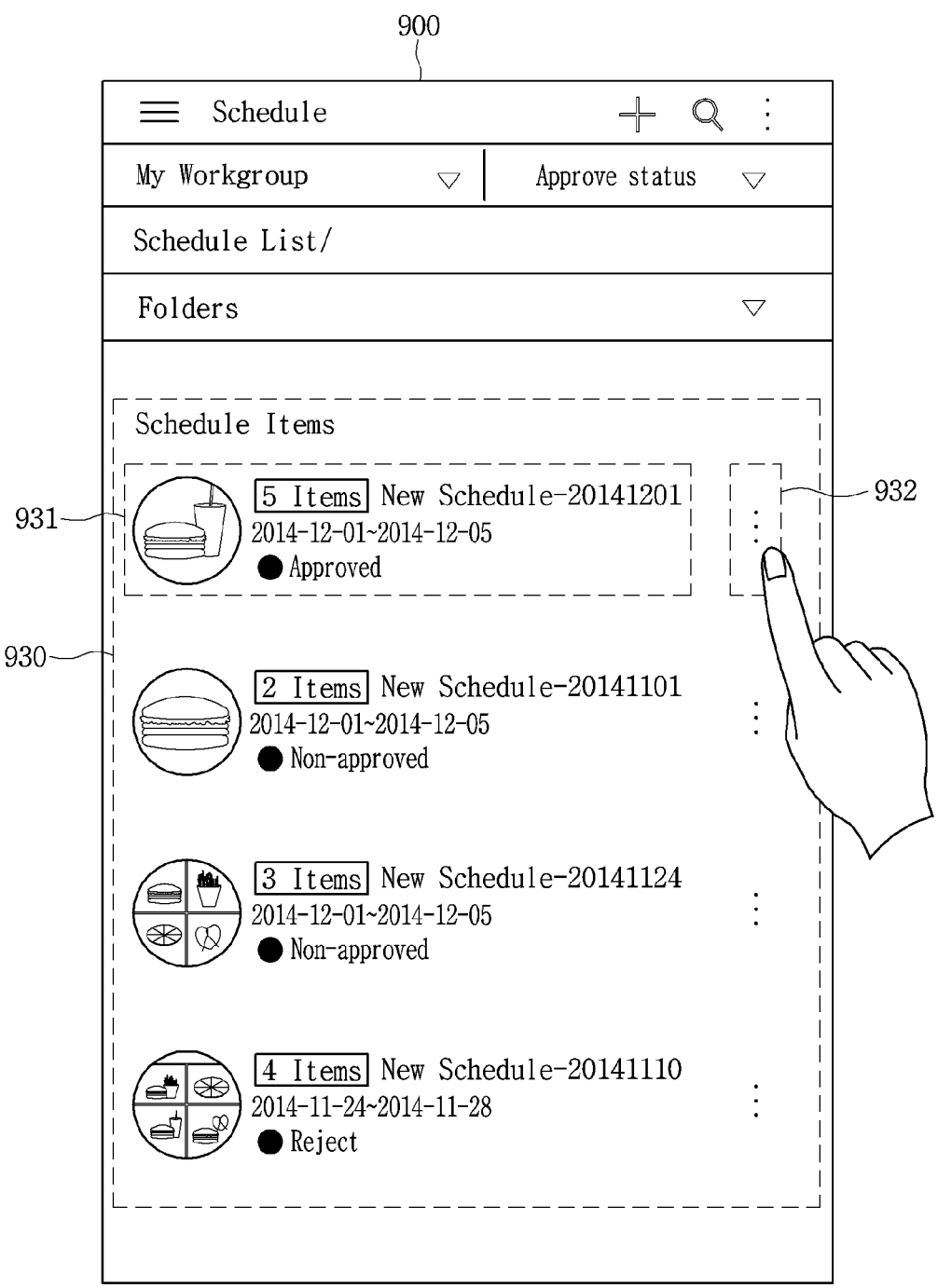
Figure 18B:
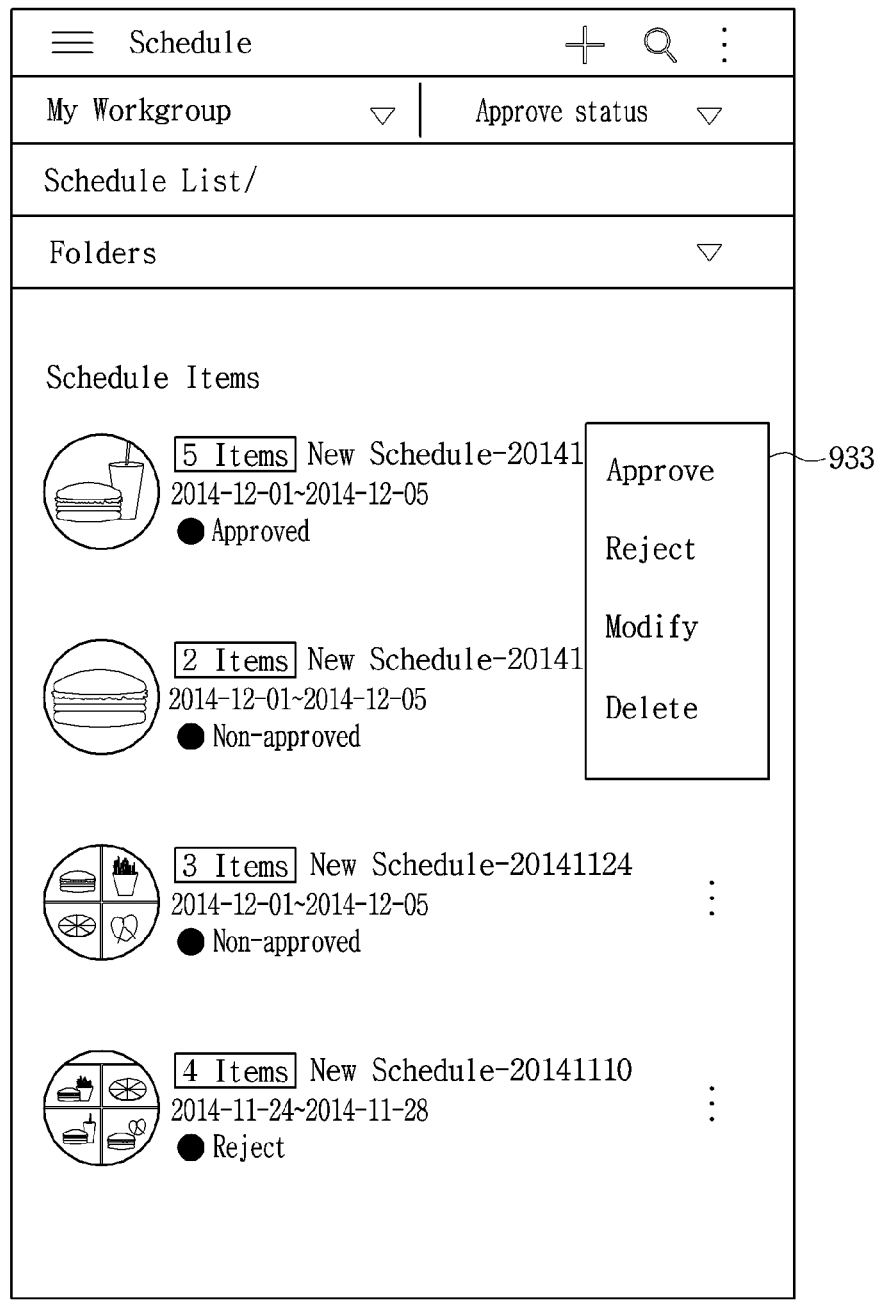

Referring to FIG. 18A, an approval setting icon 932 may be further displayed at one side of the schedule item 931. In the case that an approval setting icon 932 is selected, the controller 180 may display an approval setting window 933 for setting the approval of the schedule item 931 as illustrated in FIG. 18B. The approval setting window 933 may include an approval tap for approving a schedule item, a rejection tap for rejecting the schedule item, a correction tap for correcting the approval of the schedule item, and a deletion tap for deleting the schedule item.

Hereinafter, description will be made with reference to FIG. 19.

Figure 19A:
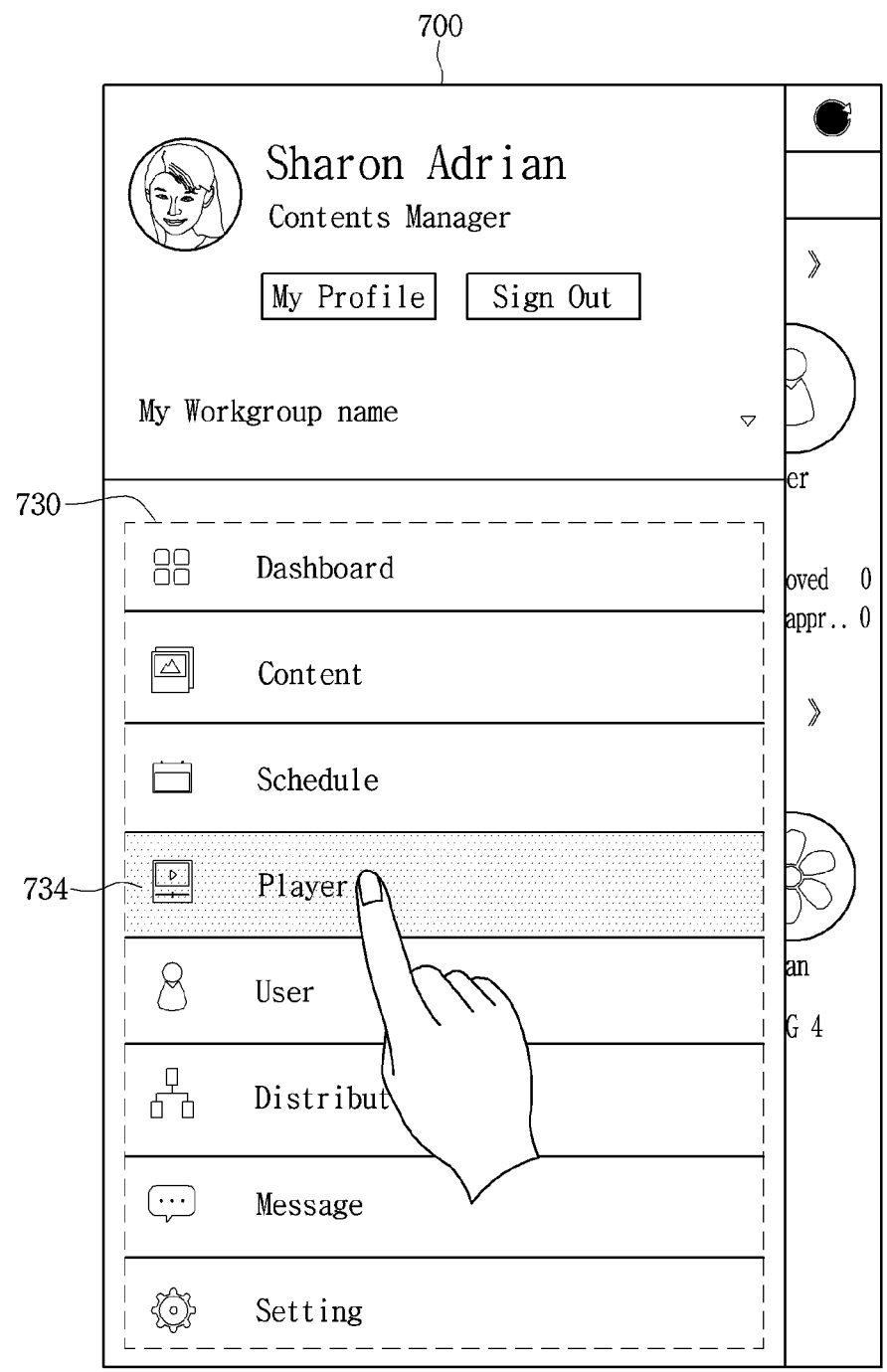
Figure 19B:
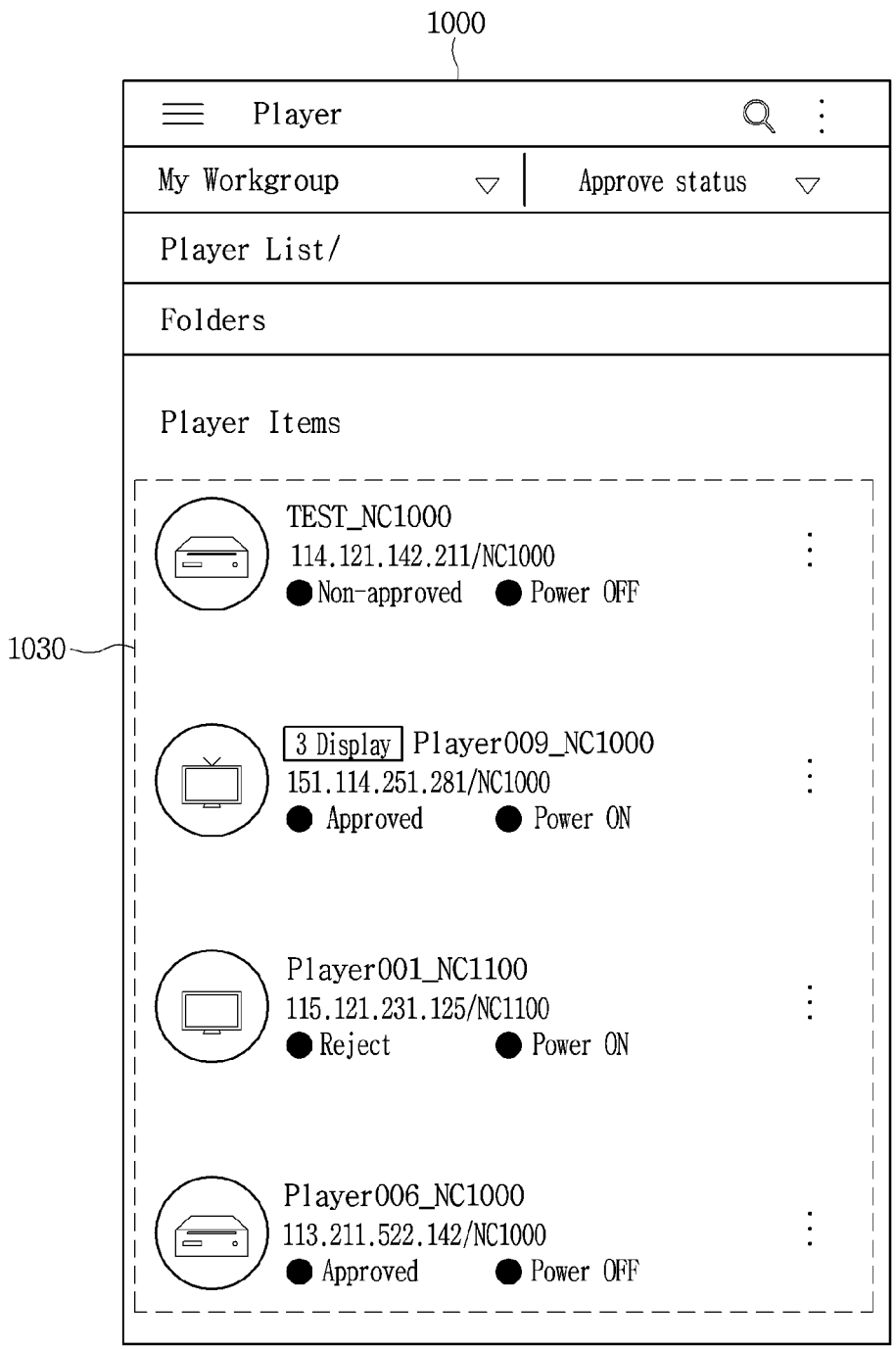

In the case that a player menu 734 is selected from the menu providing screen 700 as illustrated in FIG. 19A, the controller 180 may display a player screen 1000 as illustrated in FIG. 19B. The player screen 1000 may include a schedule item search icon for providing a function of searching for a player icon, a player icon sort icon, a workgroup button for selecting a work group, an approval status button for sorting player items according to an approval status or a disapproval state, a folder button for selecting a specific folder among a plurality of folders belonging to the work group, and a player item list 1030.

The player item list 1030 may include information on a plurality of player items. The information on each player item may include a title of a player item, an IP address of a player, information (e.g., approval, disapproval, or rejection) on an approval state, and information on a power on/off status of the player.

Figure 20A:
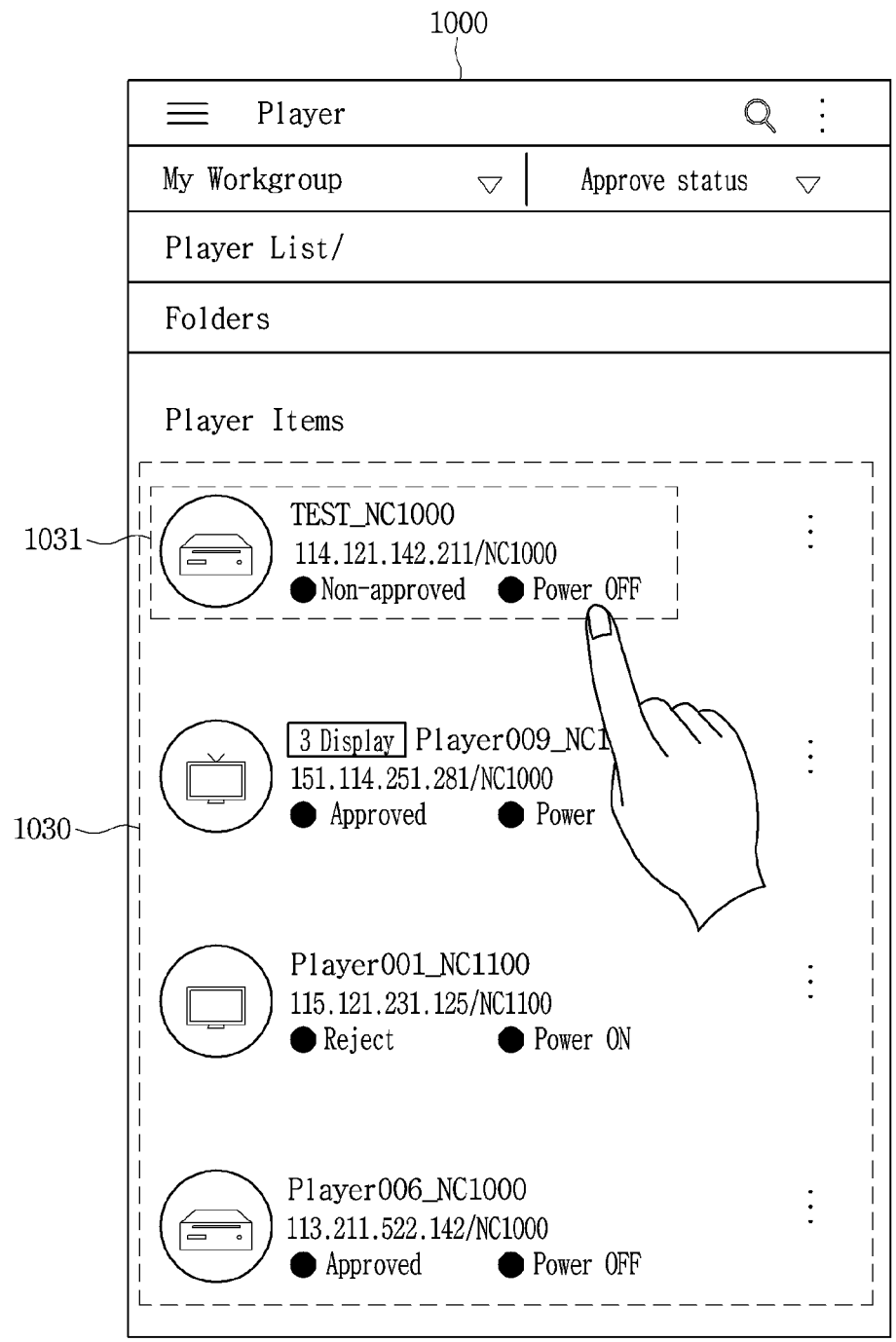
Figure 20B:
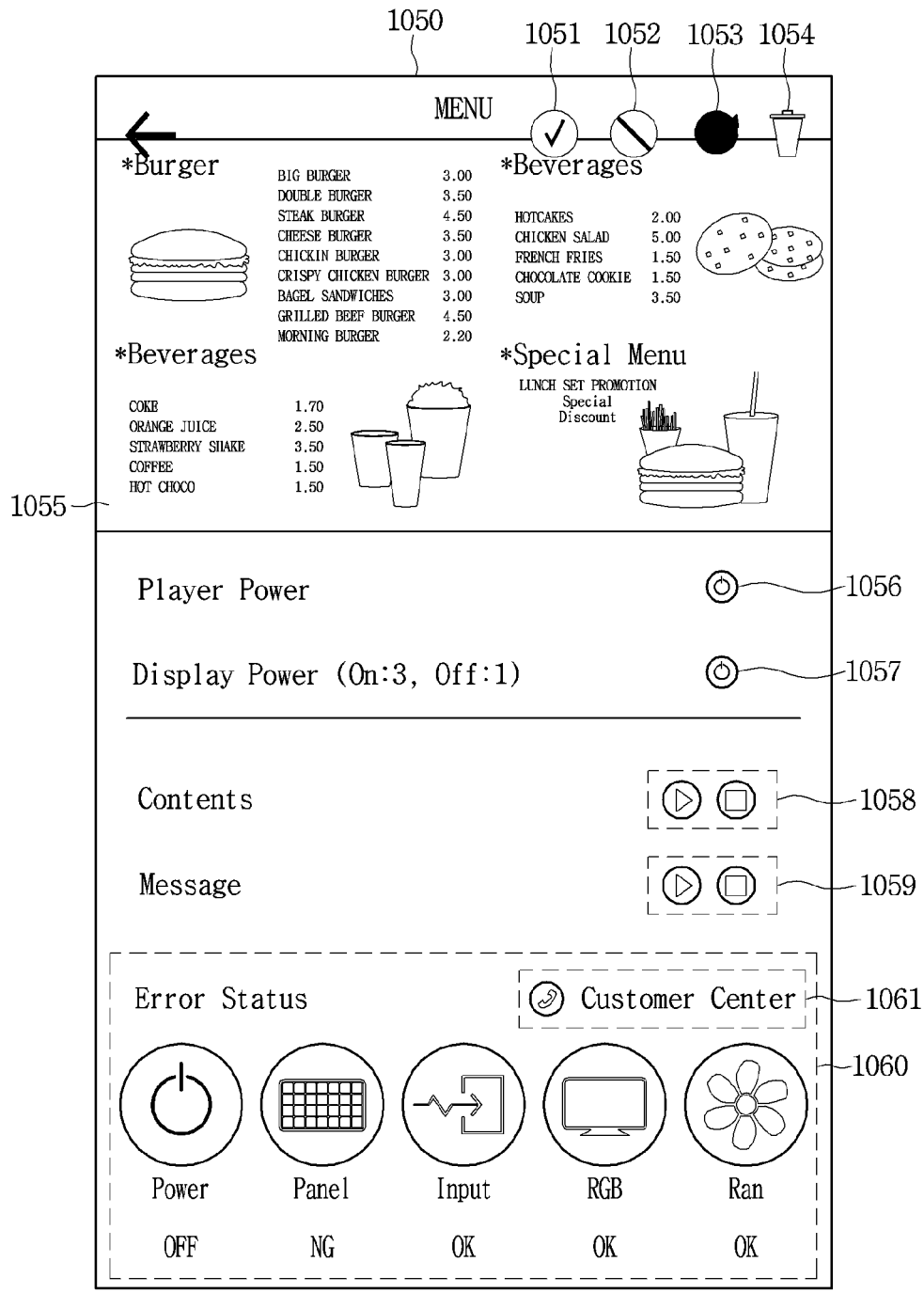

If a player item 1031 is selected as illustrated in FIG. 20A, the controller 180 may display a player item detail information screen 1050 as illustrated in FIG. 20B. The player item detail information screen 1050 may include an approval confirmation icon 1051 for approving the selected player item, an approval rejection icon 1052 for rejecting the selected player item, a refresh icon 1053, a deletion icon 1054 for deleting the selected player item, a capture image display area 1055 of media content reproduced by the player corresponding to the selected player item, a player power control icon 1056, a power control icon 1057 of a display device connected with a player, a reproduction control icon 1058 of the media content, a reproduction control icon 1059 of an urgent message, an error status providing area 1060 of notifying an error status of the digital signage device 300, and a service center connection icon 1061.

In the case that the approval confirmation icon 1051 is selected, the approval of the selected player item may be completed. If the approval rejection icon 1052 is selected, the approval of the selected player item may be rejected.

In the case that the refresh icon 1053 is selected, the information on a player corresponding to the selected player item may be updated. At a time point in which the refresh icon 1053 is selected, the capture image of the media content which is being reproduced by the digital signage device 300 may be provided to a capture image display area 1055. In the case that the refresh icon 1053 is selected, the controller 180 may request a server 200 to provide a capture image of content reproduced by the player. The server 200 may transmit, to the mobile terminal 100, the capture image of the content, which is being reproduced by the player, in response to the received request. The mobile terminal 100 may display the capture image of the content received from the server 200 on the display area 1055.

In the case that the deletion icon 1054 is selected, the selected player item may be deleted.

Figure 20C:
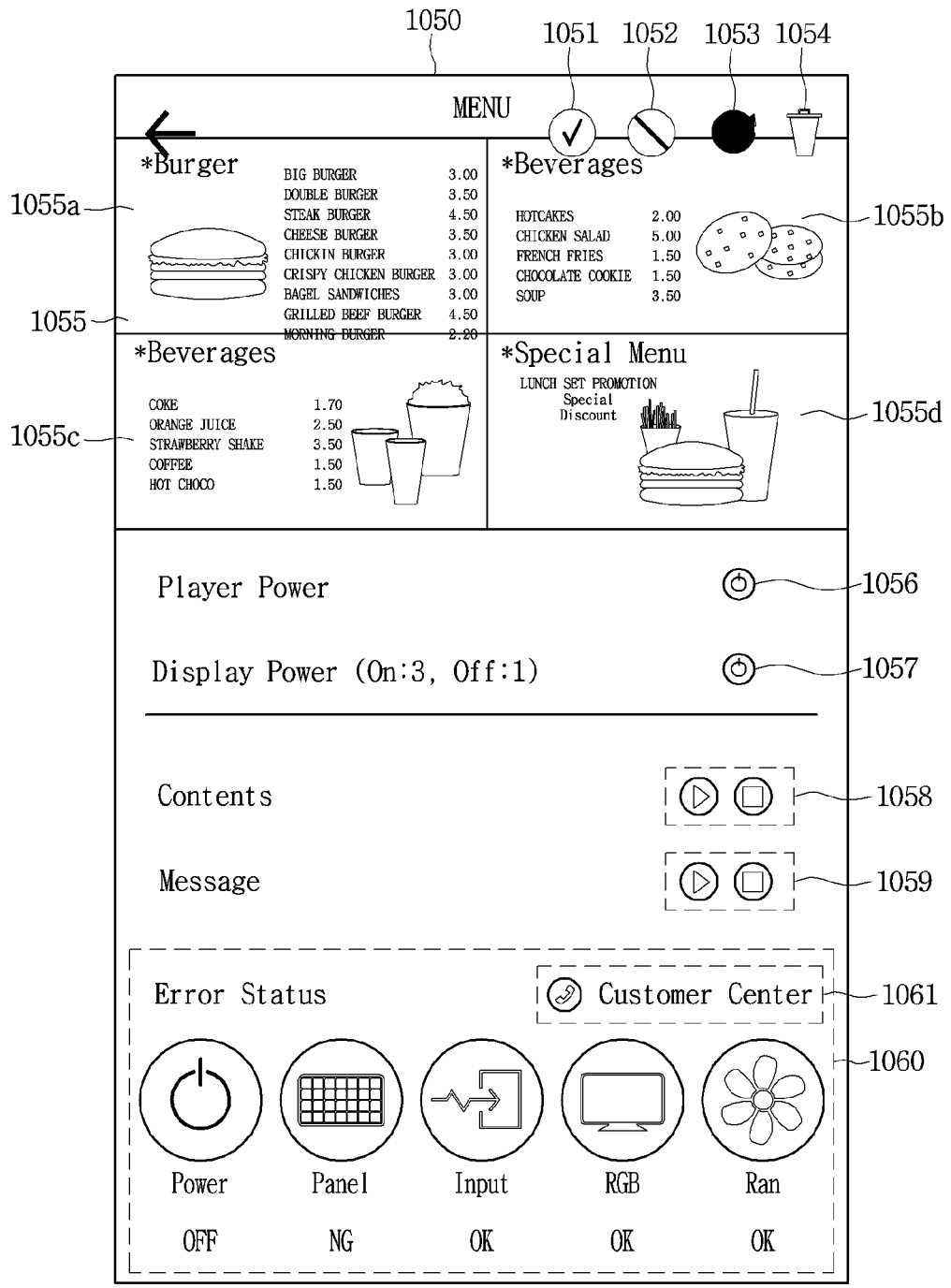

The capture image display area 1055 may provide the capture image of the media content which is being reproduced by the digital signage device 300 at the time point in which the refresh icon 1053 is selected. According to one embodiment, in the case that the display device included in the digital signage device 300 is configured in 2×2 video walls, the capture image display area 1055 may display capture images reproduced on video wall of the display device. For example, as illustrated in FIG. 20C, a plurality of capture images 1055a to 1055d may capture images reproduced by four display devices configured in 2×2 video walls. The capture image display area 1055 may display the capture images 1055a to 1055d in match with the layout of the 2×2 video walls. However, the example is provided only for the illustrative purpose. The capture images 1055a to 1055d may be displayed on the capture image display area 1055 regardless of the layout of the 2×2 video walls.

According to another embodiment, media content, which is being reproduced by the player corresponding to the selected player item, may be displayed on the capture image display area 1055 in real time instead of the capture image.

A player power control icon 1056 may be an icon for power on or off of a player included in the digital signage device 300.

A display device power control icon 1057 may be an icon for power on or off of a display device included in the digital signage device 300 and connected with the player.

A reproduction control icon 1058 for media content may be an icon for turning on or off the reproduction of media content.

A reproduction control icon 1059 for an urgent message may be an icon for turning on or off the reproduction of the urgent message during the reproduction of the media content.

An error status providing area 1060 provide information on an error status of the digital signage device 300 according to the type of an error.

A service center connection icon 1061 may be an icon for performing call connection to a service center.

Hereinafter, description will be made with reference to FIG. 21.

Figure 21A:
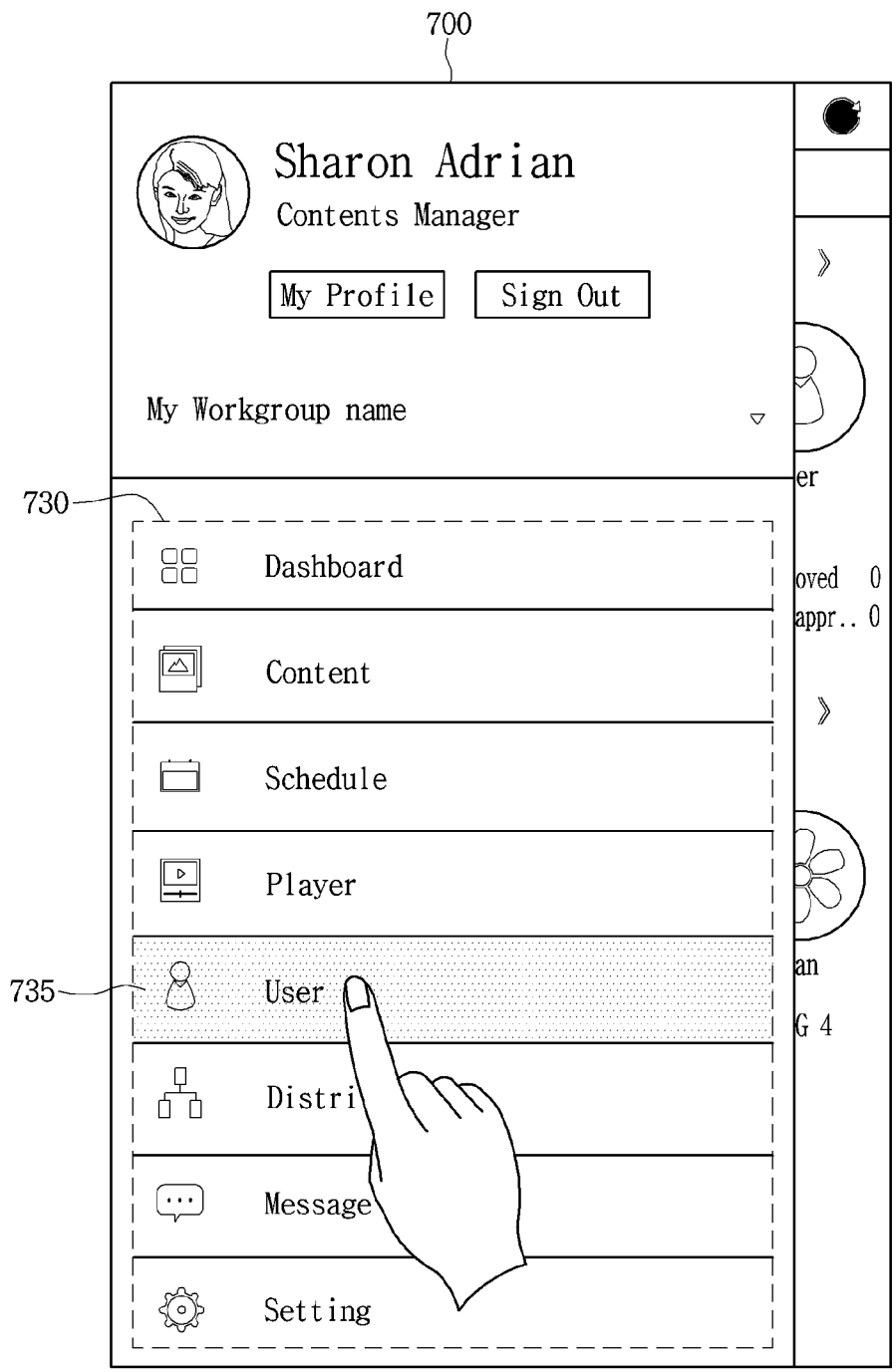
Figure 21B:
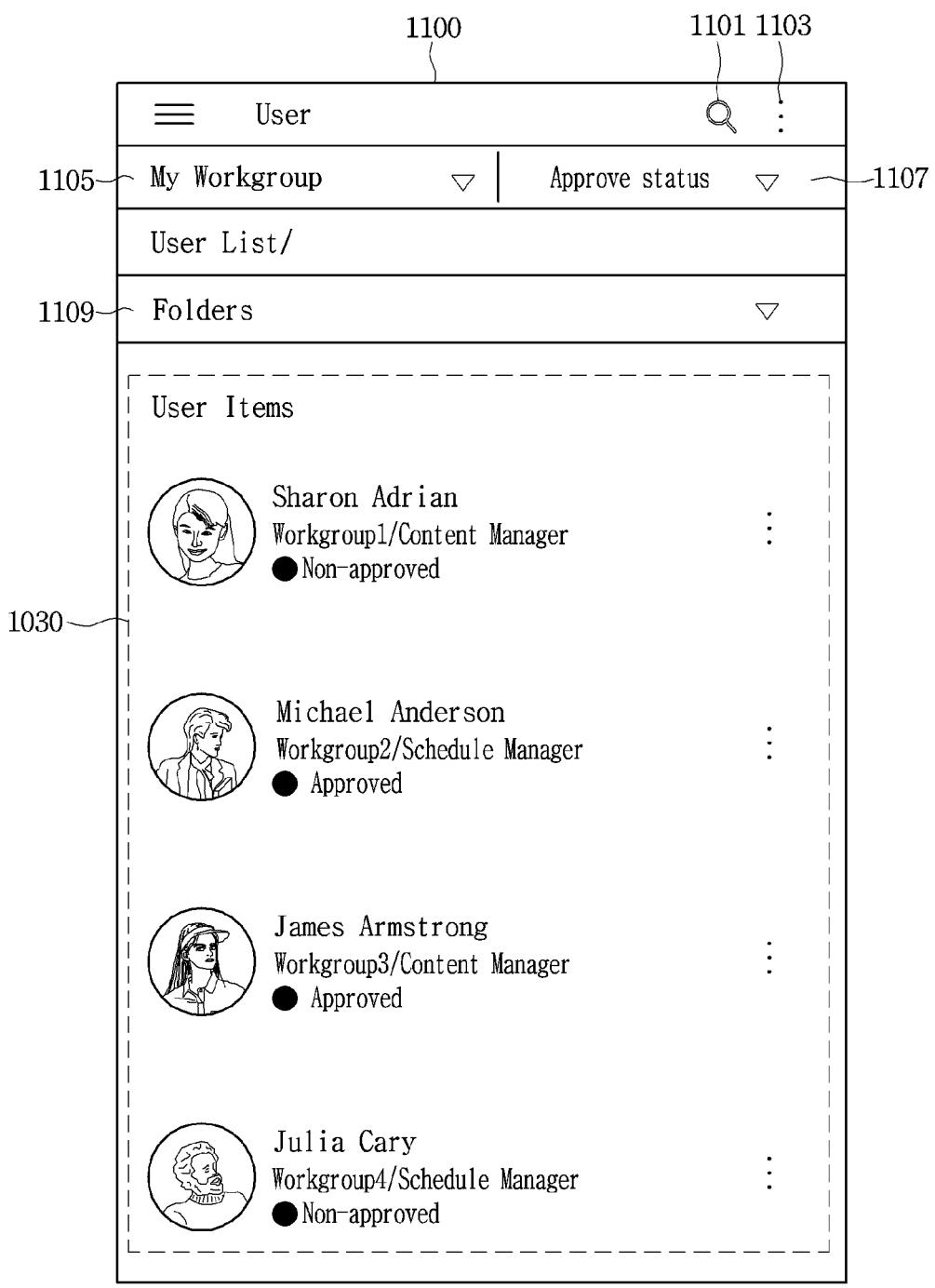

If a user menu 735 is selected from the menu providing screen 700 of FIG. 21A, the controller 180 may display a user screen 1100 as illustrated in FIG. 21B. The user screen 1100 may include a user item search icon 1101 for providing a function of searching a user item, a user item sort icon 1105, a workgroup button 1100 for selecting a work group, an approval status button 1107 for sorting user items according to an approval status or a disapproval state, a folder button 11091 for selecting a specific folder among a plurality of folders belonging to the workgroup, and a user item list 1130.

Hereinafter, description will be made with reference to FIG. 22.

Figure 22A:
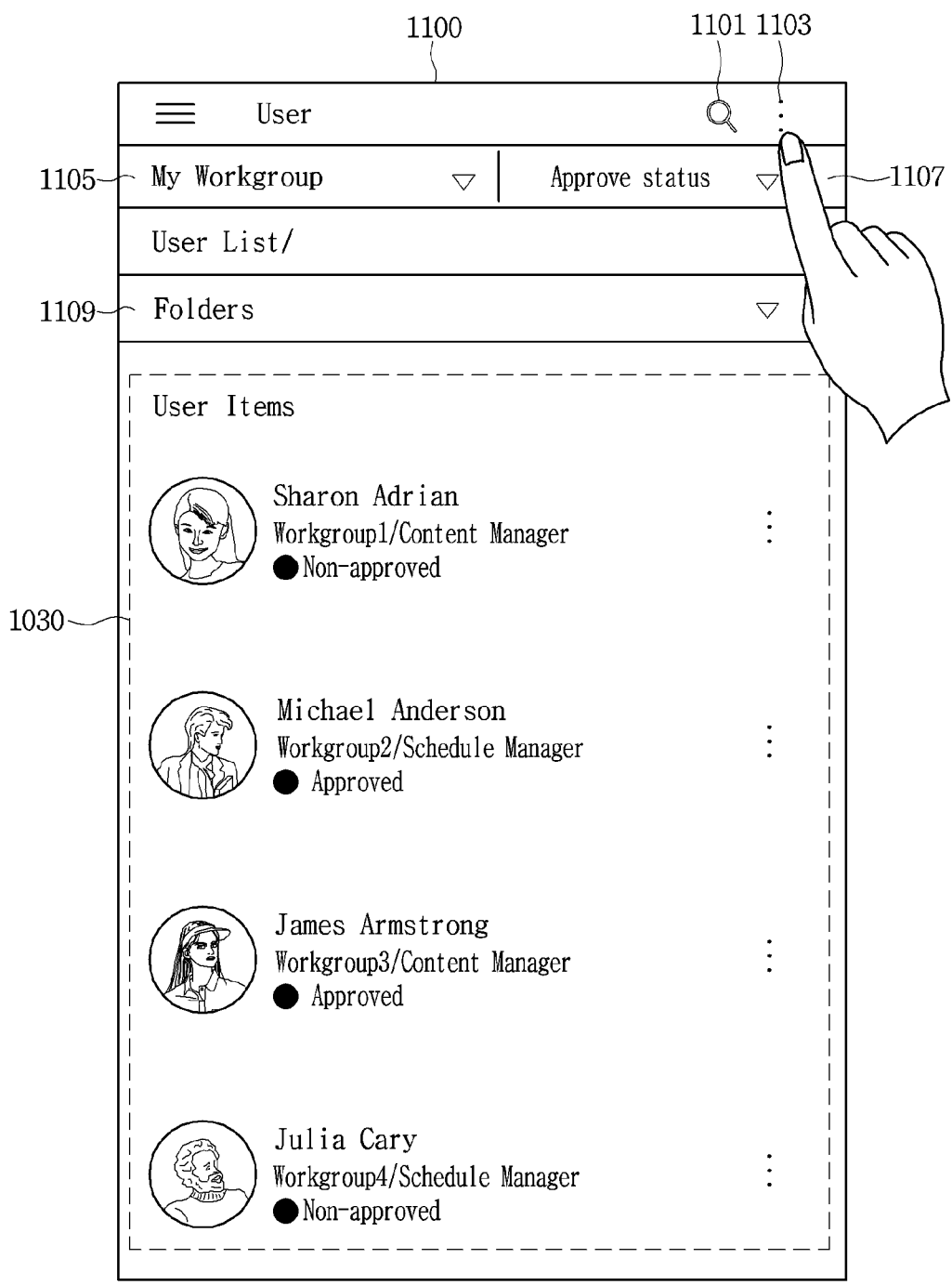
Figure 22B:
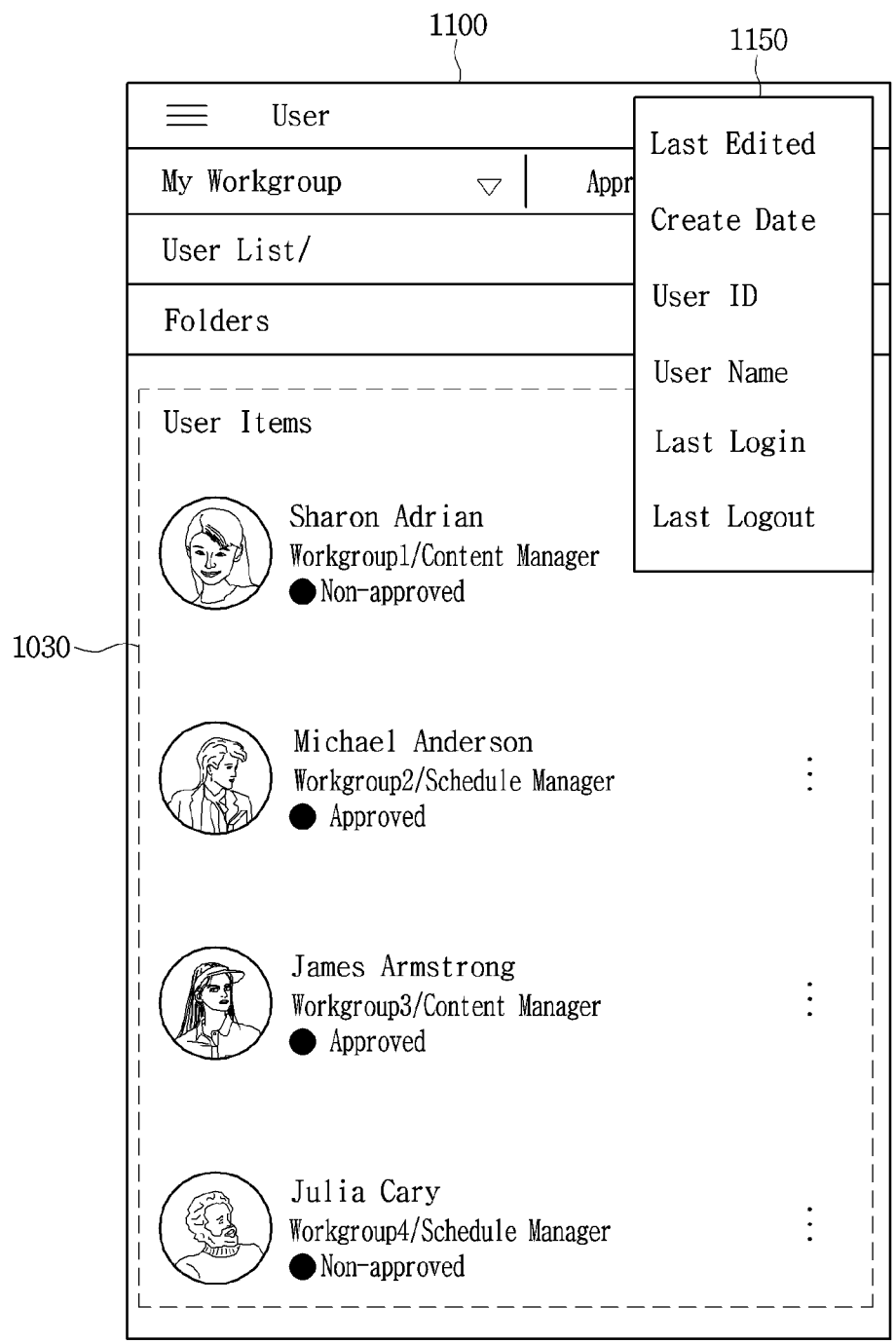

In the case that the user item sort icon 1105 is selected as illustrated in FIG. 22A, the controller 180 may display the user item sort list 1150 on the user screen 1100 as illustrated in FIG. 22B. The user item sort list 1150 may include lists of <Last Edited> for sorting user items in the latest edited order, <created date> for sorting the user items in creation order of the content items, <User Id> for sorting the user items according to user IDs of the user items, <User Name> for sorting the user items according to user names, <Last Login> for sorting the user items in log-in order, and <Last Logout> for sorting the user items in log-out order.

Hereinafter, description will be made with reference to FIG. 23.

Figure 23A:
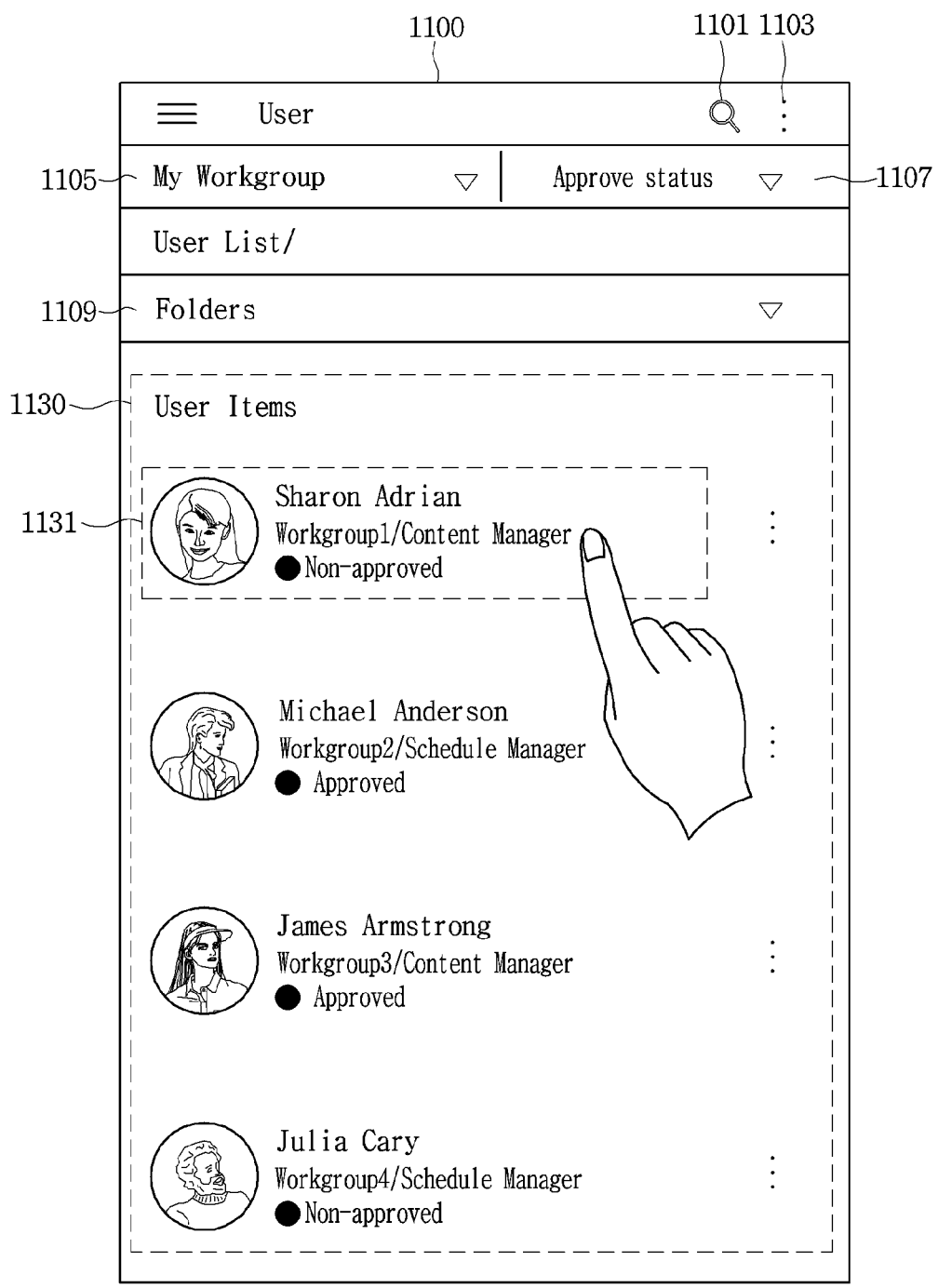

Referring to FIG. 23A, the user item list 1130 may include information on a plurality of user items. The information on each user item may include a profile photo representing a user, a user name, a user workgroup, a user authority, and an approval status of the user item. If a user item 1131 is selected, the controller 180 may display a user item detail information screen 1200 as illustrated in FIG. 23B. The user item detail information screen 1200 may include an approval confirmation icon 1201 for approving a selected user item, an approval rejection icon 1203 for rejecting the selected user item, a deletion icon 1205 for deleting the selected user item, a profile image 1207 of a user of the selected user item, a user detail information tap 1209 for providing the detail information of the user, and a user log-in tap 1211 for providing log-in information of the user.

In the case that the approve confirmation icon 1201 is selected, the approval of the selected user item may be completed. In the case that the approval rejection icon 1203 is selected, the approval of the selected user item may be rejected. In the case that the deletion icon 1205 is selected, the selected user item may be deleted.

If user detail information tap 1209 is selected, the controller 180 may display the detail information 1213 of the user as illustrated in FIG. 23B. The detail information 1213 of the user may include a user ID, a user name, the authority of the user, the workgroup of the user, and the contact information of the user.

Figure 24:
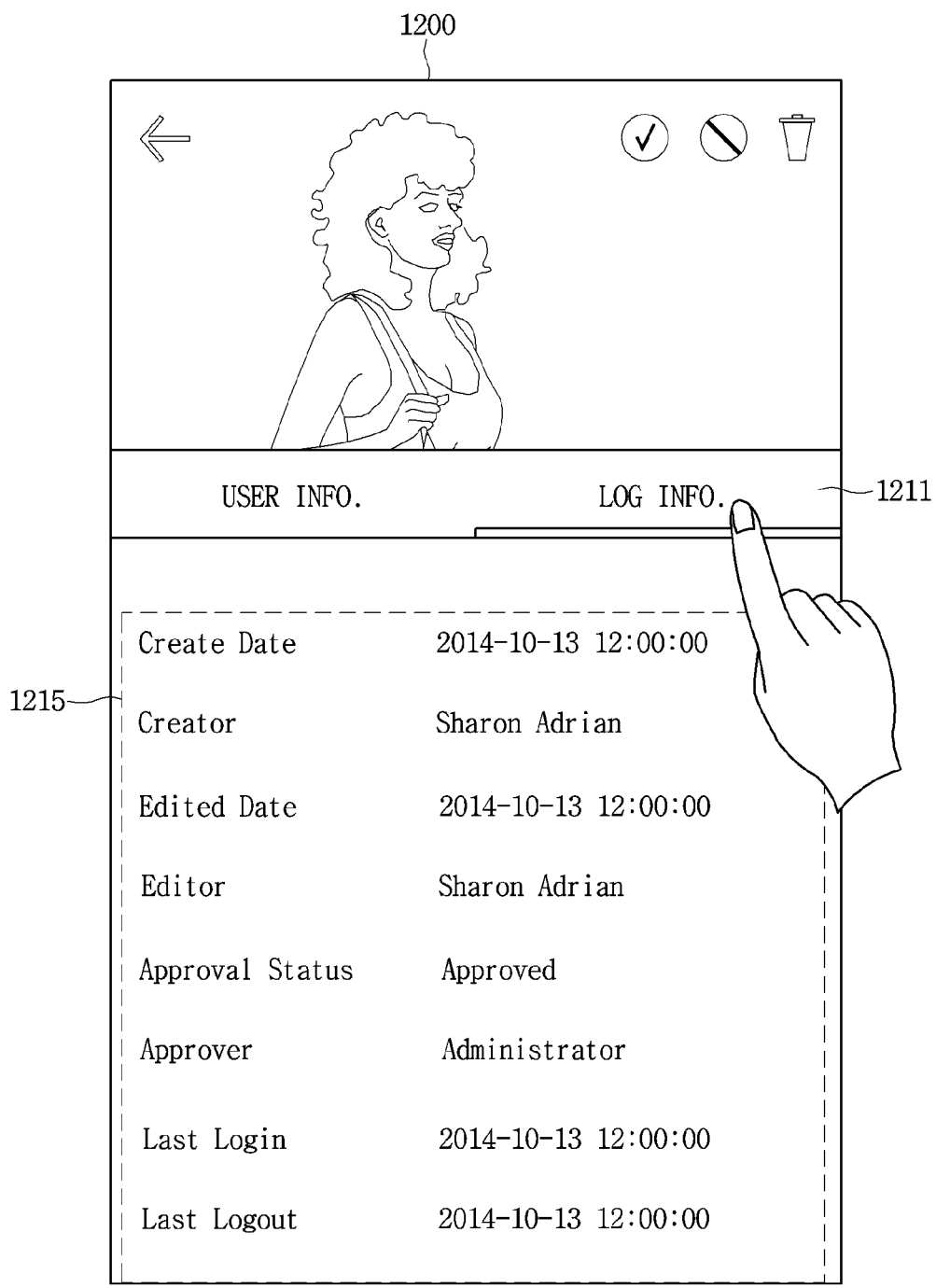

In the case that the user log-in tap 1211 is selected, the controller 180 may display log-in information 1215 as illustrated in FIG. 24. The log-in information 1215 may include a creation date, a creator, an editing date, an editor, an approval state, an approver, the last log-in time, and the last log-out time of the user item.

Hereinafter, description will be made with reference to FIG. 25.

Figure 25A:
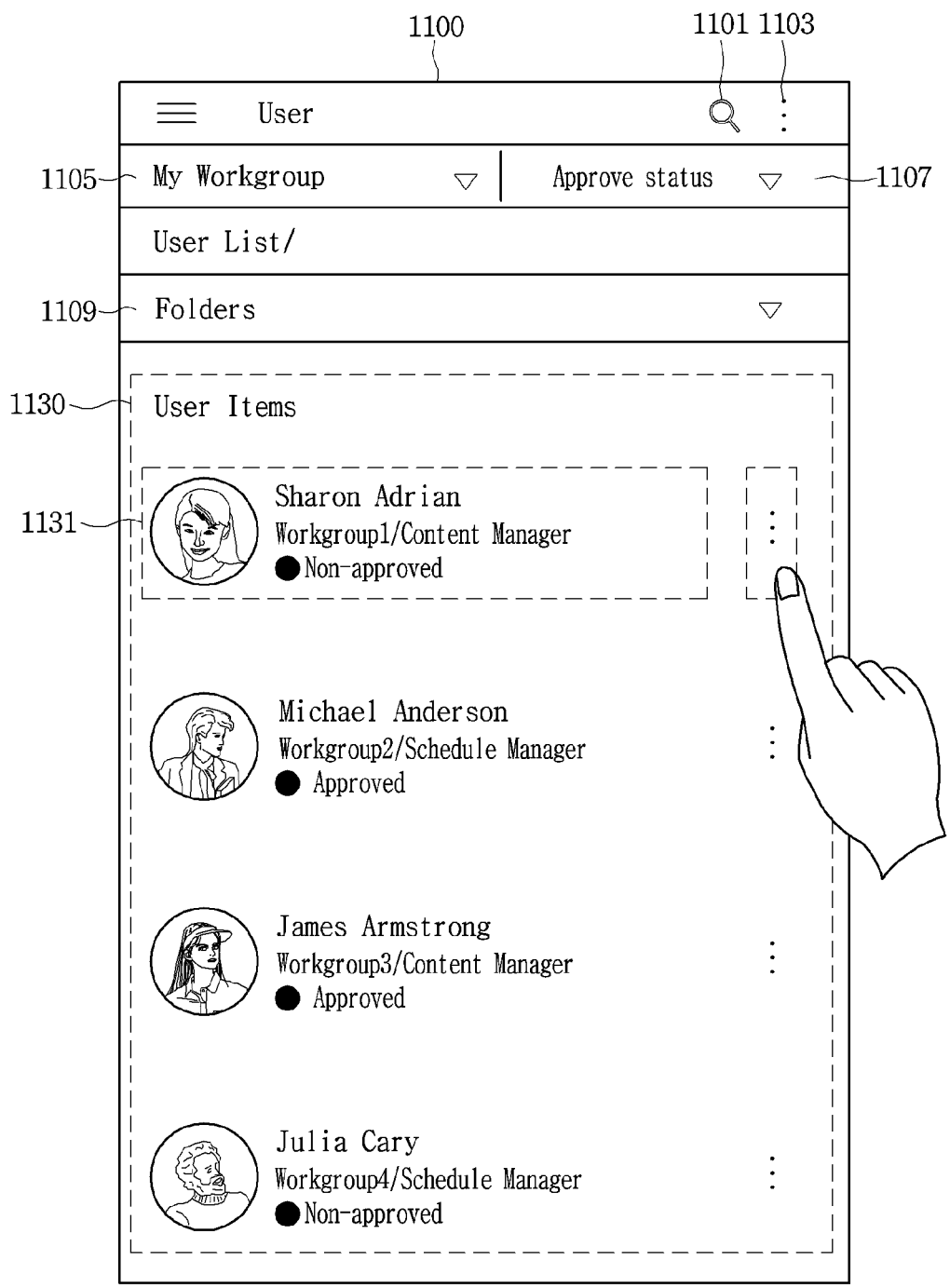
Figure 25B:
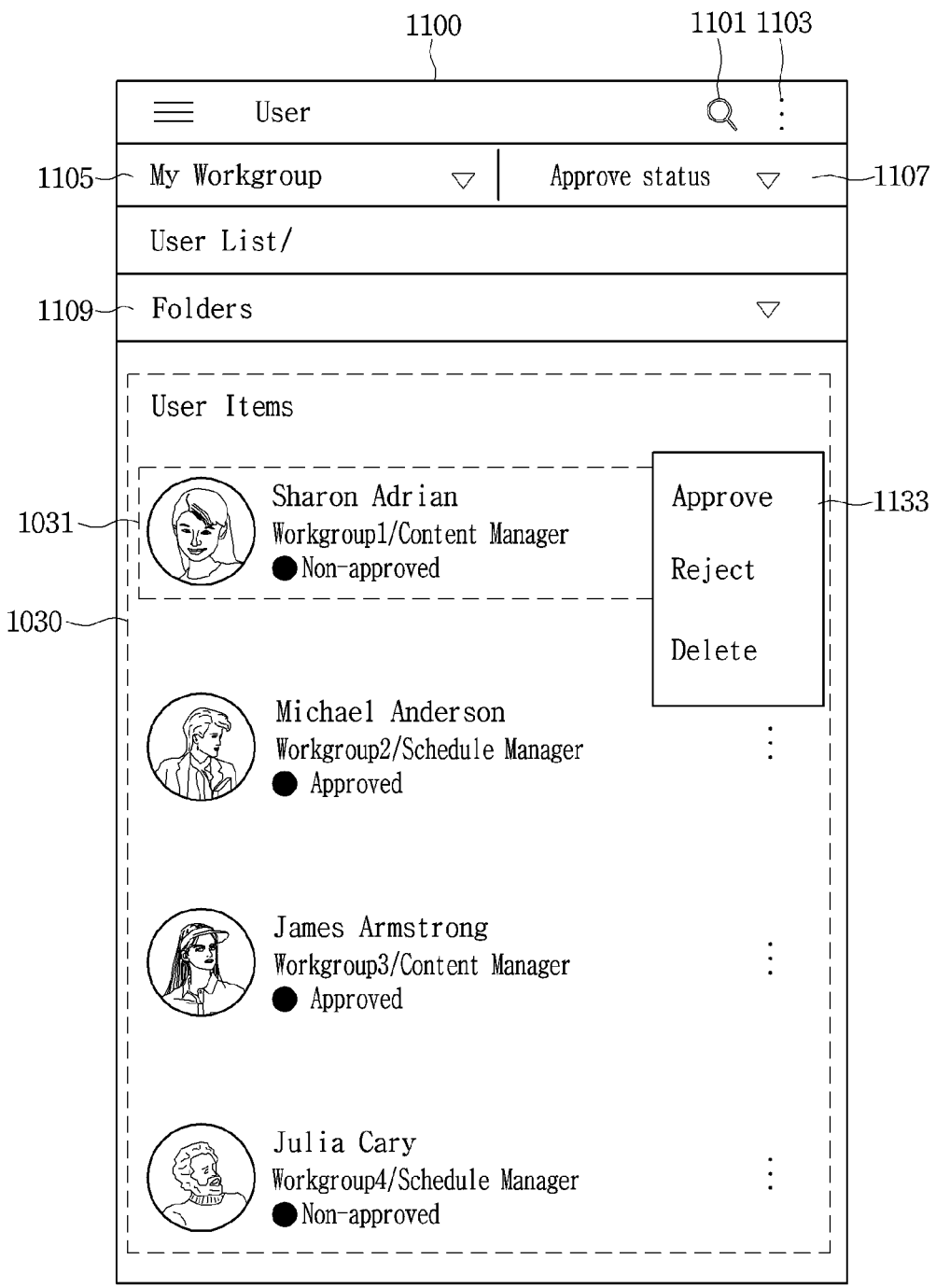

Referring to FIG. 25A, an approval setting icon 112 may be further displayed at one side of a user item 1131. In the case that the approval setting icon 1132 is selected, the controller 180 may display an approval setting window 1133 for setting the approval of the user item 1131 as illustrated in FIG. 25B. The approval setting window 1133 may include an approval tap for approving a user item, a rejection tap for rejecting the user item, and a deletion tap for deleting the user item.

Hereinafter, description will be made with reference to FIG. 26.

Figure 26A:
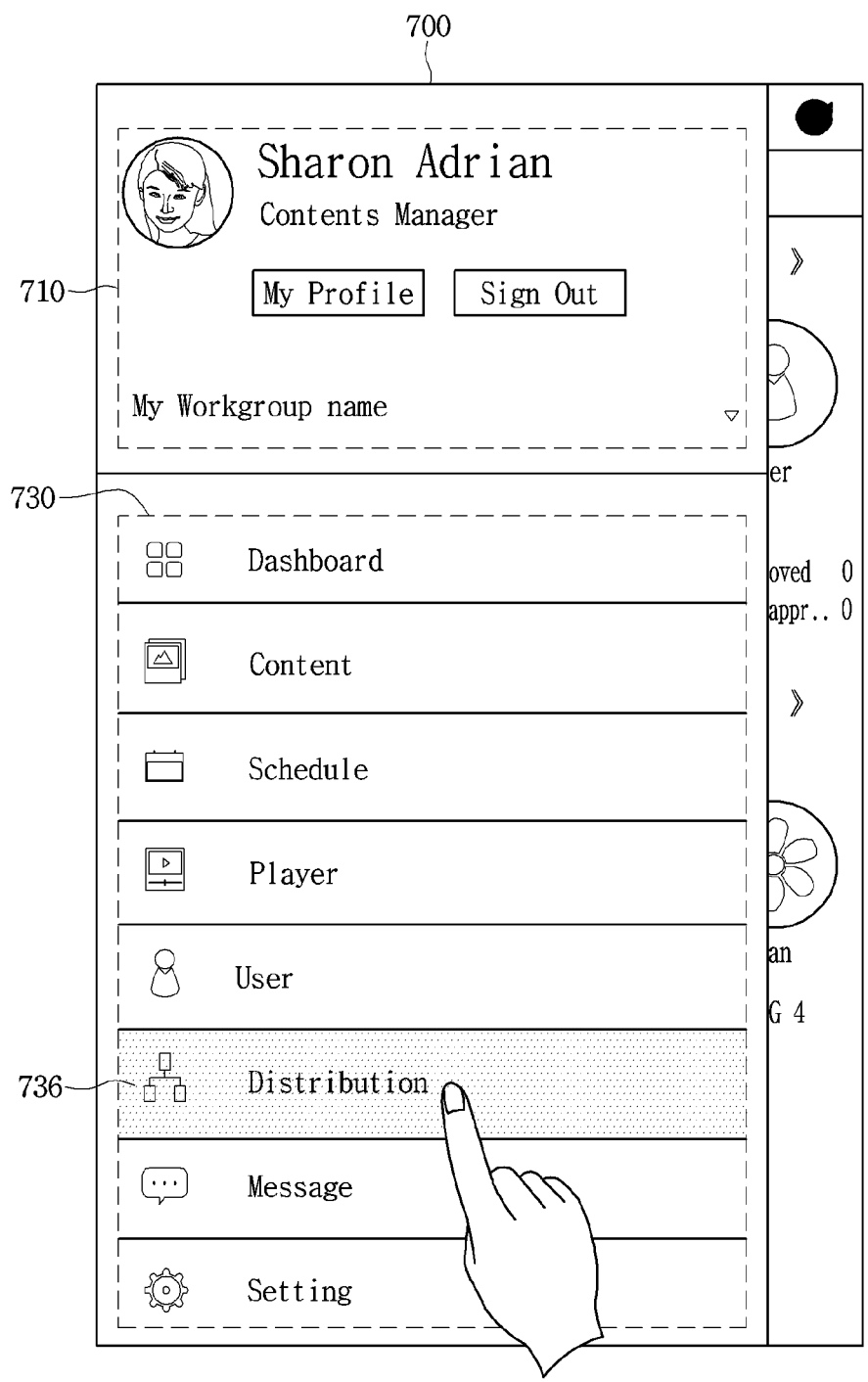
Figure 26B:
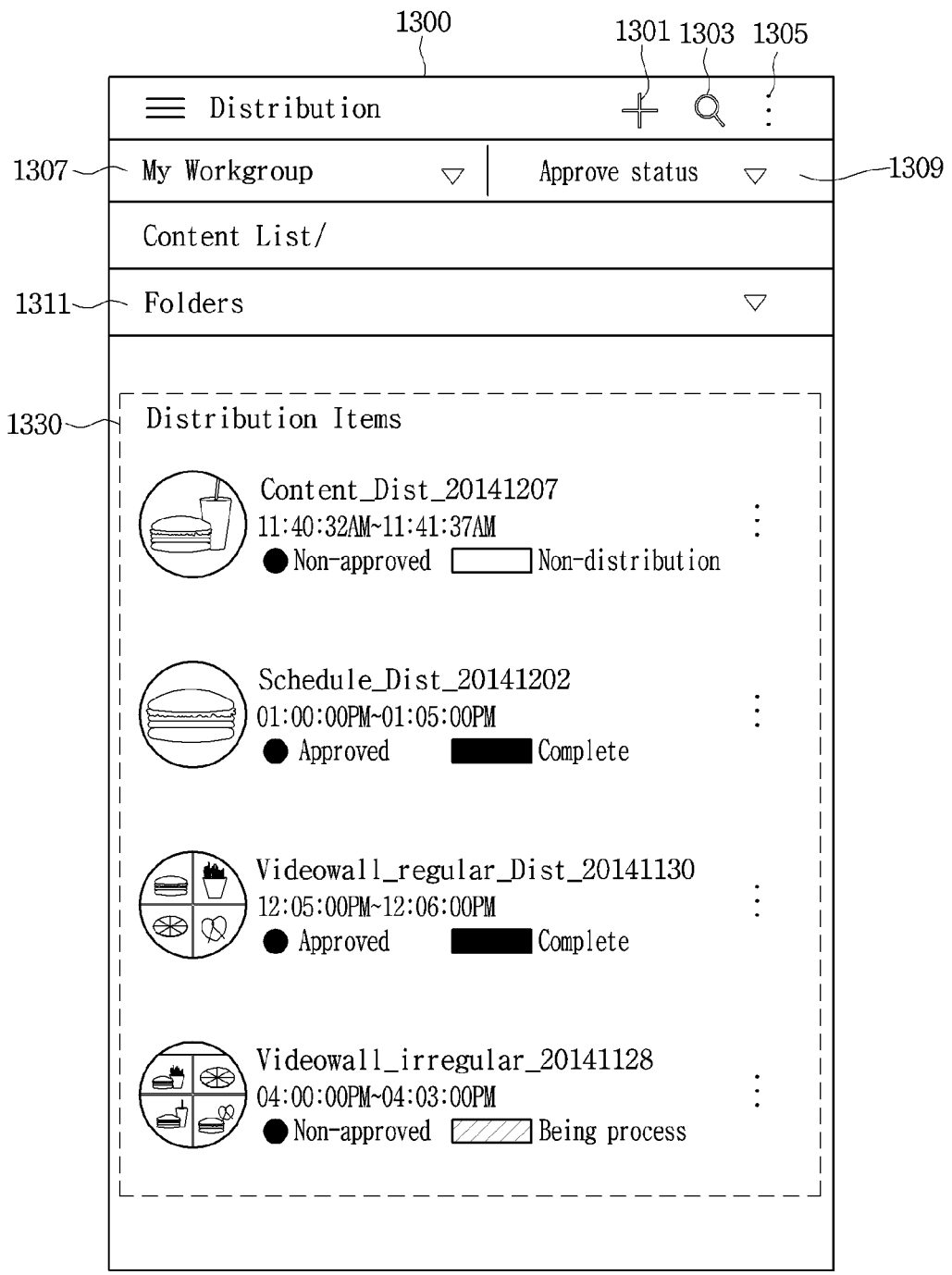

If a distribution menu 736 is selected in FIG. 26A, the controller 180 may display a distribution screen 1300 as illustrated in FIG. 26B. The distribution screen 1300 may include a distribution item addition icon 1301, a content item search icon 1303 for providing a function of searching for a content item, a content item sort icon 1305, a workgroup button 1307 for selecting a work group, an approval status button 1309 for sorting distribution items according to approval or disapproval status, a folder button 1311 for selecting a specific folder among a plurality of folders belonging to the work group, and a distribution item list 1330.

Hereinafter, description will be made with reference to FIG. 27.

Figure 27A:
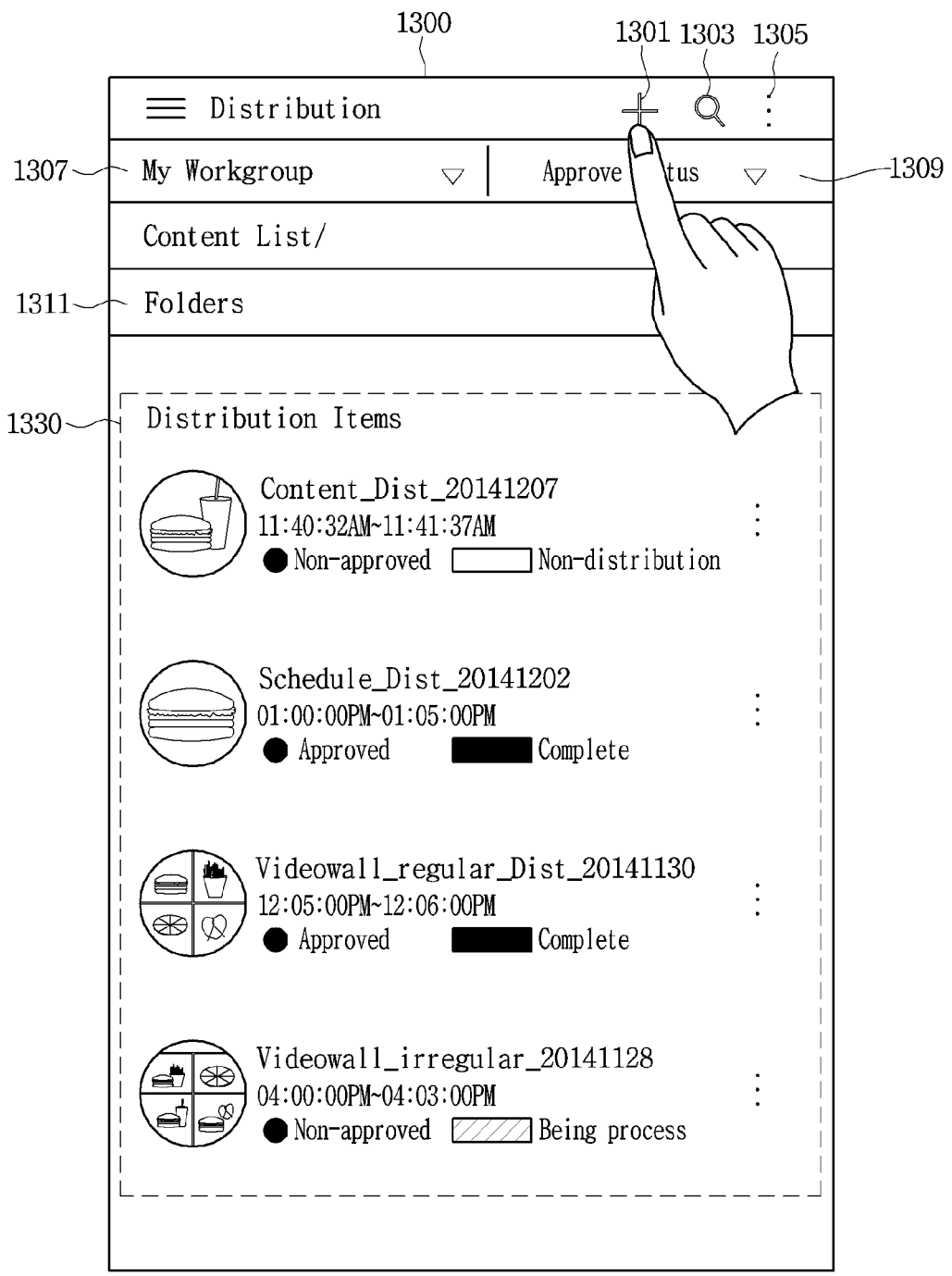
Figure 27B:
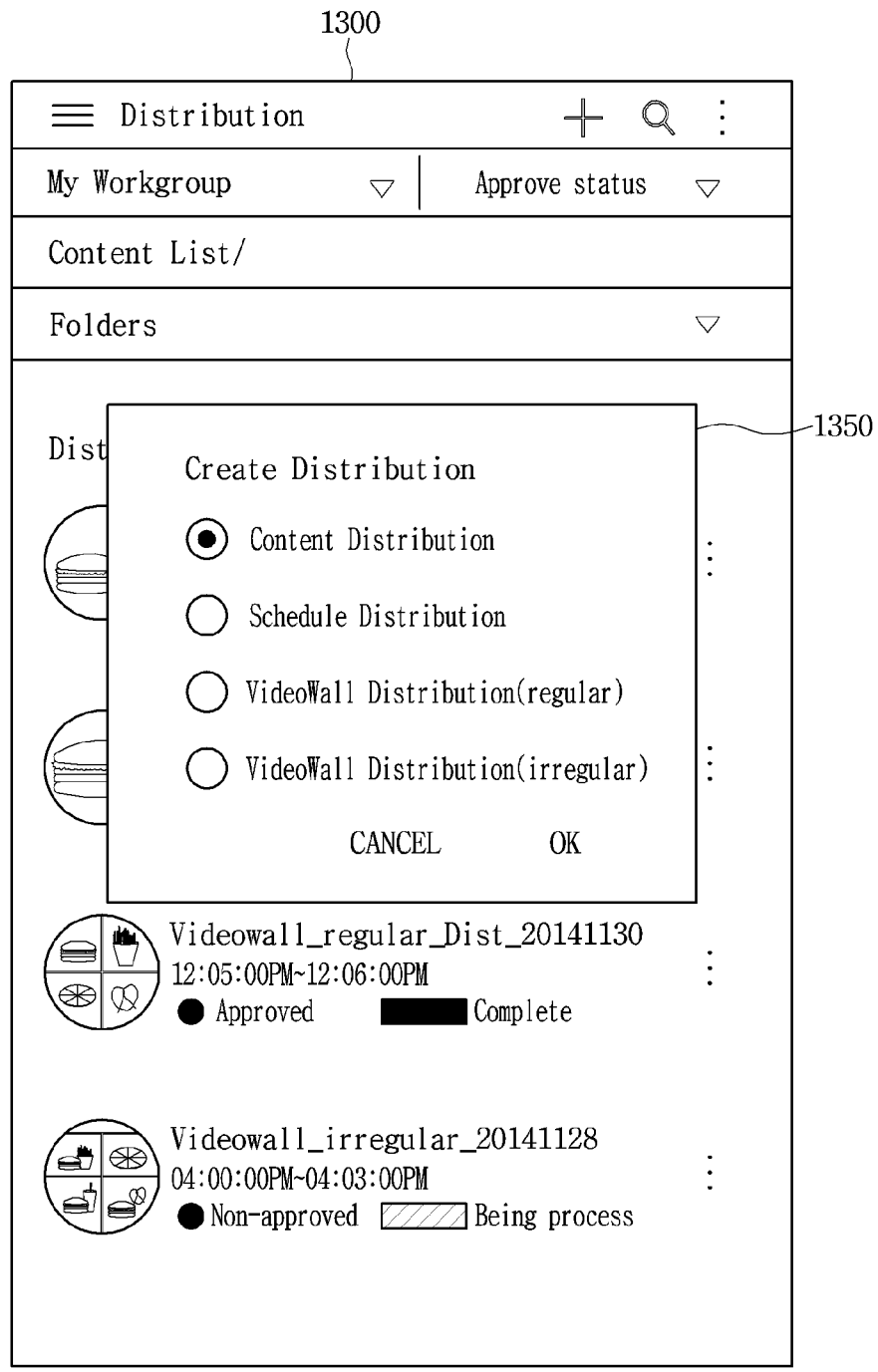

As illustrated in FIG. 27A, in the case that a distribution item addition icon 1301 is selected, the controller 180 may display a distribution creation window 1350 for creating the distribution item on the distribution screen 1300 as illustrated in FIG. 27B. The distribution creation window 1350 may include a content distribution item, a schedule distribution item, a regular-shaped video wall distribution item and an irregular-shaped video wall distribution item.

Hereinafter, description will be made with reference to FIG. 28.

Figure 28A:
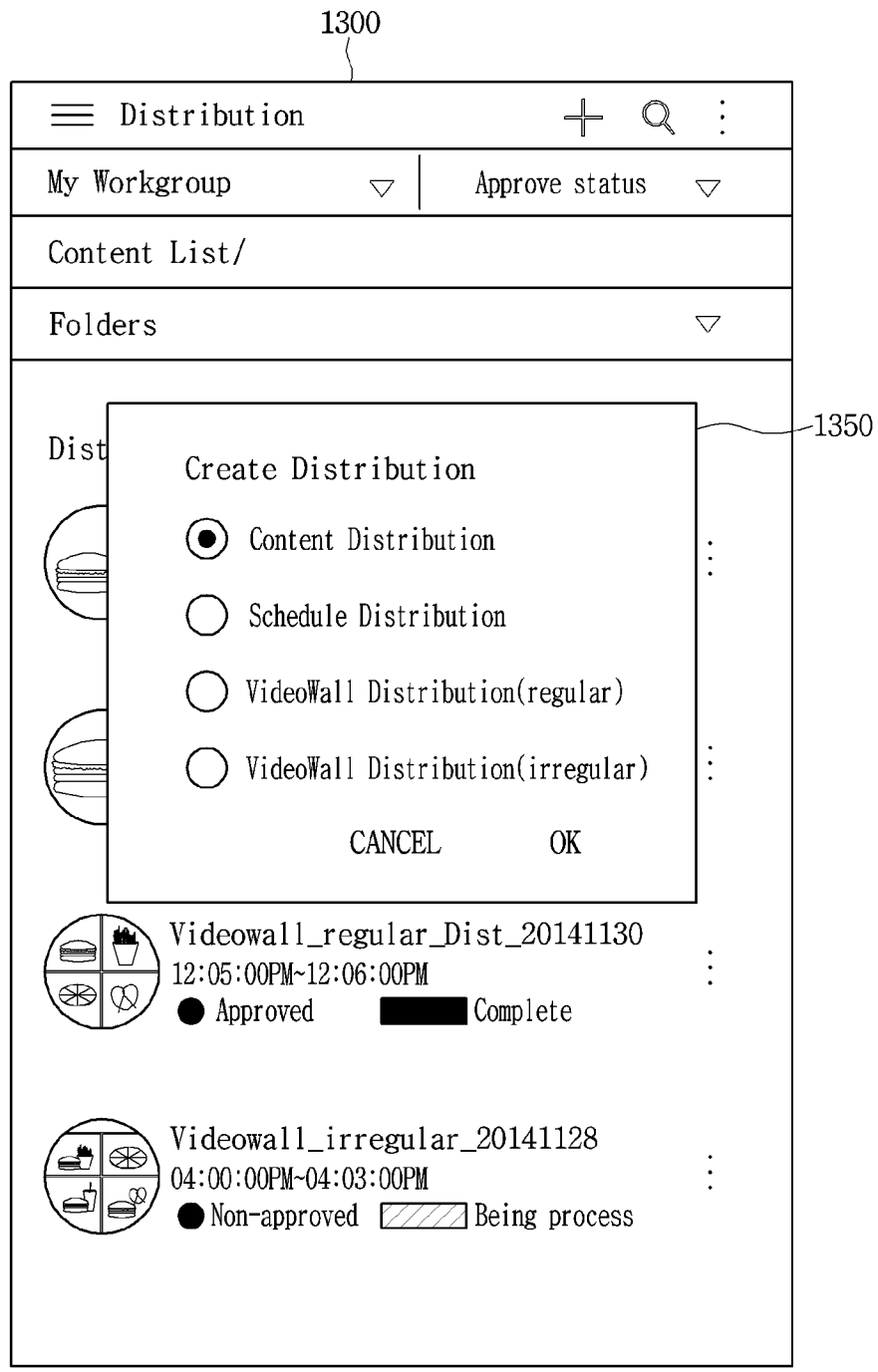
Figure 28B:
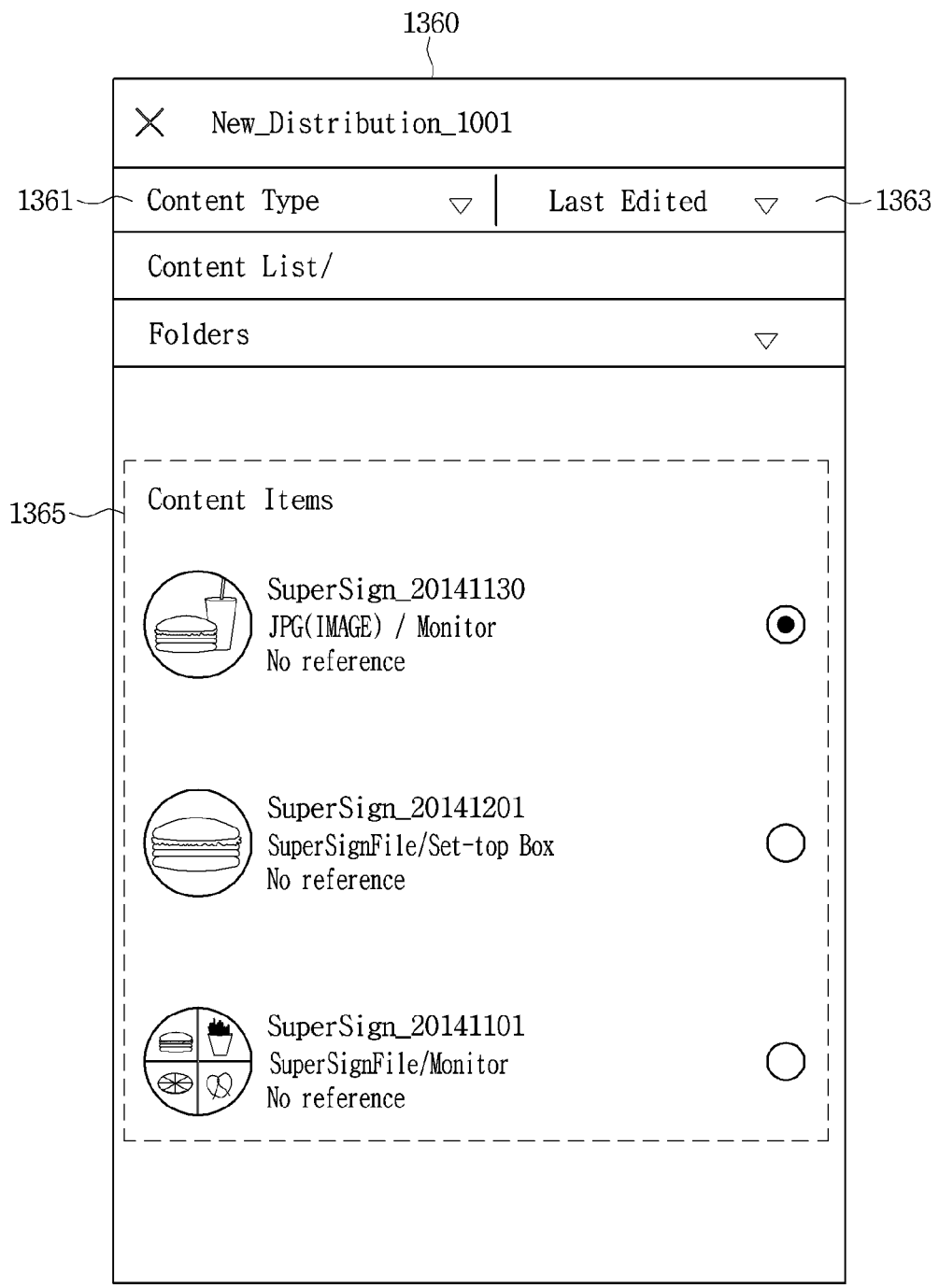

In the case that a content distribution item is selected from the distribution creation window 1350 as illustrated in FIG. 28A, the controller 180 may display a content item selection screen 1360 from which a content item to be distributed is selected as illustrated in FIG. 28B. The content item selection screen 1360 may include a content type button 1361 for sorting content items, which are included in a content item list 1365 according to a content type, according to the content type, a sort button 1363 for sorting the content items according to an editing time point, a creation date, a title, and a player type, and a content item list 1365. The content type may be classified into a typical content, a 3D content, an image, a video, music, a flash file, and a PdF file.

Figure 28C:
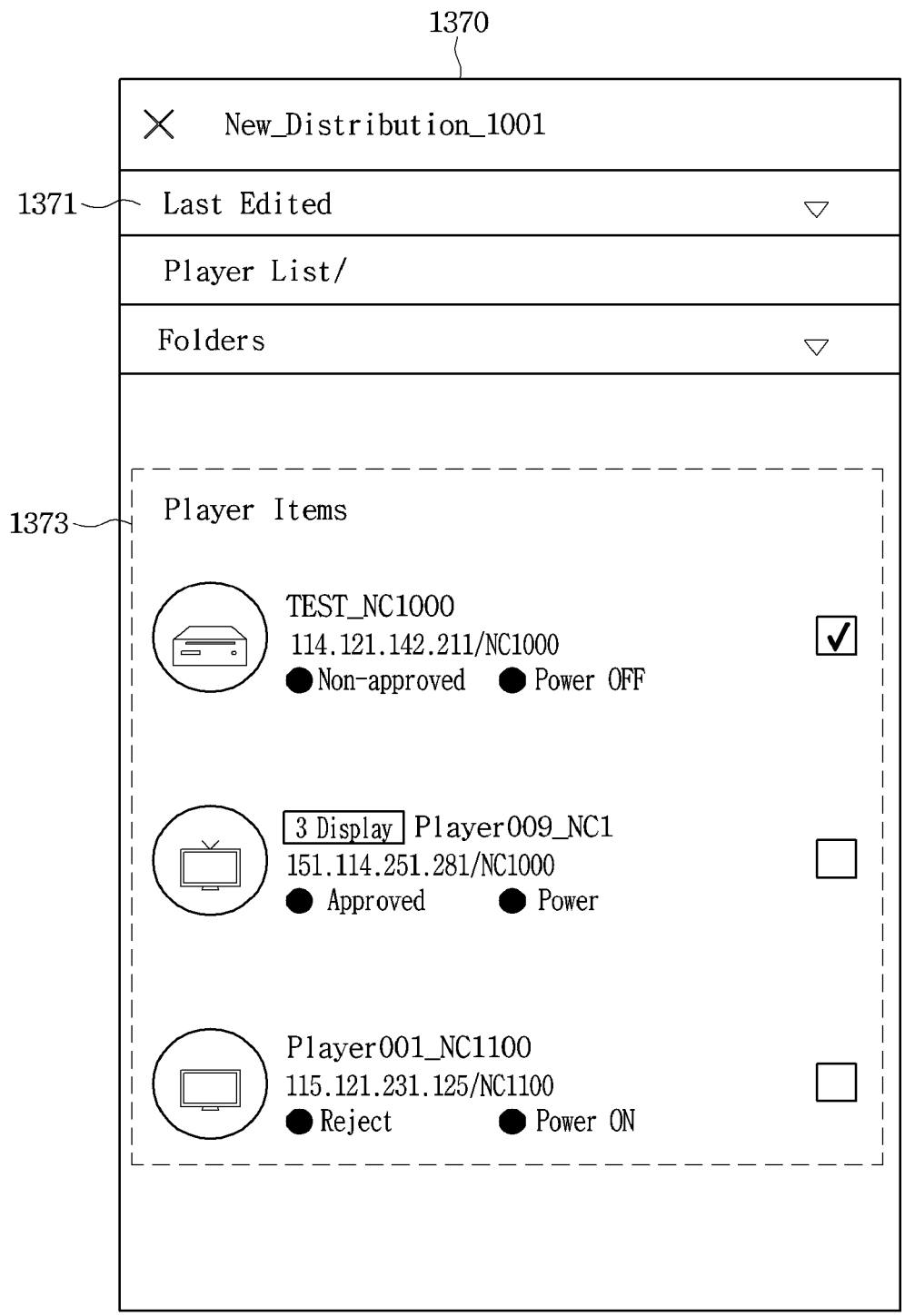
Figure 28D:
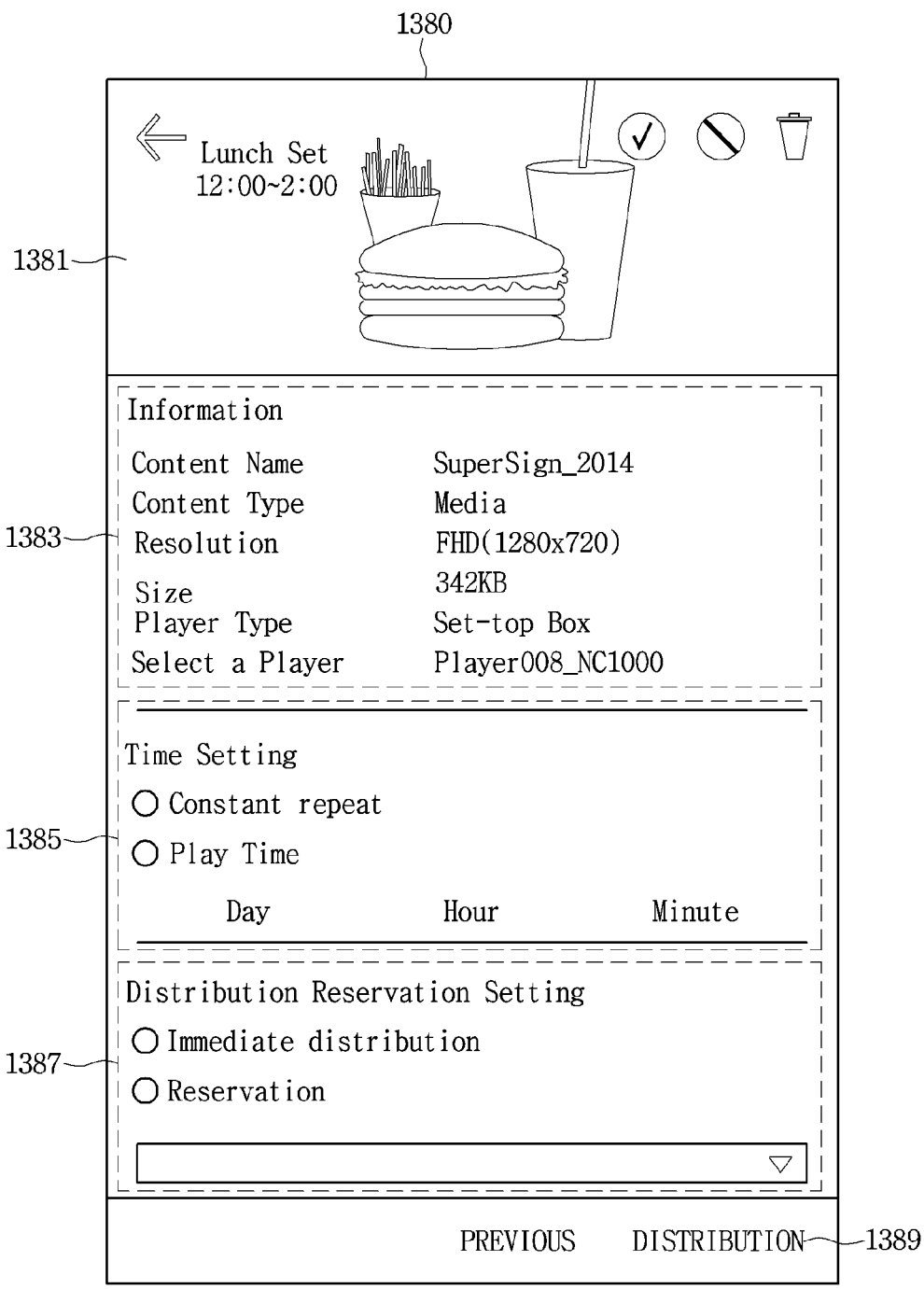

In the case that a specific content item is selected from a content item list 1365 of FIG. 28B, the controller 180 may display a player item selection screen 1370 from which a player item is selected as illustrated in FIG. 28C. The player item selection screen 1370 may include a sort button 1371 for sorting player items according to an editing time point, a creation date, a title, and a player type, and a player item list 1373 including a plurality of items. In the case that a specific player item is selected from the player item list 1373, the controller 180 may display a distribution detail setting screen 1380 as illustrated in FIG. 28D. The distribution detail setting screen 1380 may include an image 1381 of a content corresponding to the selected content item, detail information 1383 on the content item, time setting information 1385 for setting the reproduction time of the content, distribution reservation setting information 1387 for reserving a distribution time point, and a distribution completion button 1389 for completing the setting of the distribution item. The user may input desired setting information through the distribution detail setting screen 1380 and may select the distribution completion button 1389 to create the distribution item.

Hereinafter, description will be made with reference to FIG. 29.

Figure 29A:
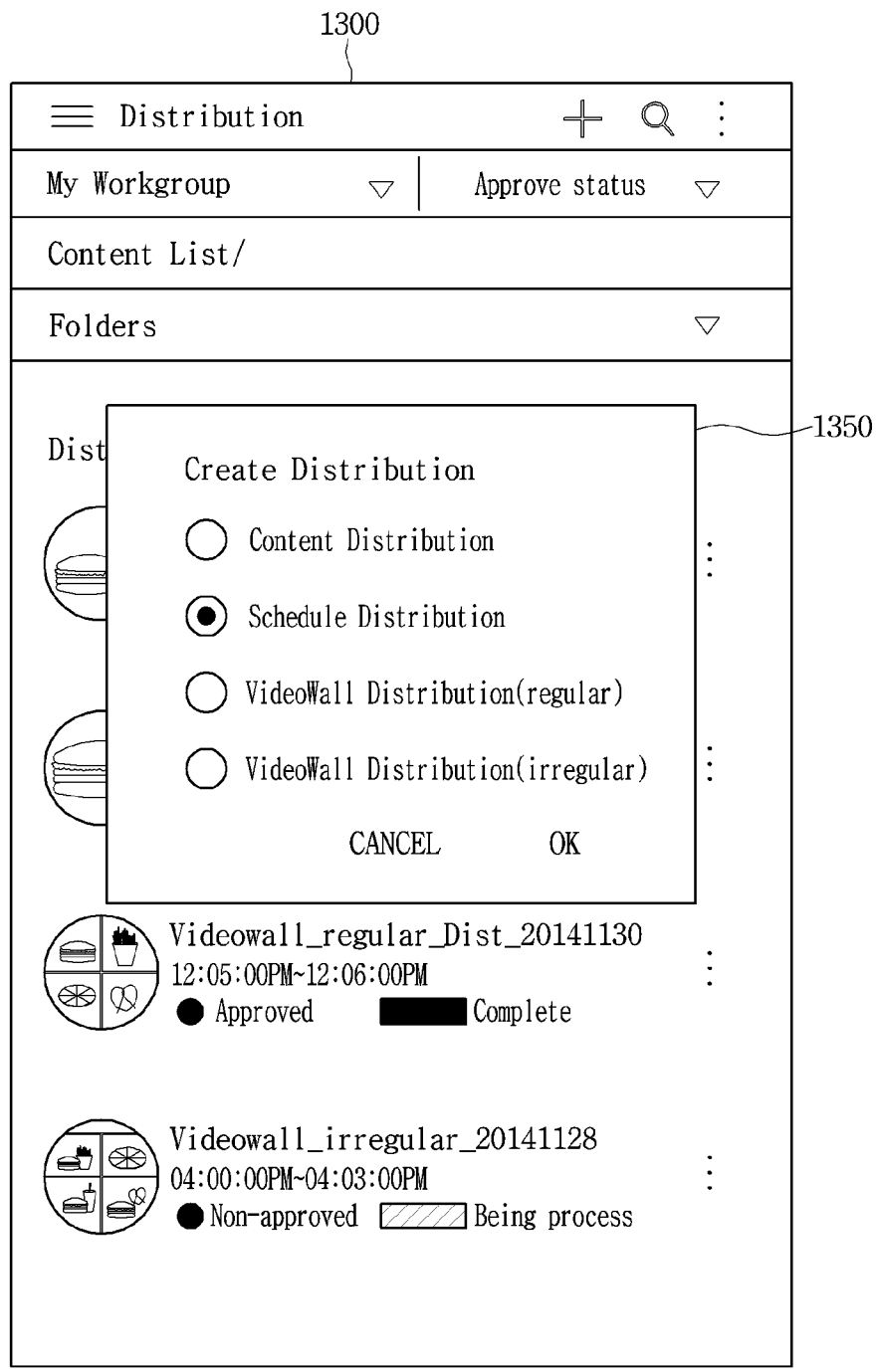

In the case that a schedule distribution item is selected from a distribution creation window 1350 as illustrated in FIG. 29A, the controller 180 may display a schedule item selection screen 1390 for selecting a schedule item for distribution as illustrated in FIG. 29B. The schedule item selection screen 1390 may include a sort button 1391 for sorting schedule items according to an editing time point, a creation date, a title, a player type, and a power status of a player and a schedule item list 1393. In the case that a specific schedule item is selected from the schedule item list 1393, screens illustrated in FIGS. 28C and 28D may be sequentially displayed.

Hereinafter, description will be made with reference to FIG. 30.

Figure 30A:
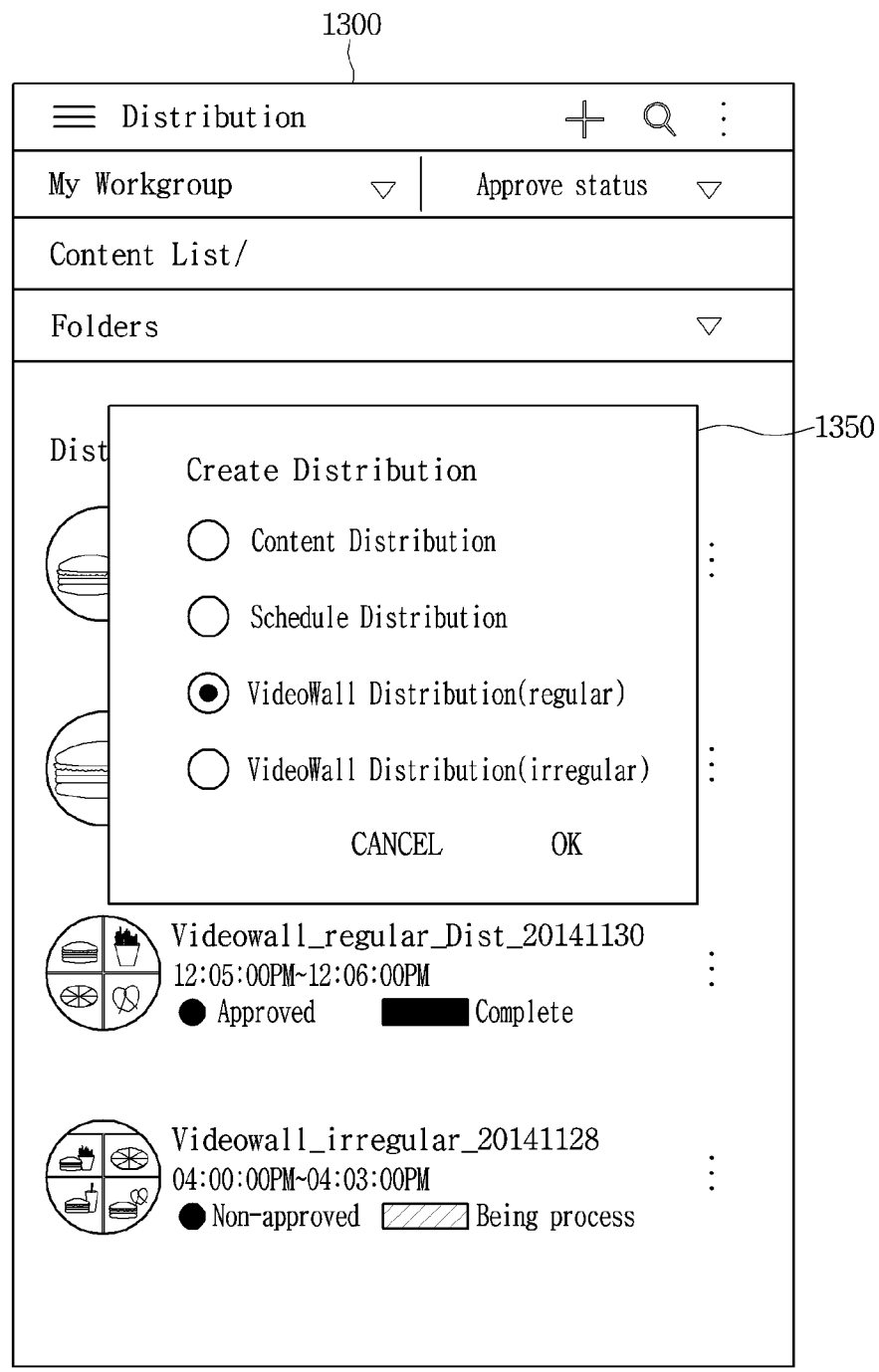
Figure 30B:
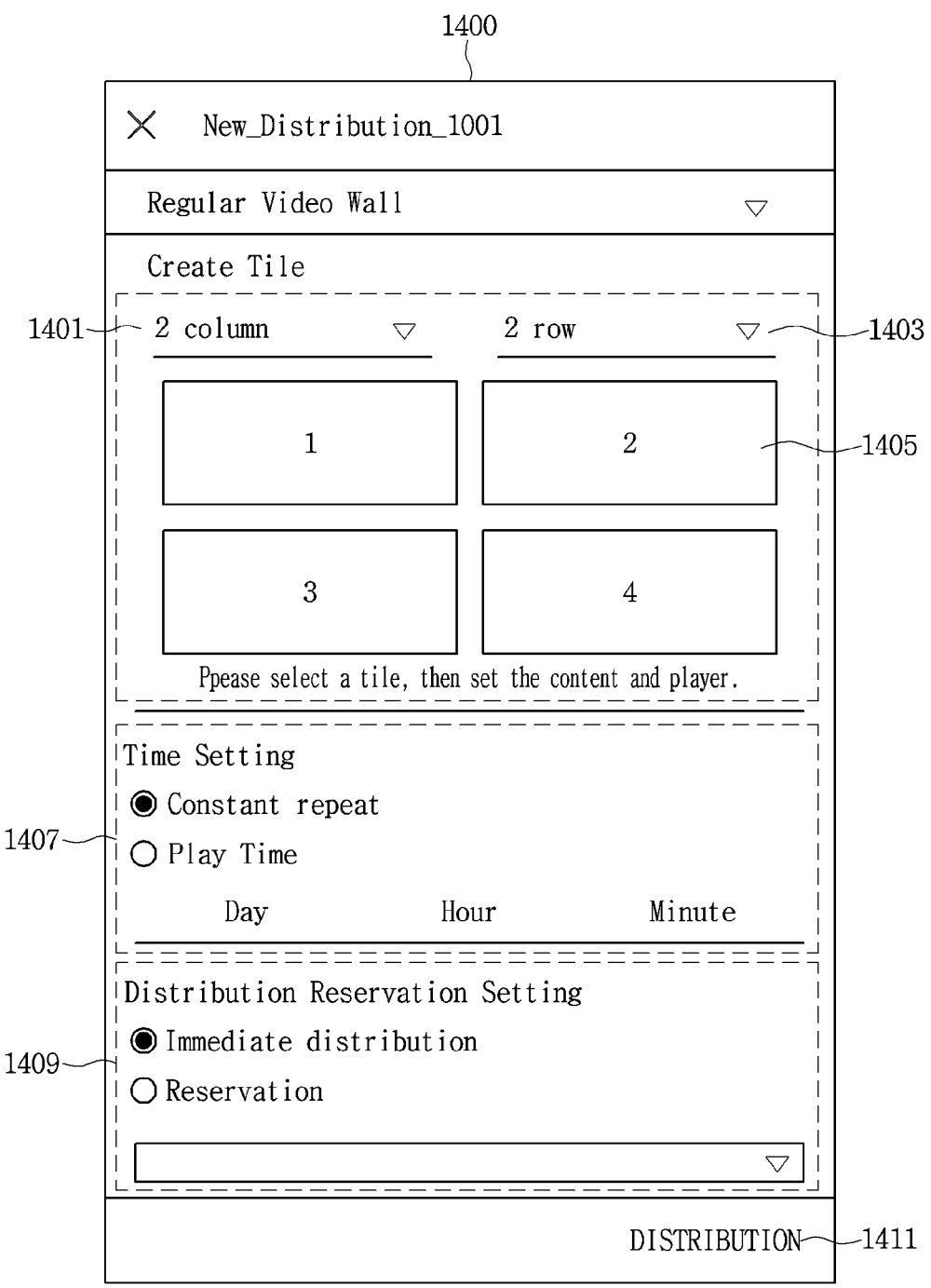

In the case that a regular-shaped video wall item is selected from a distribution creation window 1350 as illustrated in FIG. 30A, the controller 180 may display a layout setting screen 1400 for setting the layout of content as illustrated in FIG. 30B. A layout setting screen 1400 may include a row button 1401 for setting a column number for layout, a row button 1403 for setting a row number for the layout, a layout display area 1405 for providing the layout based on the setting for the column button 1401 and the row button 1403, time setting information 1407 for setting a reproduction time of content, distribution reservation setting information 1409 for reserving a distribution time point, and a distribution completion button 1411 for completing the setting of the distribution item.

In the case that two columns are selected from the column button 1401 and two rows are selected from the row button 1403, the controller 180 may display 2×2 layout sub-areas on a layout display area 1405. If a user selects any one layout sub-area 1405 from the 2×2 layout sub-areas, a content item corresponding to the selected layout sub-area 1405 may be set. In other words, in the case that the layout sub-area 1405 is selected, the controller 180 may sequentially display screens illustrated in FIGS. 28B, 28C, and 28D.

Hereinafter, description will be made with reference to FIG. 31.

Figure 31A:
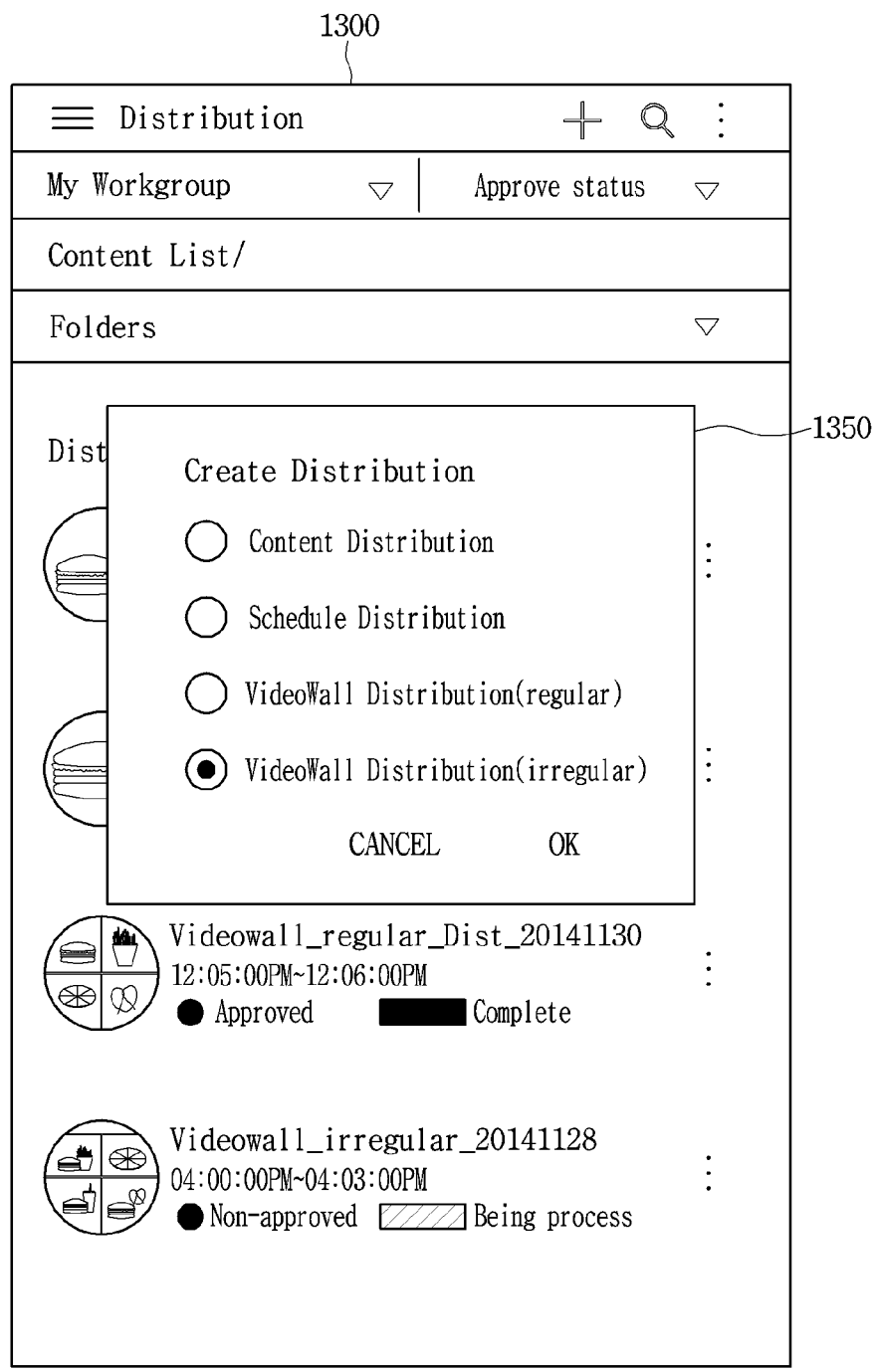
Figure 31B:
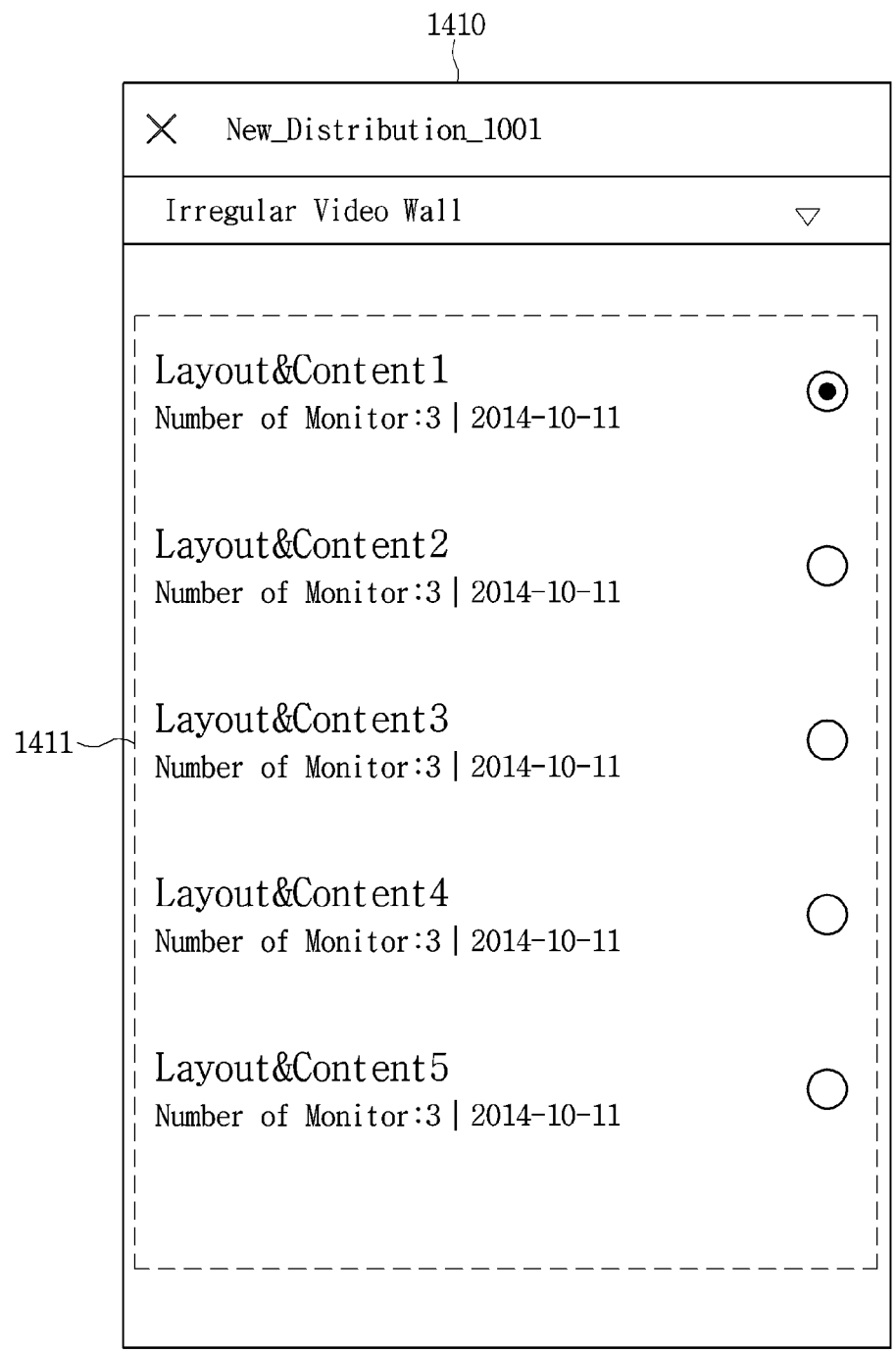

In the case that an irregular-shaped video wall item is selected from a distribution creation window 1350 as illustrated in FIG. 31A, the controller 180 may display a content/layout screen 1410 allowing the selection of content and layout as illustrated in FIG. 31B. The content/layout screen 1401 may include a content/layout list 1411. The content/layout list 1411 may include a plurality of irregular-shaped items which may form different layouts depending on the editing of a user differently from the regular-shaped video wall and allowing the selection of the content. In the case that any one of the irregular-shaped items is selected, the controller 180 may display an irregular-shaped video wall setting screen 1420 as illustrated in FIG. 31C. The irregular-shaped video wall setting screen 1420 may include a zoom bar 1421 for setting zoom-in or zoom-out of the content, a content display area 1423 for providing a result based on a setting input for the zoom bar 142, time setting information 1407 for setting the reproduction time of the content, a distribution reservation setting information 1409 for reserving a distribution time point, and a distribution completion button 1411 for completing the setting of the distribution item.

Hereinafter, description will be made with reference to FIG. 32.

Figure 32A:
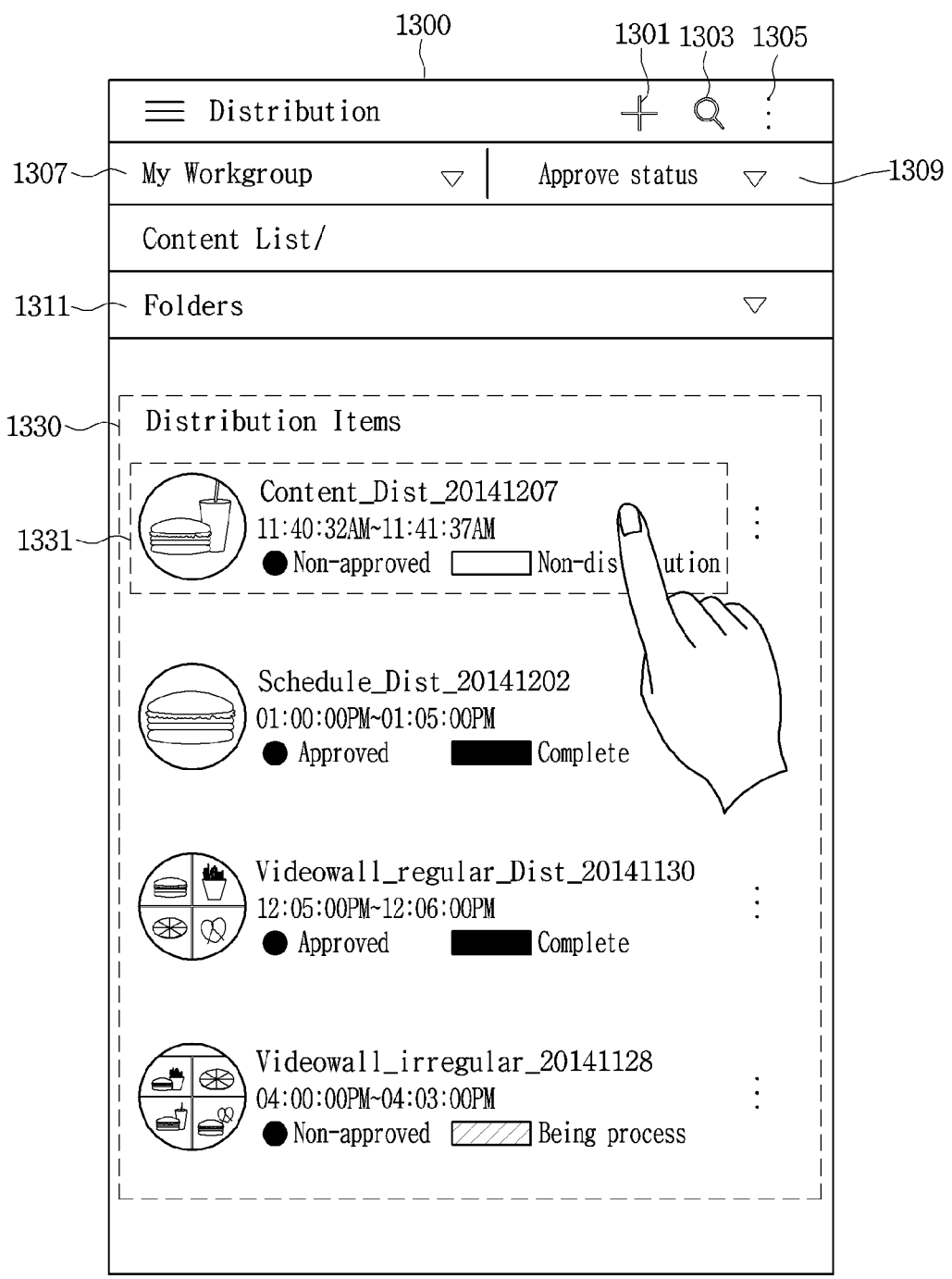
Figure 32B:

Referring to FIG. 32A, a distribution item list 1330 may include information on a plurality of distribution items. The information on each distribution item may include information on the number of a distribution item, a time in which content provided through the distribution item is to be reproduced, an approval status of the distribution item, and a distribution status (non-distribution, distribution completion, or during distribution \) of the distribution item. In the case that any one distribution item 1331 is selected among a plurality of distribution items 1339 included in the distribution item list 1330, the controller 180 may display a distribution item detail information screen 1430 as illustrated in FIG. 32B.

The distribution item detail information screen 1430 may include a distribution cancel icon 1431 for cancelling distribution, a distribution retrial icon 1432 for re-trying distribution, a distribution approval icon 1433 for approving a distribution item, a distribution rejection icon 1434 for rejecting the distribution item, a distribution cancel icon 1435 for cancelling the distribution item, a content image 1436 corresponding to the selected distribution item 1331, detail information 1437 on the selected distribution item 1331, and a player list 1438 to which the selected distribution item 1331 is to be distributed.

The detail information 1437 on the distribution item 1331 may include the name, a distribution time, a distribution completion time, a distribution state, a creation date, a creator, and a capacity of the distribution item, and information on an approver of the distribution item. The player list 1438 may include information on players having the distribution item distributed thereto.

Hereinafter, description will be made with reference to FIG. 33.

Figure 33A:
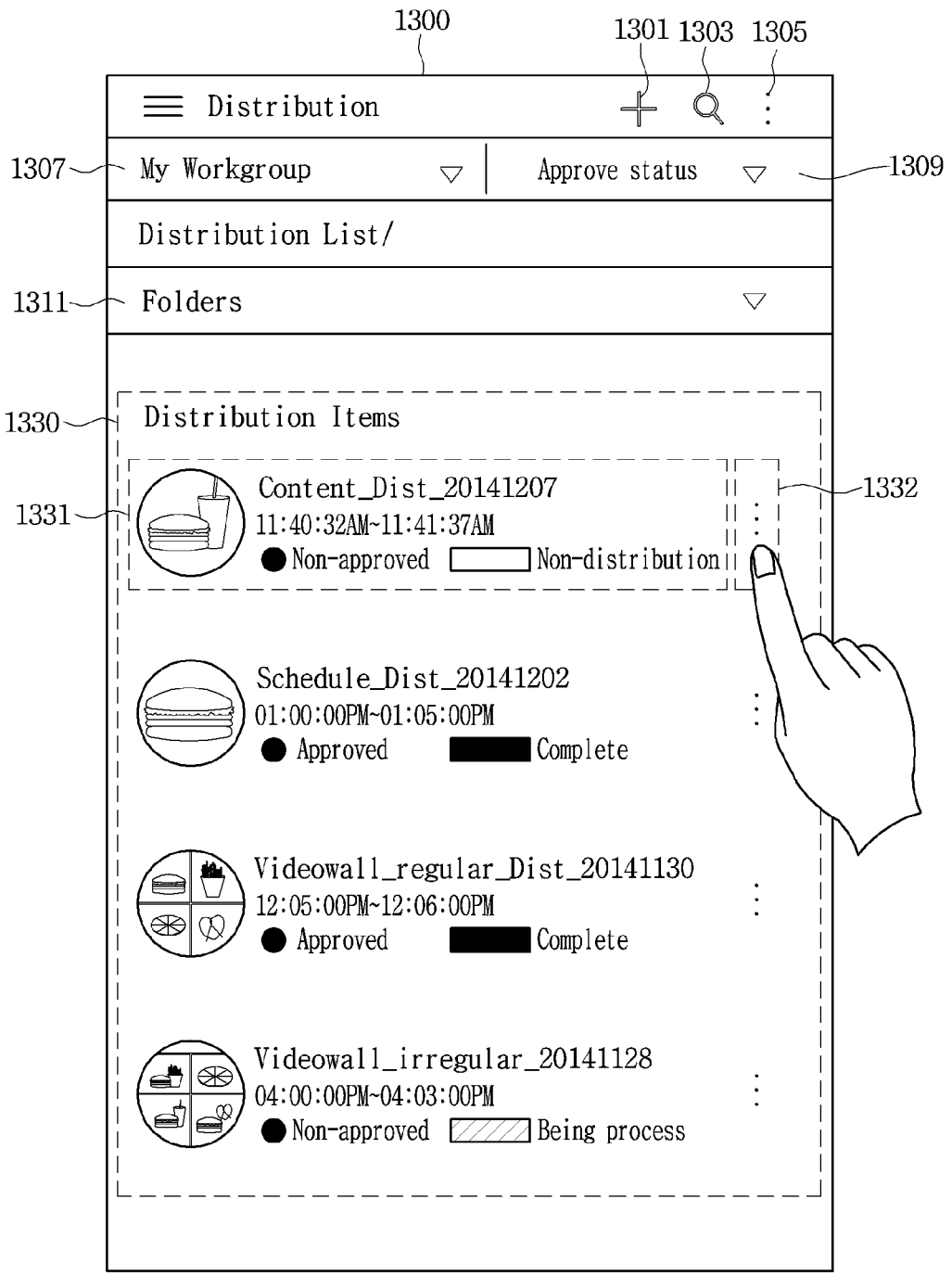
Figure 33B:
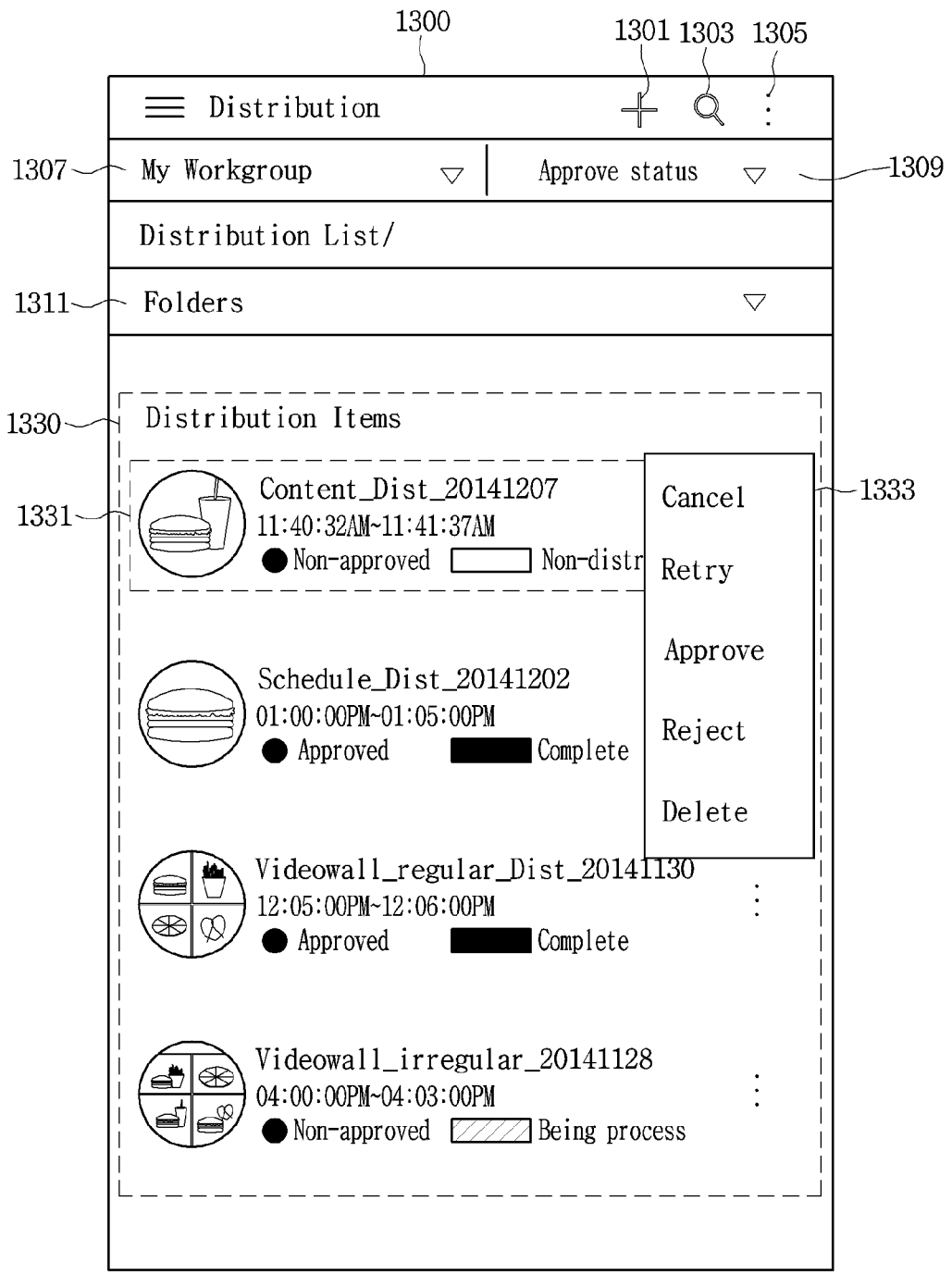

Referring to FIG. 33A, an approval setting icon 1332 may be further displayed at one side of the distribution item 1331 to set the approval status of the distribution item. In the case that the approval setting icon 1332 is selected, the controller 180 may display an approval setting window 1333 for setting the approval of the distribution item 1331 as illustrated in FIG. 33B. The approval setting window 1333 may include a cancel tap for cancelling the distribution item 1331, a re-trial tap for re-trying the distribution item 1331, an approval tap for approving the distribution item 1331, a rejection tap for rejecting the distribution item 1331, and a deletion tap for deleting the distribution item 1331.

Hereinafter, description will be made with reference to FIG. 34.

Figure 34A:
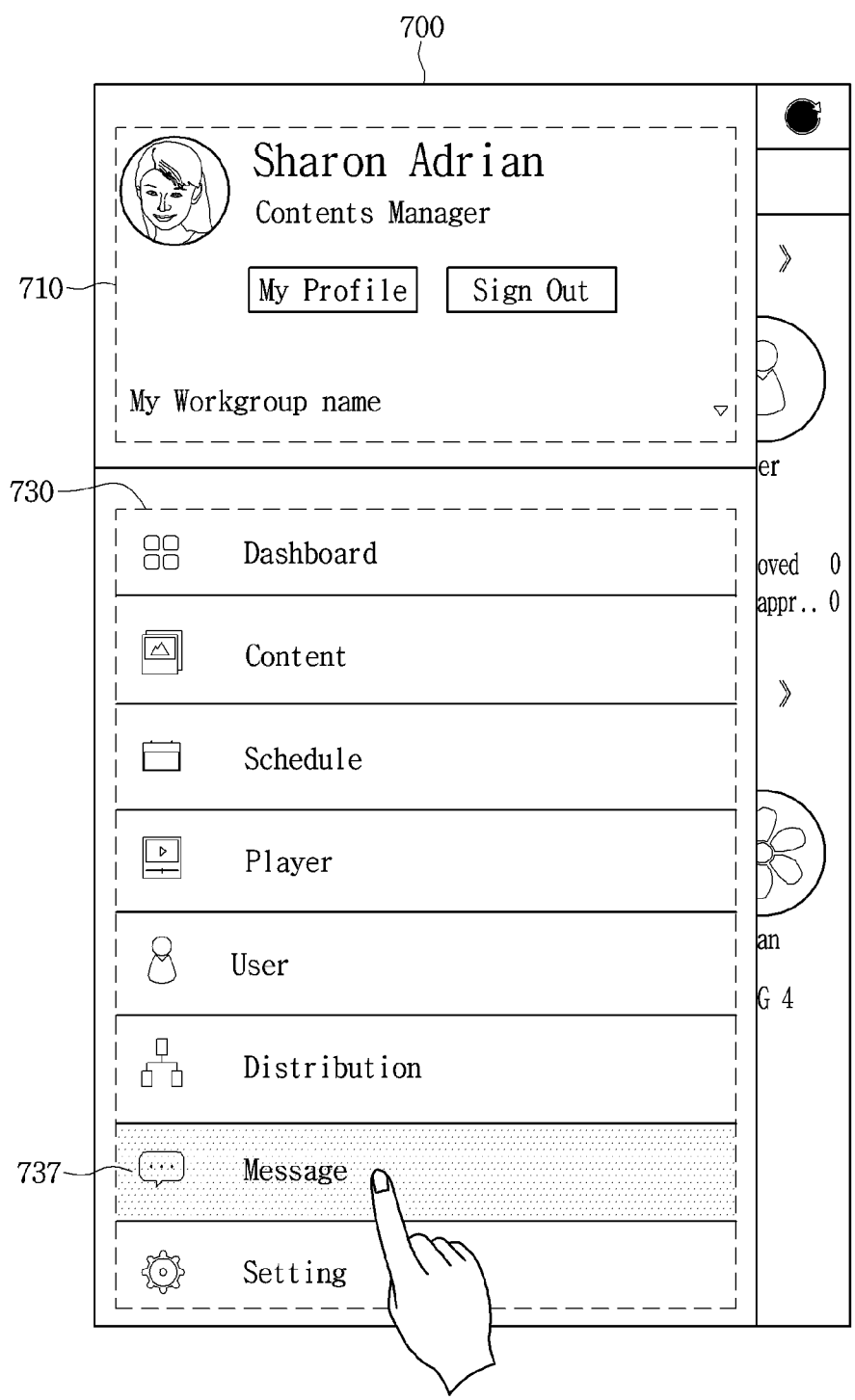
Figure 34B:
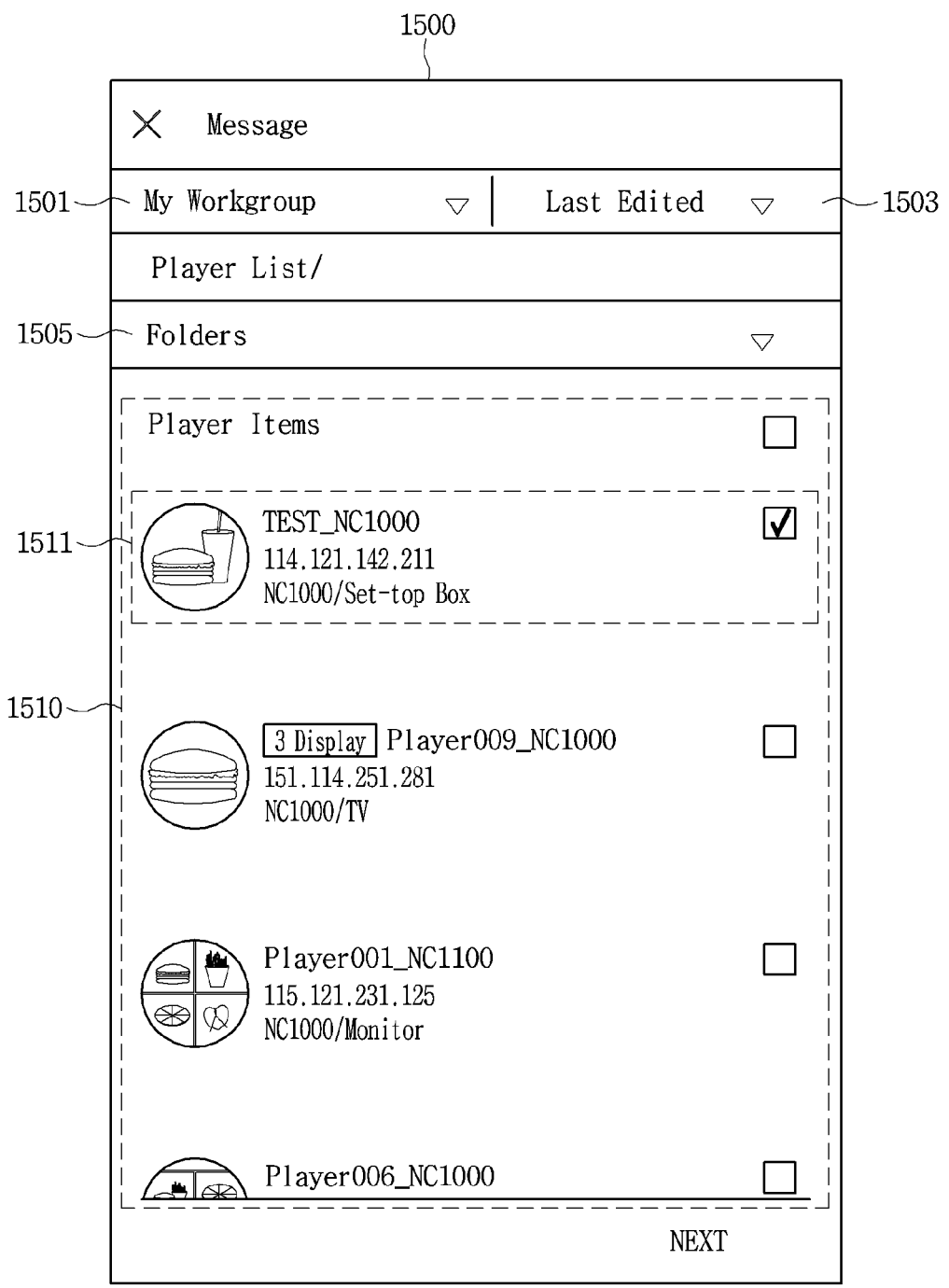

In the case that a message menu 737 is selected as illustrated in FIG. 34A, the controller 180 may display a screen 1550 for message transmission as illustrated in FIG. 34B. The screen 1500 for message transmission may include a workgroup button for selecting a work group, a sort button 1503 for sorting player items, which is used for message transmission, according to an editing time point, a creation date, a title, and a player type, a folder button 1505 for selecting a specific folder among a plurality of folders belonging to the work group, and a player item list 1510 including the player items.

Figure 34C:
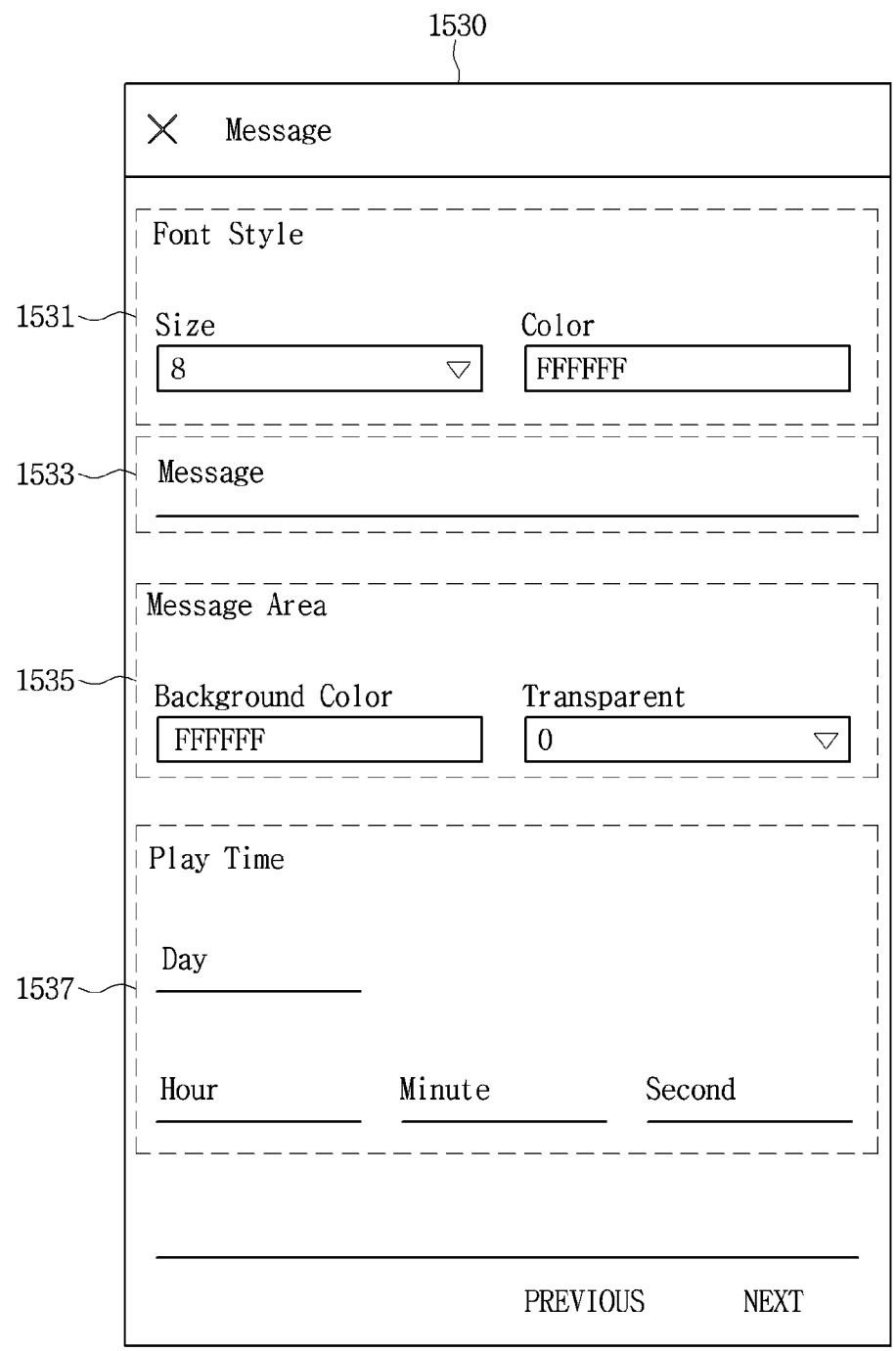

In the case that one player item 1511 is selected from a player item list 1510, the controller 180 may display a message detail setting screen 1530 as illustrated in FIG. 34C. The message detail setting screen 1530 may include a font style setting area 1531 for setting a font style, such as the size or the color of a message, a message input area 1533 for inputting words of the message, a message setting area 1535 for setting the background color and the transparency of an area in which the message is displayed, and a message reproduction time setting area 1537 for setting a reproduction time of the message.

Hereinafter, description will be made with reference to FIG. 35.

Figure 35A:
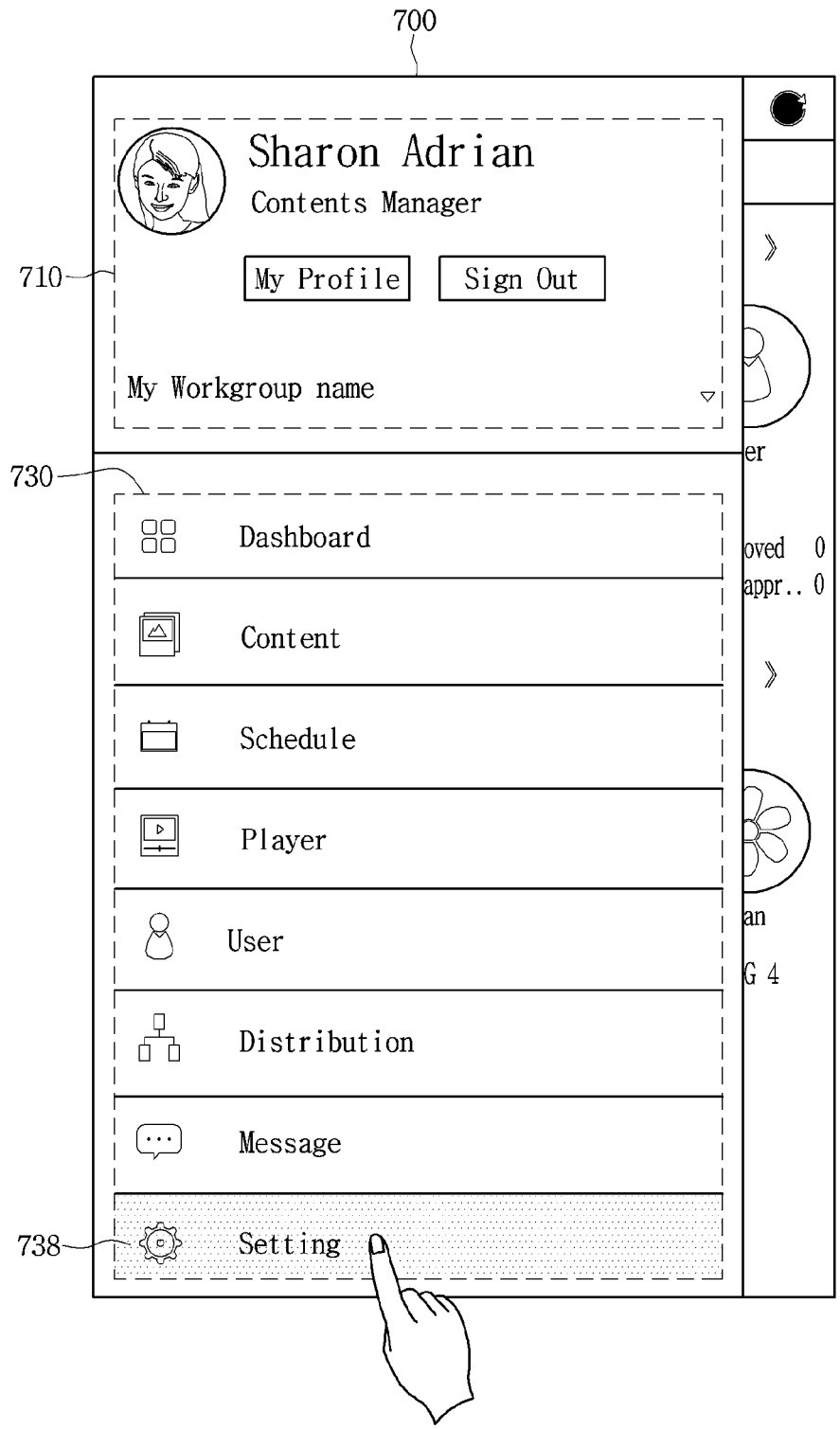
Figure 35B:
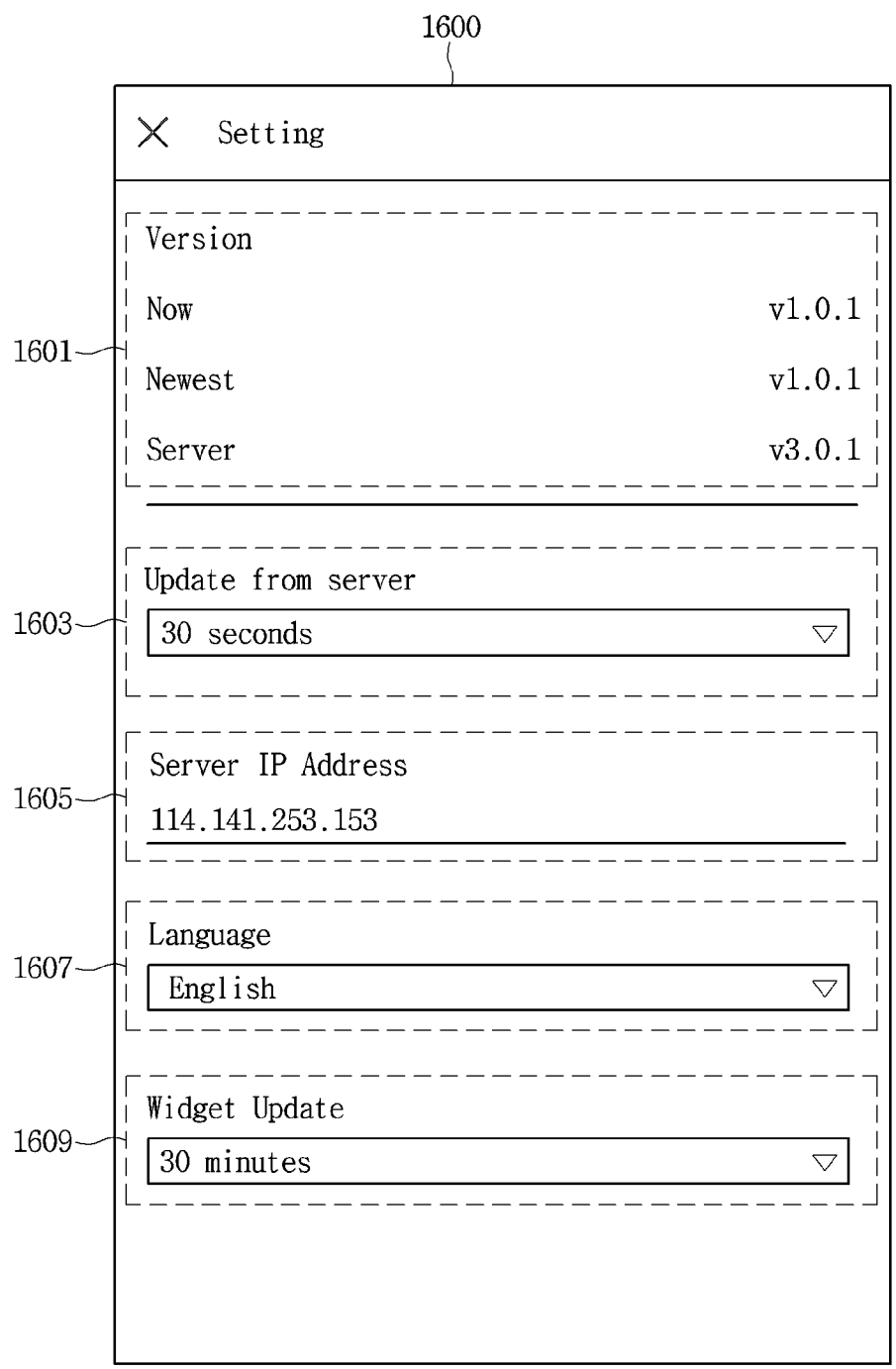

In the case that a setting menu 738 is selected as illustrated in FIG. 35A, the controller 180 may display a setting screen 1600 as illustrated in FIG. 35B. A setting screen 1600 may include a display area 1601 for the version information of a signage application, an update period setting area 1603 for setting a period in which information from the server 200 is updated, a display area 1605 of an IP address of the server 200, a language setting area 1607, and a widget update period setting area 1609 for setting a widget update period.

A version information display area 1606 may include a current version of the signage application installed in the mobile terminal 100, the latest version that may be provided to the server 200, and information on the version of the server 200.

The update period setting area 1603 may be an area for setting a period in which information related to the digital signage service is updated.

The display area 1605 of the IP address of the server 200 may be an area to display an IP address of the server 200 connected with the mobile terminal 100.

The language setting area 1607 may be an area for setting a language to be provided to a screen of the signage application.

The widget update period setting area 1609 may be an area for setting an update period to be provided on the screen of the signage application.

Hereinafter, the main screen 600 illustrated in FIG. 5 will be described again.

FIGS. 36 to 46 are views illustrating various user interface screens provided on the menu screen 600 if a specific button or a specific icon is selected on the menu screen 600, according to an embodiment of the present disclosure.

FIG. 36 illustrates a screen provided in the case that a whole approval status view button is selected, according to an embodiment of the present disclosure.

Figure 36A:
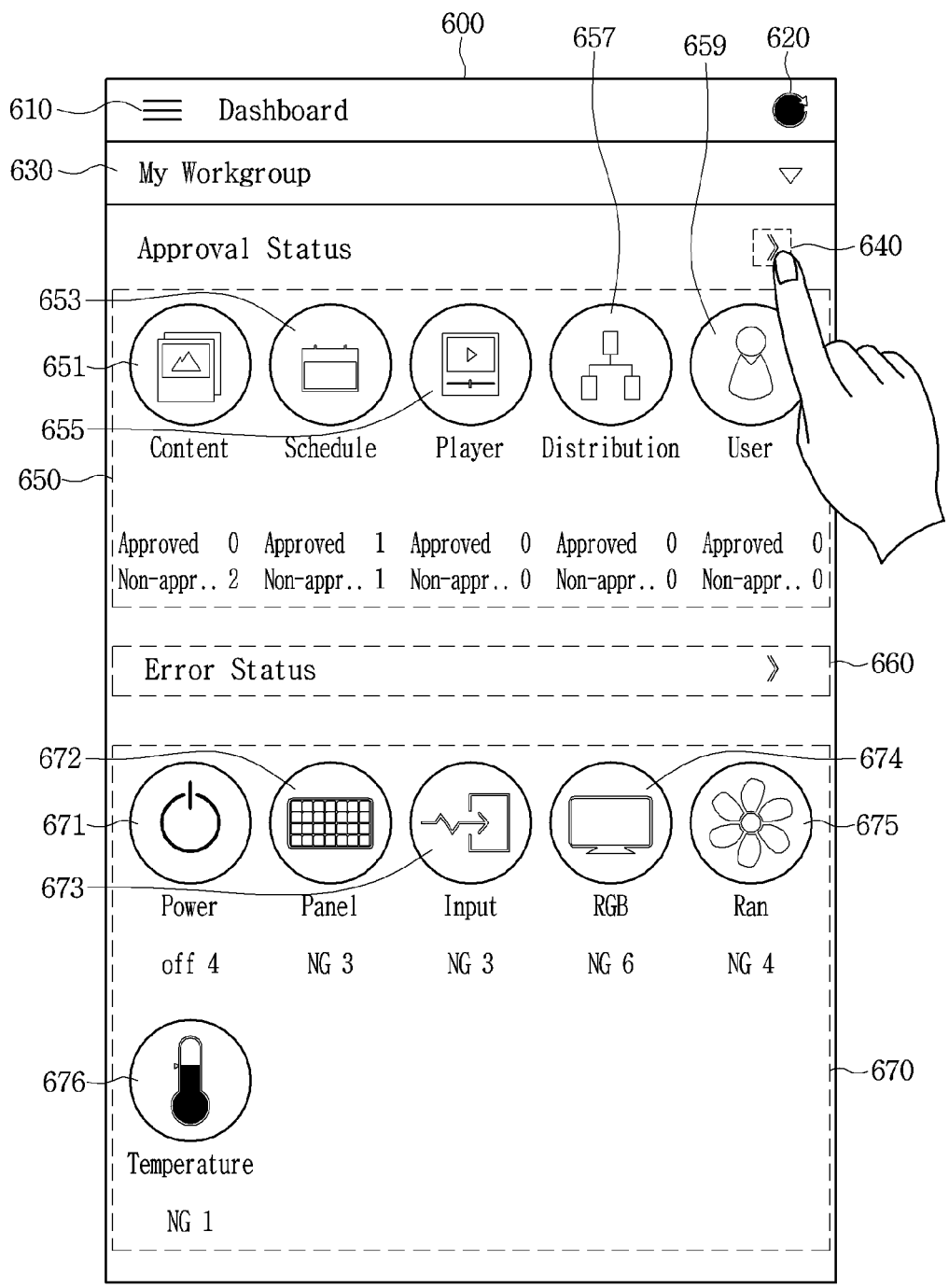
FIGS. 36 to 46 are views illustrating various user interface screens provided in the case that a specific button, an icon, and the like are selected on a menu screen according to an embodiment of the present disclosure.
Figure 36B:
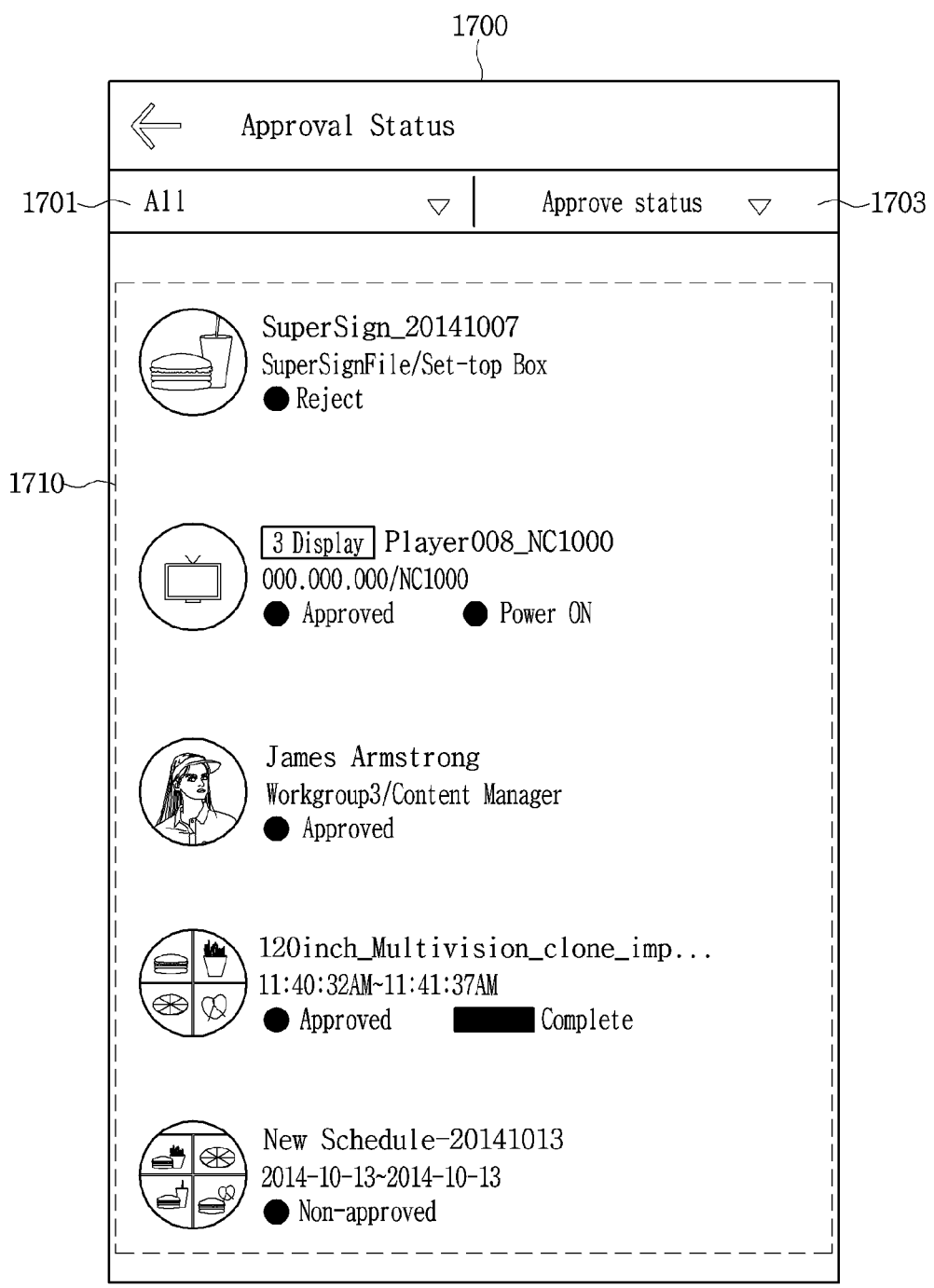

Referring to FIG. 36A, in the case that the whole approval status view button 640 is selected on the main screen 600, the controller 180 may display a whole approval status view screen 1700 as illustrated in FIG. 36B. The whole approval status view screen 1700 may include an item sort button 1701 for sorting a plurality of items, which are included in an item list 1710, according to an item type, an approval status sort button 1703 for sorting the items according to the approval status, and an item list 1710 including a plurality of items. The item list 1710 may include a content item, a schedule item, a player item, a distribution item, and a user item.

Hereinafter, description will be made with reference to FIG. 37A.

Figure 37A:
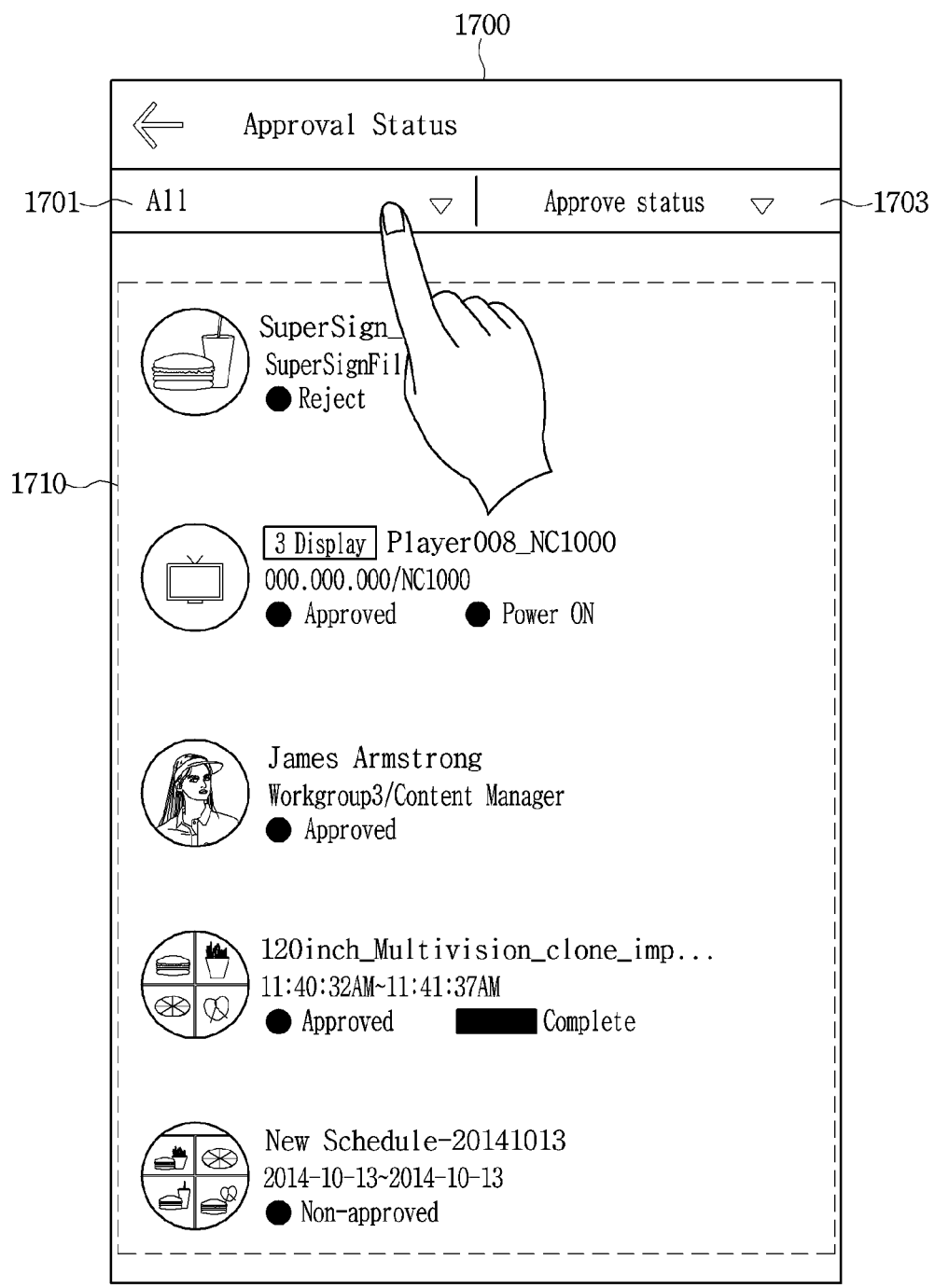
Figure 37B:
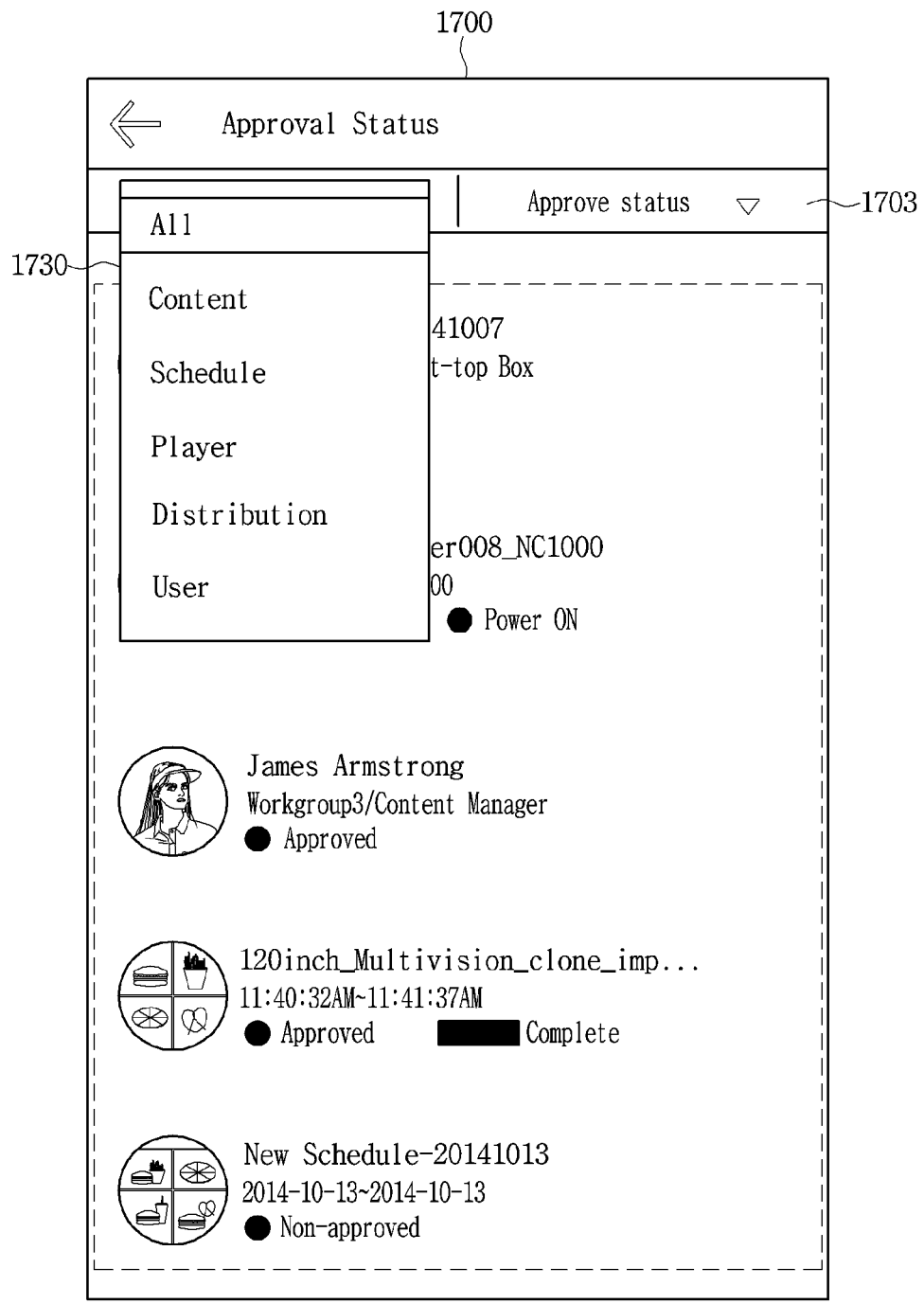

In the case that the item sort button 1701 is selected as illustrated in FIG. 37A, the controller 180 may display an item type window 1730 on the whole approval status view screen 1700 as illustrated in FIG. 37B. The item type window 1730 may include an "All" tap for providing approval statuses of all items included in the item list 1710, a "content" tap for providing an approval status of a content item among the all items included in the item list 1710, a "schedule" tap for providing an approval status of a schedule item among the all items included in the item list 1710, a "player" tap for providing an approval status of a player item among the all items included in the item list 1710, a "distribution" tap for providing an approval status of a distribution item among the all items included in the item list 1710, and a "user" tap for providing an approval status of a user items among all items included in the item list 1710. The user may recognize the approval statuses of the all items through the item type window 1730 and may recognize the approval statuses of a specific type of item.

Hereinafter, description will be made with reference to FIG. 38.

Figure 38A:
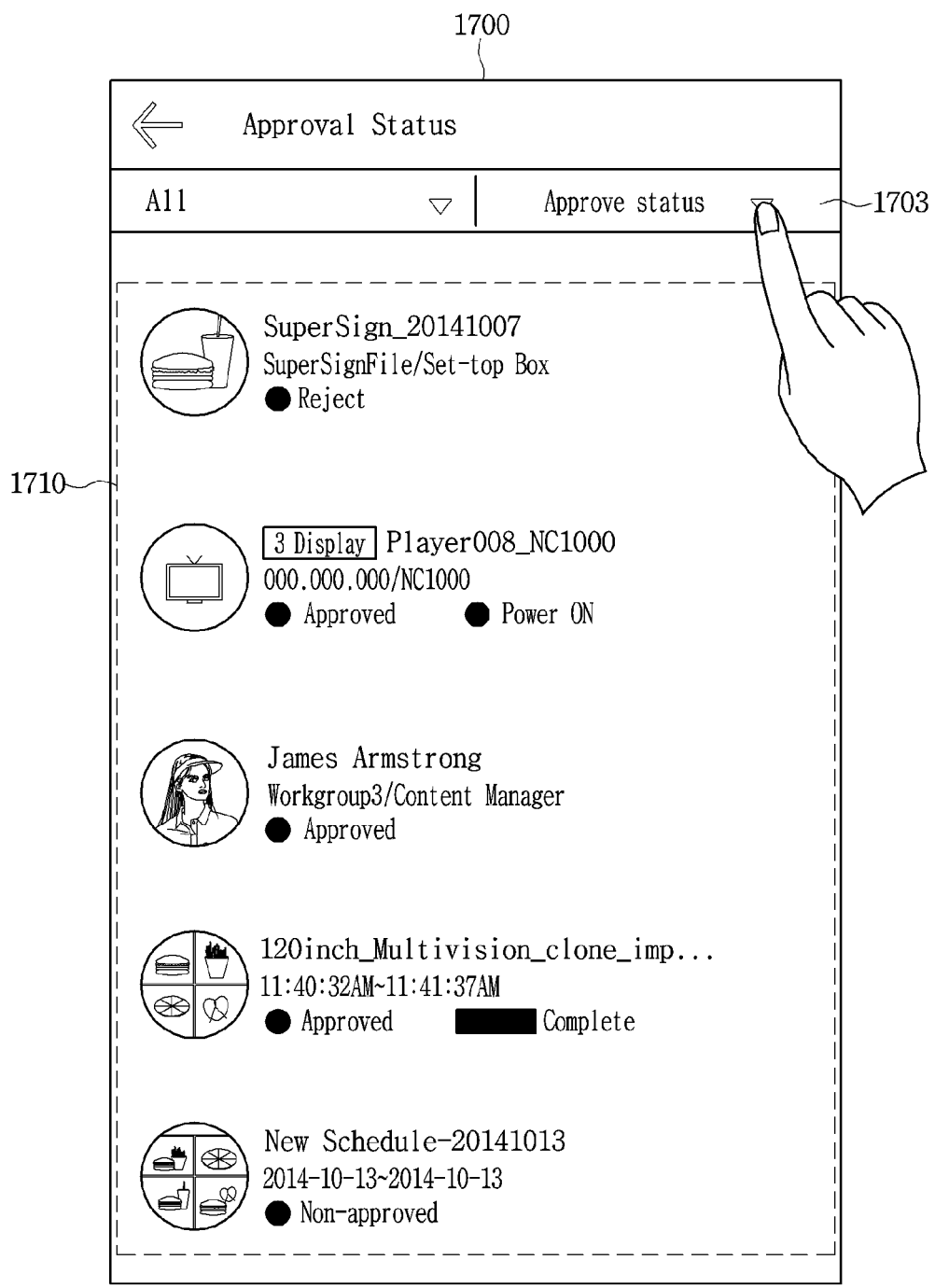
Figure 38B:
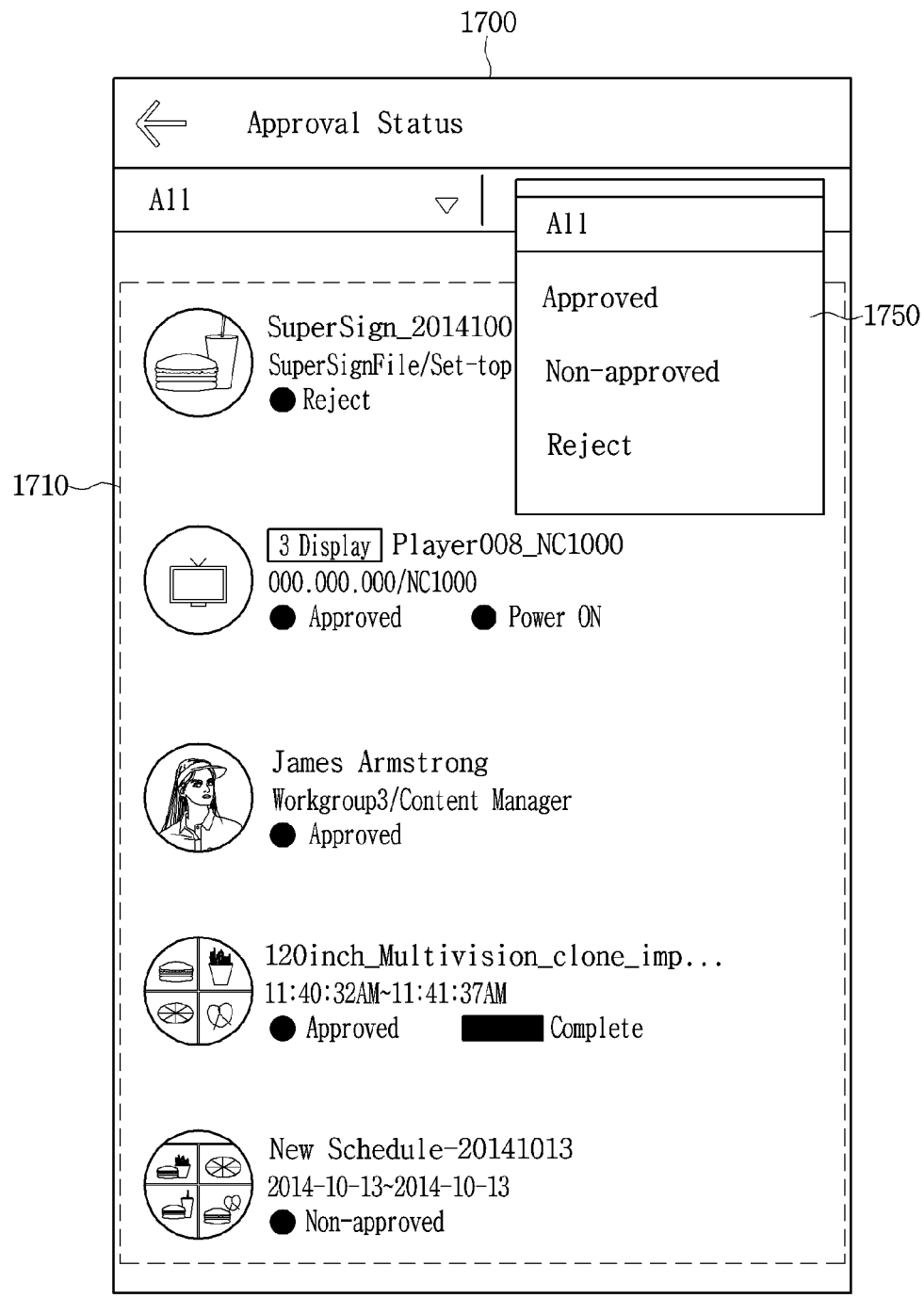

In the case that the approval status sort button 1703 is selected as illustrated in FIG. 38A, the controller 180 may include an approval status type window 1750 on the whole approval status view screen 1700 as illustrated in FIG. 38B. The approval status type window 1750 may include an "All" tap for providing approval statuses of all items included in the item list 1710, an "approved" tap for providing approved items among the all items included in the item list 1710, a "No-approved" tap for providing non-approved items among the all items included in the item list 1710, and a "reject" tap for providing only items rejected among the all items included in the item list 1710. The user may recognize the approval statuses of the all items through the approval status type window 1730, and may recognize approval status of items depending on whether the items are approved.

Hereinafter, the menu icon list 650 on the menu screen 600 of FIG. 5 will be described. The menu icon list 650 may be a list for providing the approve status of a specific type of items.

Hereinafter, description will be made with reference to FIG. 39.

FIG. 39 is a view illustrating a screen provided in the case that a content menu icon on the menu icon list 650 is selected.

Figure 39A:
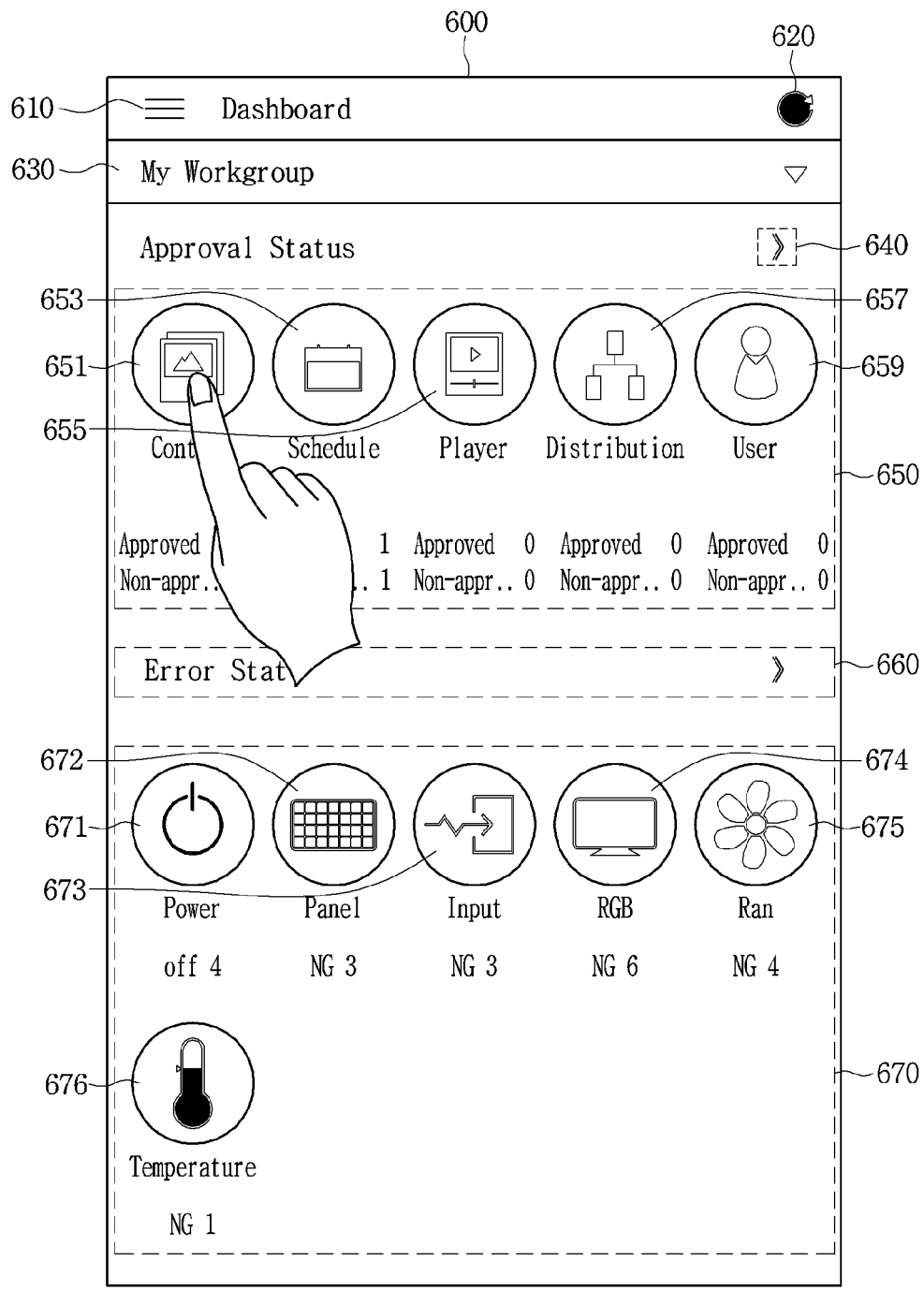
Figure 39B:
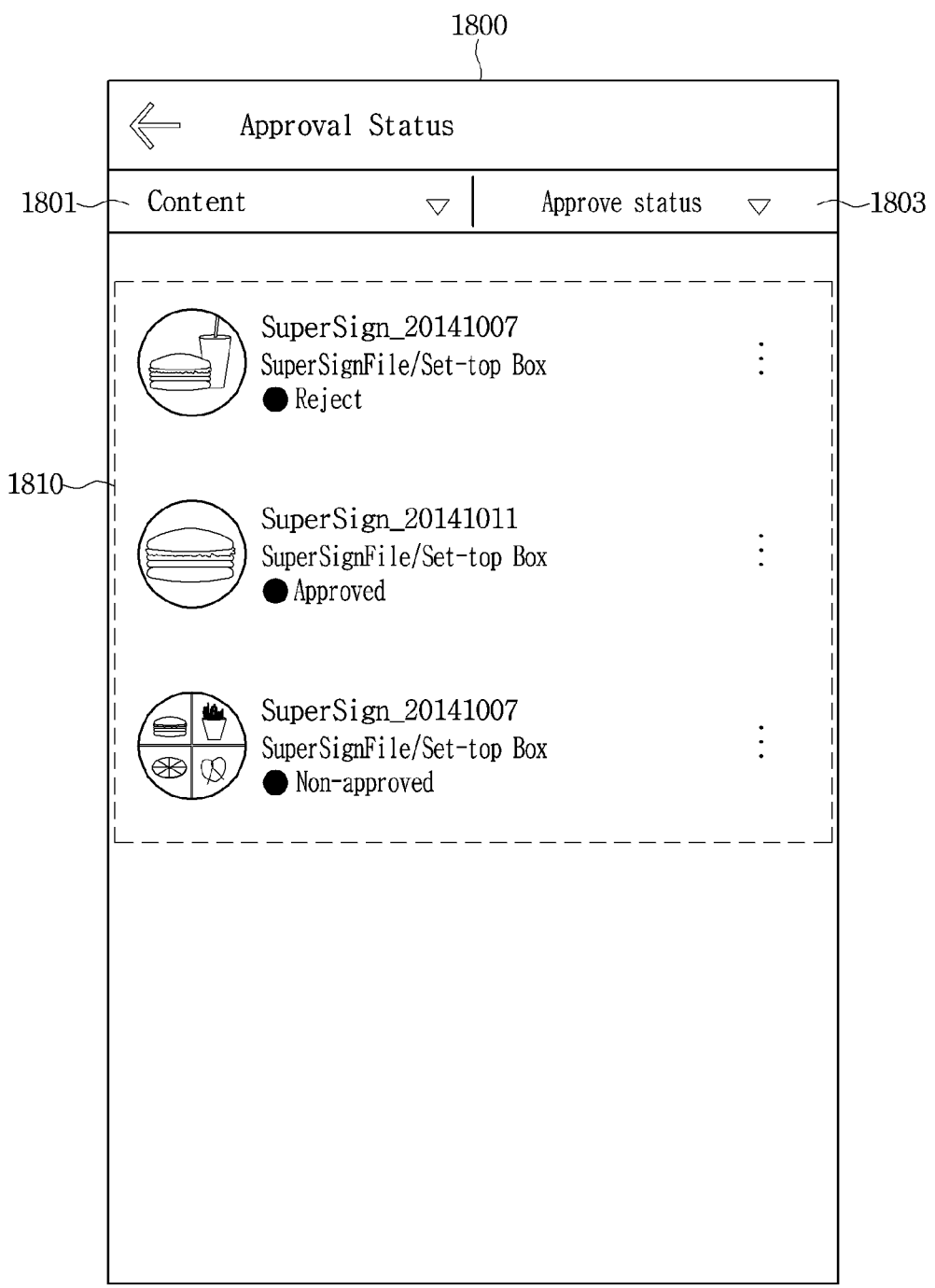

In the case that a content menu icon 651 is selected from the menu icon list 650 as illustrated in FIG. 39A, the controller 180 may display a content approval status screen 1800 as illustrated in FIG. 39B. The content approval status screen 1800 may include an item sort button 1801, an approval status sort button 1803, and a content item list 1810.

The item sort button 1801 may be a button for performing the same function as that of the item sort button 1701 described with reference to FIGS. 36 and 37. The approval status sort button 1803 may be a button for performing the same function as that of the approval status sort button 1703 described with reference to FIGS. 36 and 38.

The content item list 1810 may include information on an approval status of each content item. The information on the approval status may include any one of "reject", "approved", and "No-approved". The user may recognize information on the approval status of each content item, and may approve or reject each content item.

Hereinafter, description will be made with reference to FIG. 40.

FIG. 40 is a view illustrating a screen provided in the case that a schedule menu icon on the menu icon list 650 is selected.

Figure 40A:
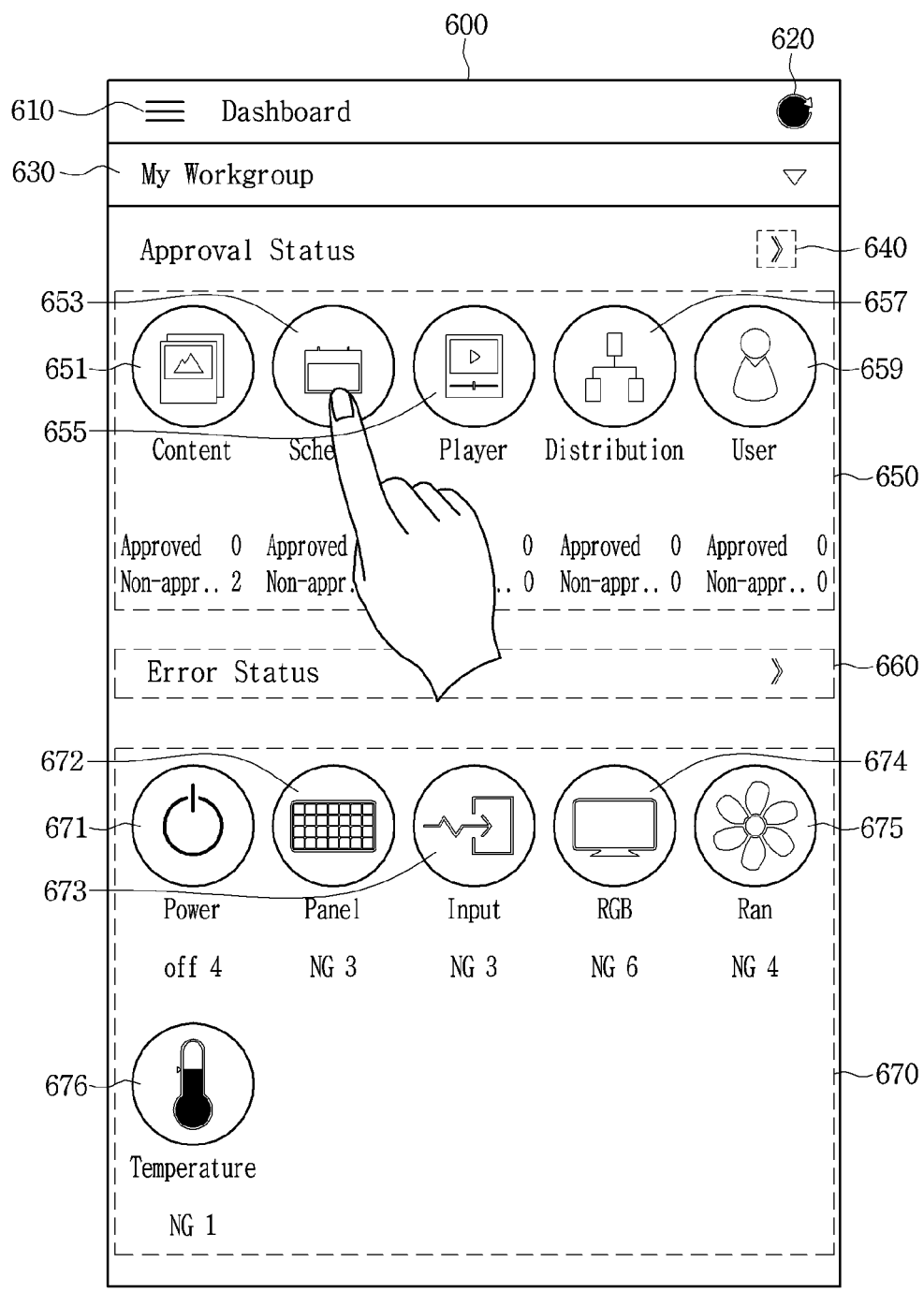
Figure 40B:
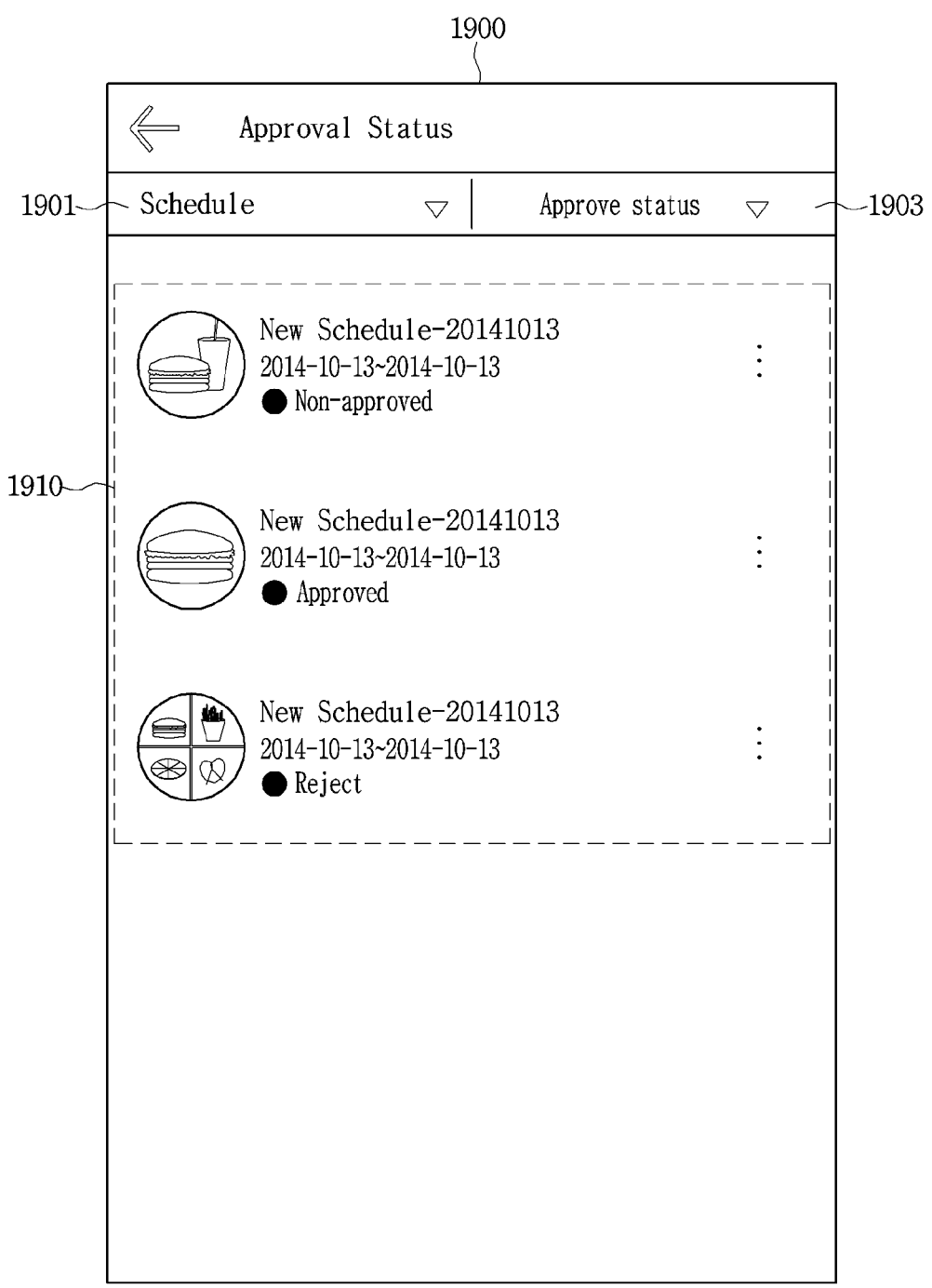

In the case that a schedule menu icon 653 is selected from the menu icon list 650 as illustrated in FIG. 40A, the controller 180 may display a schedule approval status screen 1900 as illustrated in FIG. 40B. The schedule approval status screen 1900 may include an item sort button 1901, an approval status sort button 1903, and a schedule item list 1910.

The item sort button 1901 may be a button for performing the same function as that of the item sort button 1701 described with reference to FIGS. 36 and 37. The approval status sort button 1903 may be a button for performing the same function as that of the approval status sort button 1703 described with reference to FIGS. 36 and 38.

The schedule item list 1910 may include information on an approval status of each schedule item. The information on the approval status may include any one of "reject", "approved", and "No-approved". The user may recognize information on the approval status of each schedule item, and may approve or reject each schedule item.

Hereinafter, description will be made with reference to FIG. 41.

FIG. 41 is a view illustrating a screen provided in the case that a player menu icon on the menu icon list 650 is selected.

Figure 41A:
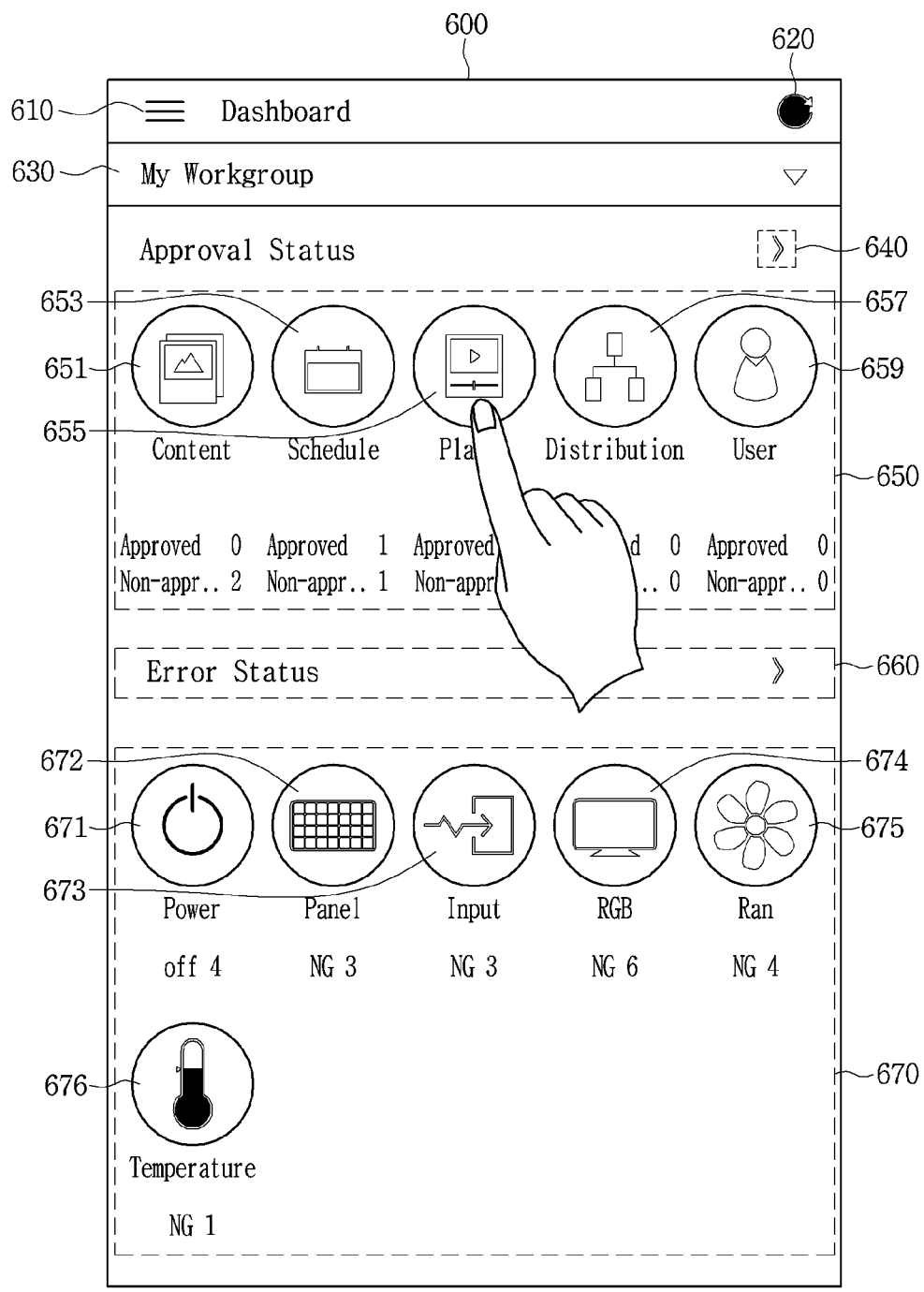
Figure 41B:
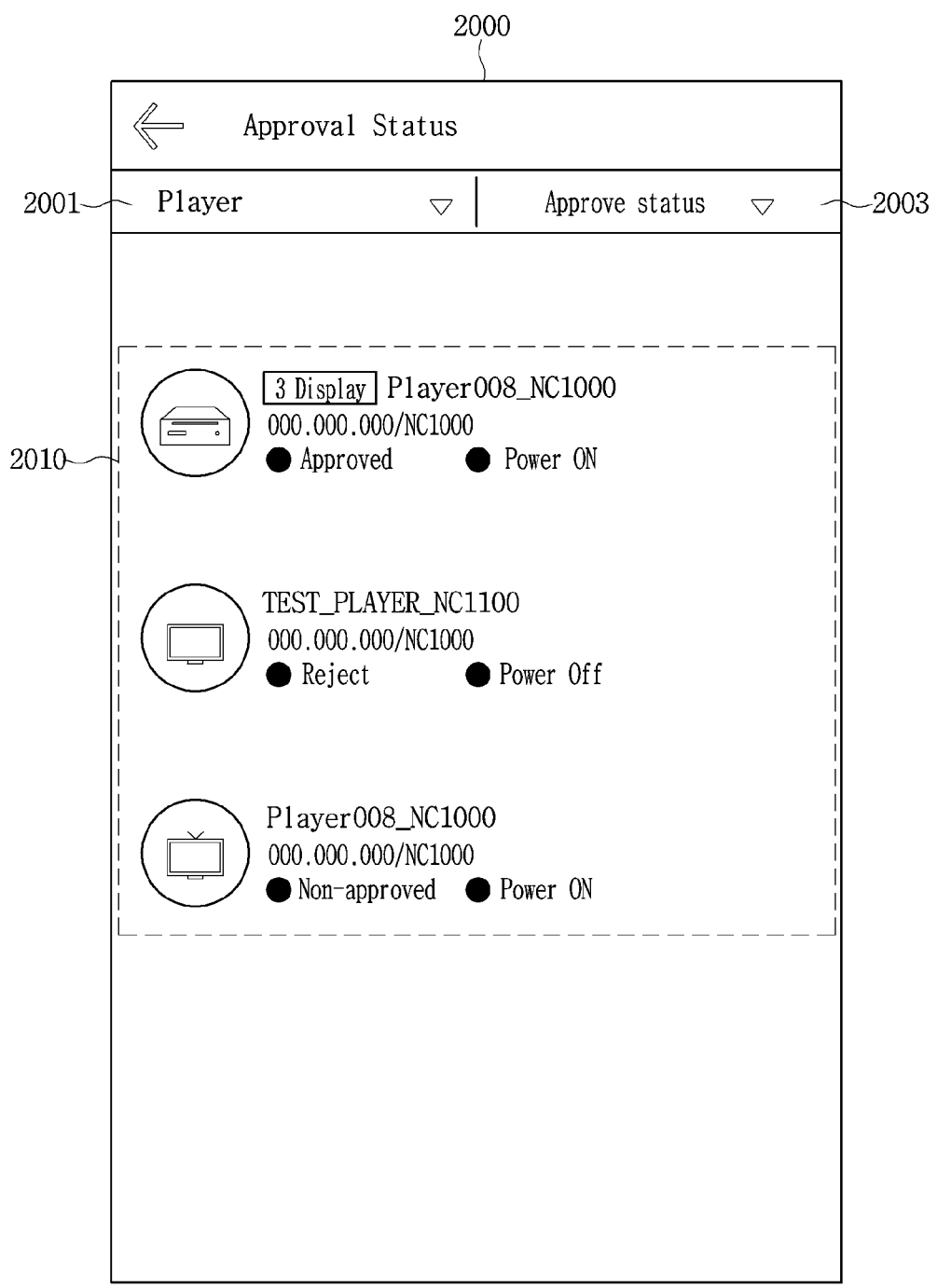

In the case that a player menu icon 655 is selected from the menu icon list 650 as illustrated in FIG. 41A, the controller 180 may display a player approval status screen 2000 as illustrated in FIG. 41B. The player approval status screen 2000 may include an item sort button 2001 an approval status sort button 2003, and a player item list 2010.

The item sort button 2001 may be a button for performing the same function as that of the item sort button 1701 described with reference to FIGS. 36 and 37. The approval status sort button 2003 may be a button for performing the same function as that of the approval status sort button 1703 described with reference to FIGS. 36 and 38.

The player item list 2010 may include information on an approval status of each player item. The information on the approval status may include any one of "reject", "approved", and "No-approved". The user may recognize information on the approval status of each player item, and may approve or reject each player item.

Hereinafter, description will be made with reference to FIG. 42.

FIG. 42 is a view illustrating a screen provided in the case that a distribution menu icon on the menu icon list 650 is selected.

Figure 42A:
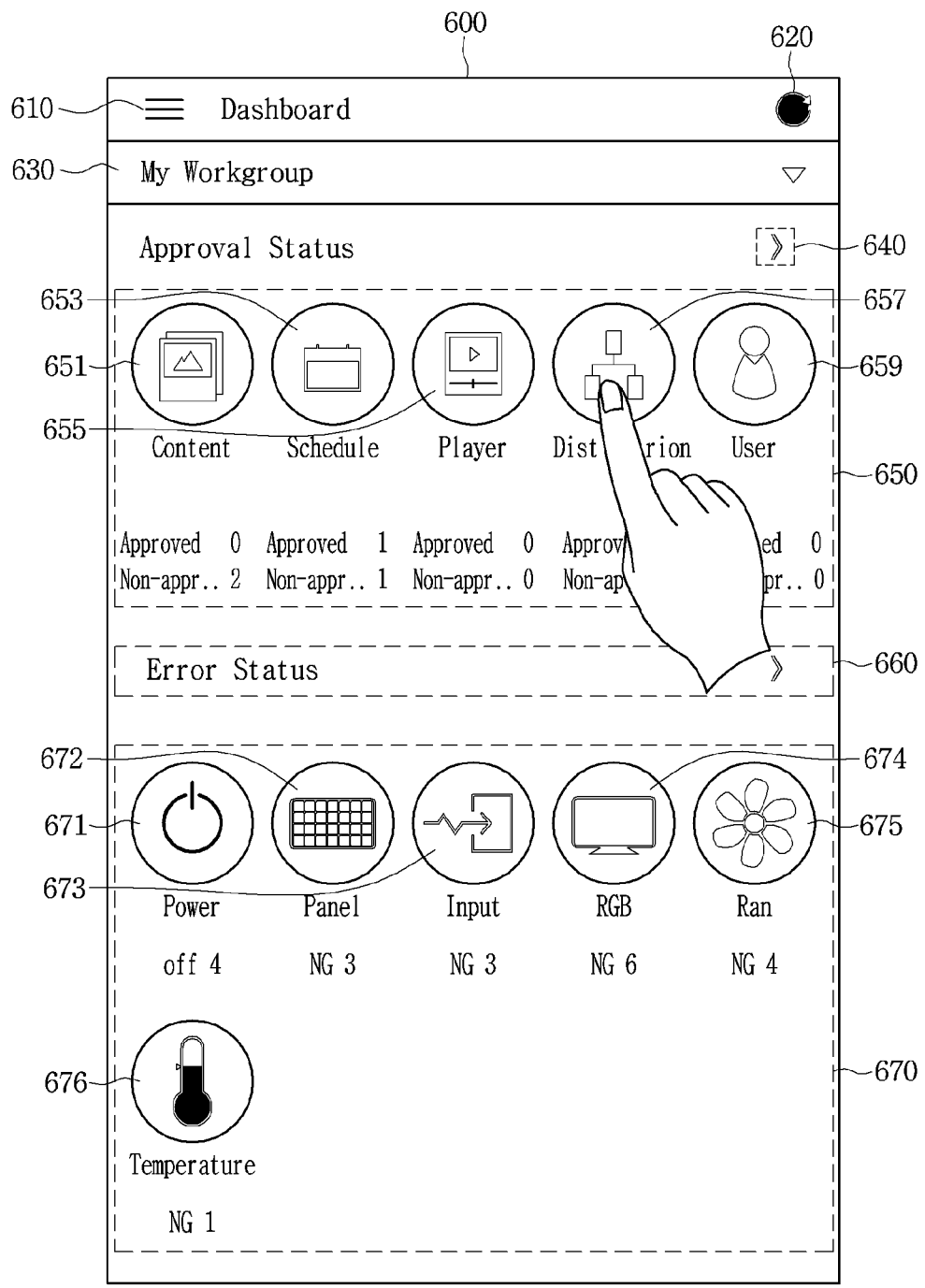
Figure 42B:
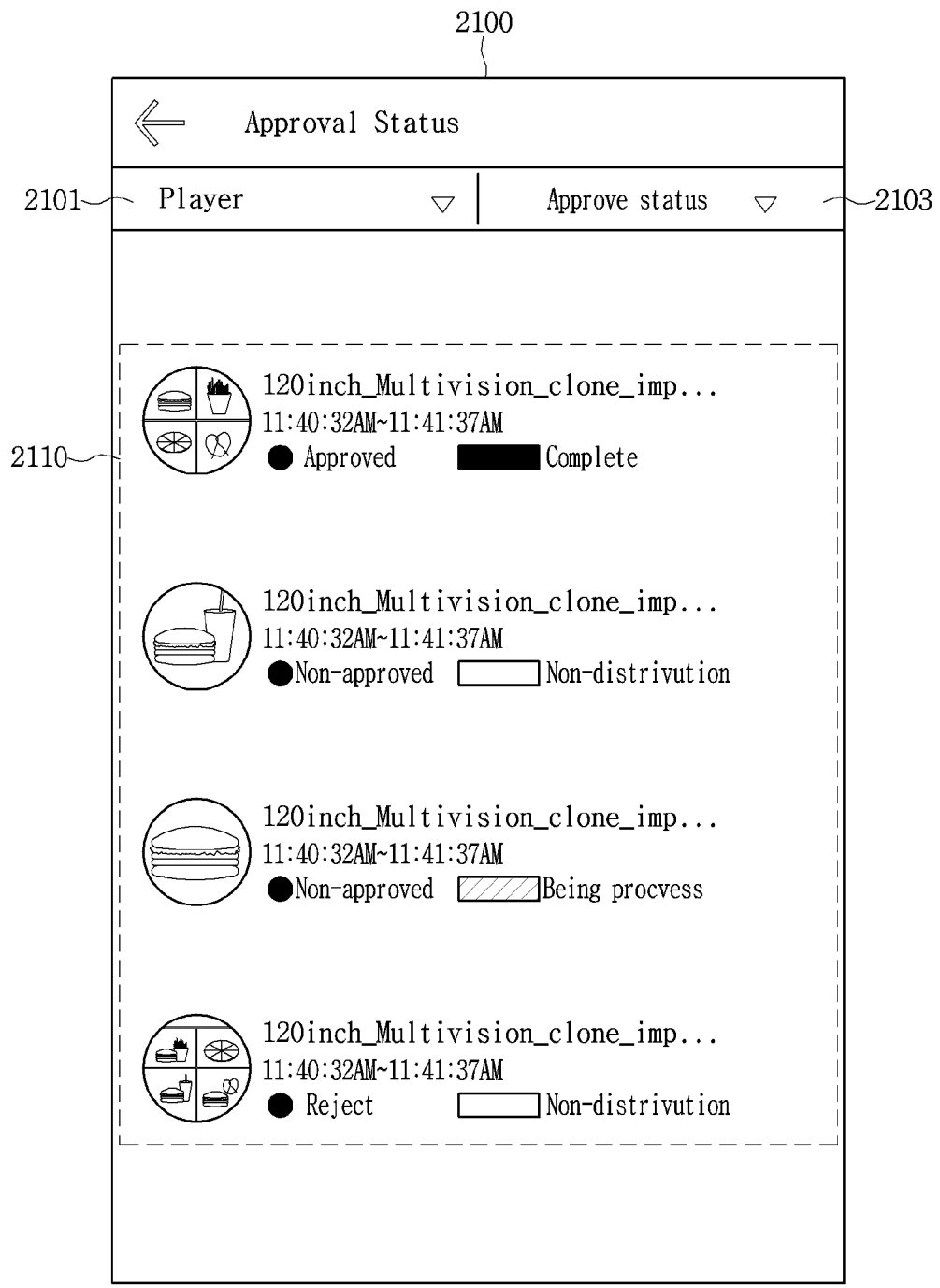

In the case that a distribution menu icon 657 is selected from the menu icon list 650 as illustrated in FIG. 42A, the controller 180 may display a distribution approval status screen 2100 as illustrated in FIG. 42B. The distribution approval status screen 2100 may include an item sort button 2101 an approval status sort button 2103, and a distribution item list 2110.

The item sort button 2101 may be a button for performing the same function as that of the item sort button 1701 described with reference to FIGS. 36 and 37. The approval status sort button 2103 may be a button for performing the same function as that of the approval status sort button 1703 described with reference to FIGS. 36 and 38.

The distribution item list 2110 may include information on an approval status of each distribution item. The information on the approval status may include any one of "reject", "approved", and "No-approved". The user may recognize information on the approval status of each distribution item, and may approve or reject each distribution item.

Hereinafter, description will be made with reference to FIG. 43.

FIG. 42 is a view illustrating a screen provided in the case that a user menu icon on the menu icon list 650 is selected.

Figure 43A:
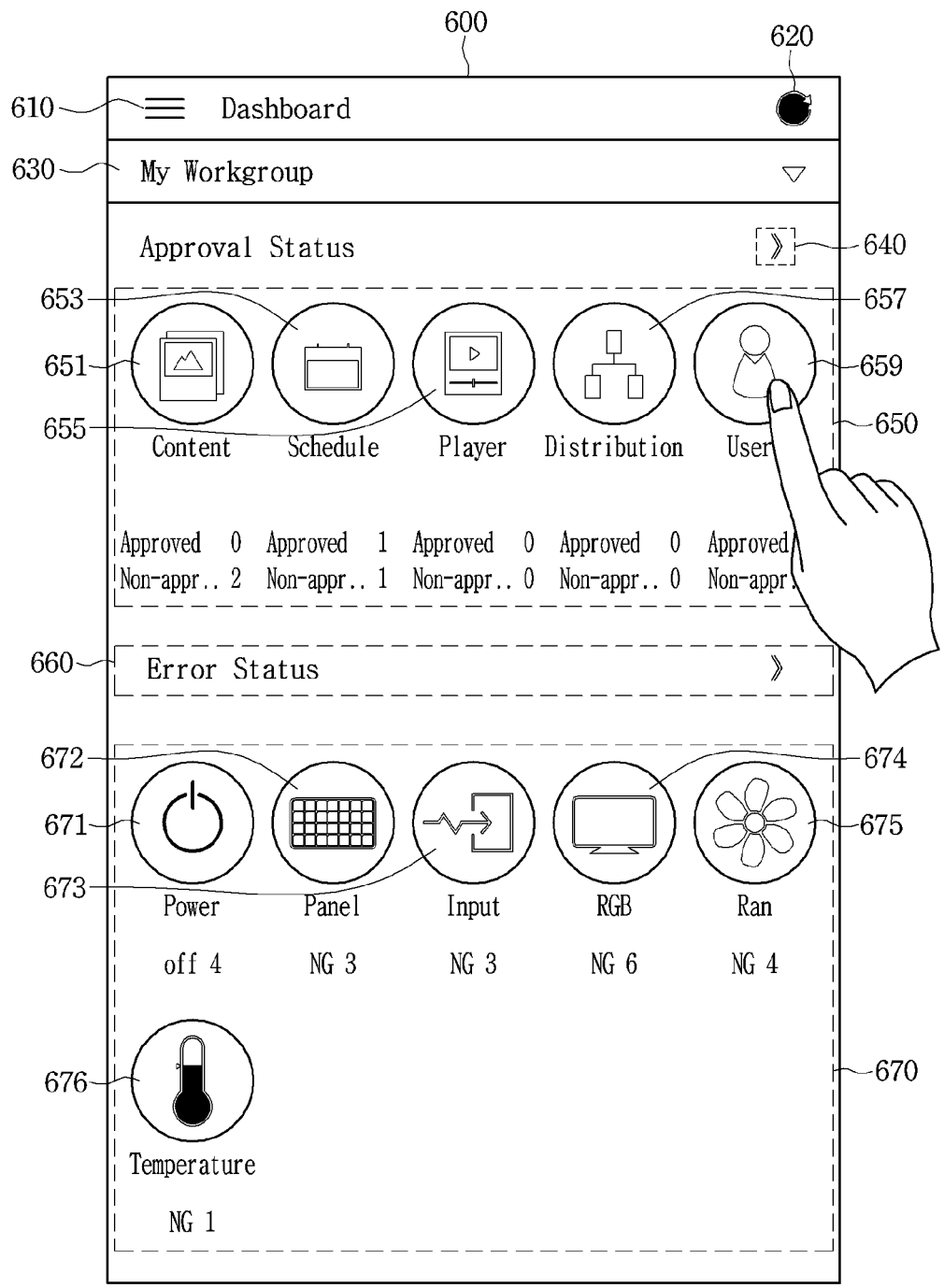
Figure 43B:
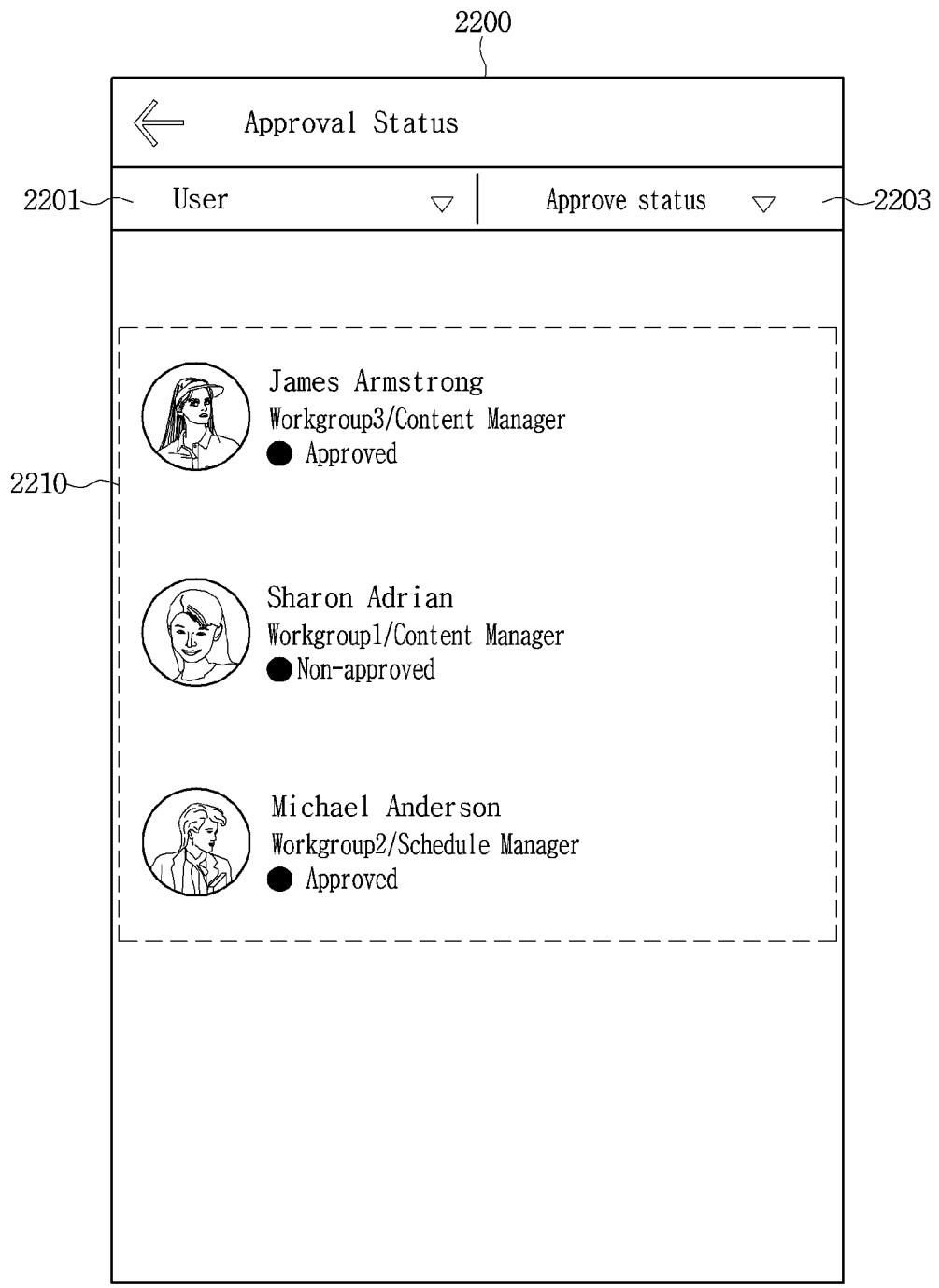

In the case that a user menu icon 659 is selected from the menu icon list 650 as illustrated in FIG. 43A, the controller 180 may display a user approval status screen 2200 as illustrated in FIG. 43B. The user approval status screen 2200 may include an item sort button 2201 an approval status sort button 2203, and a user item list 2210.

The item sort button 2201 may be a button for performing the same function as that of the item sort button 1701 described with reference to FIGS. 36 and 37. The approval status sort button 2203 may be a button for performing the same function as that of the approval status sort button 1703 described with reference to FIGS. 36 and 38.

The user item list 2110 may include information on an approval status of each user item. The information on the approval status may include any one of "reject", "approved", and "No-approved". The user may recognize information on the approval status of each user item, and may approve or reject each distribution item.

According to an embodiment of the present disclosure, the mobile terminal 100 may approve or reject the access to the menu icon included in the menu icon list 650 according to the authority of the user logged into the signage application. To this end, the controller 180 may differently display menu icons included in the menu icon list 650 according to the authority of the user logged in, which will be described below with reference to FIG. 44.

Figure 44:
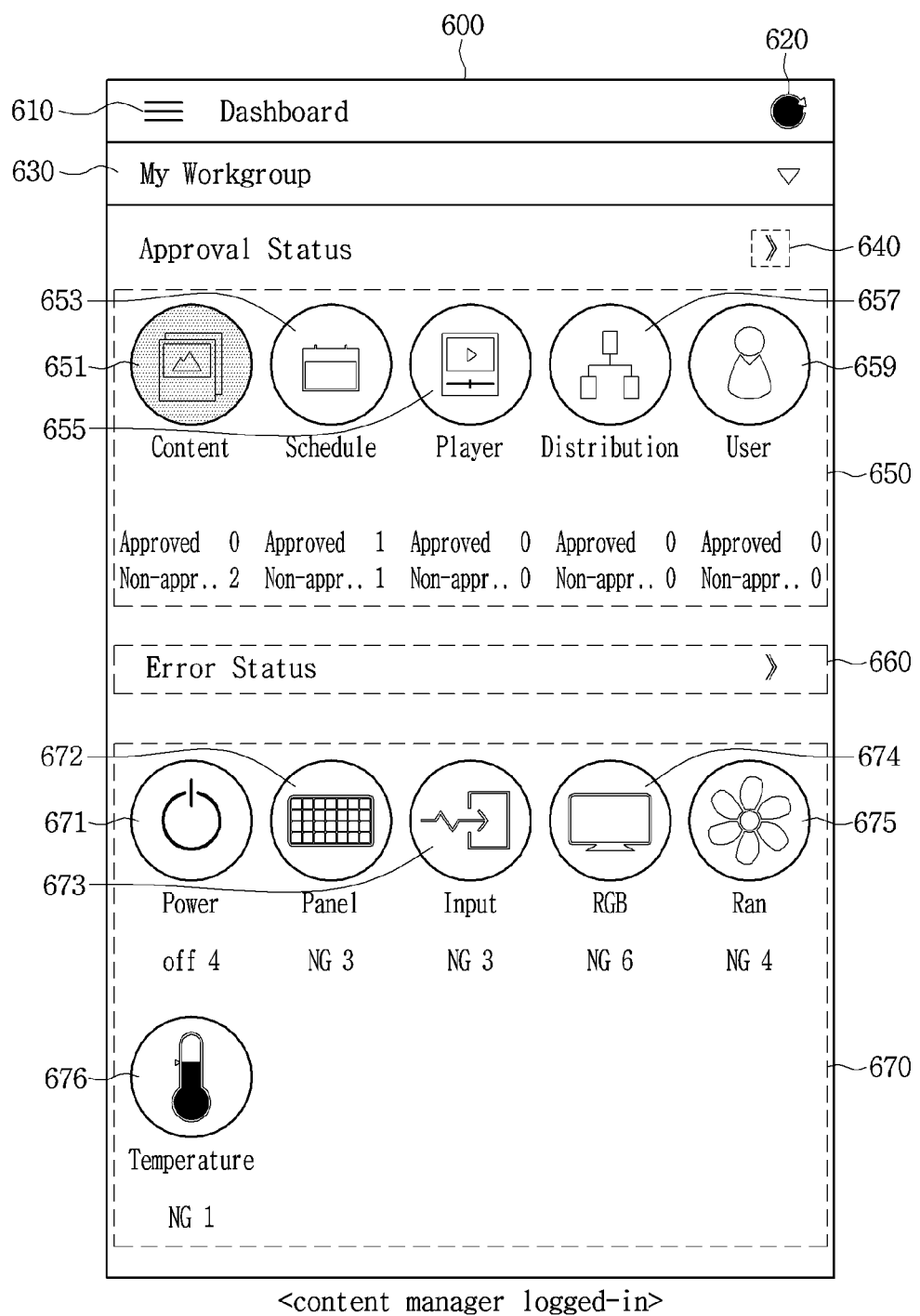

FIG. 44 is a view illustrating a screen in which the menu icons included in the menu icon list are differently displayed according to the authority of the user logged into the signage application.

The logged in user may be any one of a content manager who is able to manage only a content item, a schedule manager who is able to manage only a schedule item, a player manager who is able to manage only a player item, a distribution manager who is able to manage only a distribution item, and a general manager who is able to manage all of the content item, the schedule item, the player item, the distribution item, and the user item.

The content manager may have an authority of managing a content item to determine an approval status of the content item. For example, in the case that the content manager is logged in, the controller 180 may display the content icon 651 among the menu icons included in the menu icon list 650 differently from other menu icons 653 to 659. For example, the controller 180 may display the content icon 651 differently from the other menu icons 653 to 650 by highlighting the content icon 651 as illustrated in FIG. 44.

The schedule manager may have an authority of managing a schedule item to determine an approval status of the schedule item.

The player manager may have an authority of managing a player item to determine an approval status of the player item.

The distribution manager may have an authority of managing a distribution item to determine an approval status of the distribution item.

The general manager may have the authority of managing items to determine approval status of the content item, the schedule item, the player item, and the distribution item.

Meanwhile, in the case that the general manager is logged in, the controller 180 may process the menu icons 651 to 659 included in the menu icon list 650 by highlighting the menu icons.

Hereinafter, description will be made with reference to FIG. 45.

FIG. 45 is a view illustrating a screen provided in the case that a whole error status view button is selected from the main screen according to an embodiment of the present disclosure.

Figure 45A:
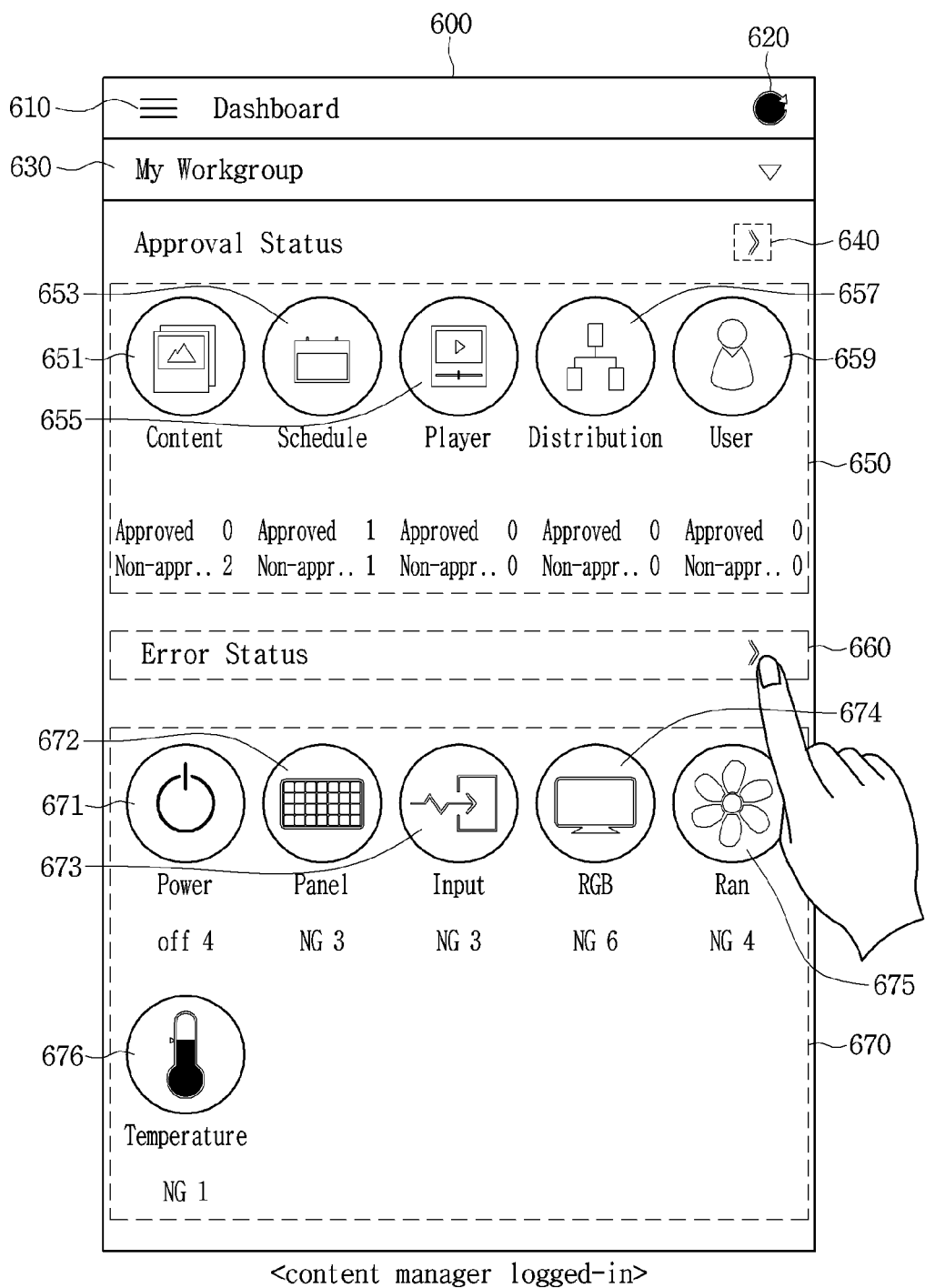
Figure 45B:
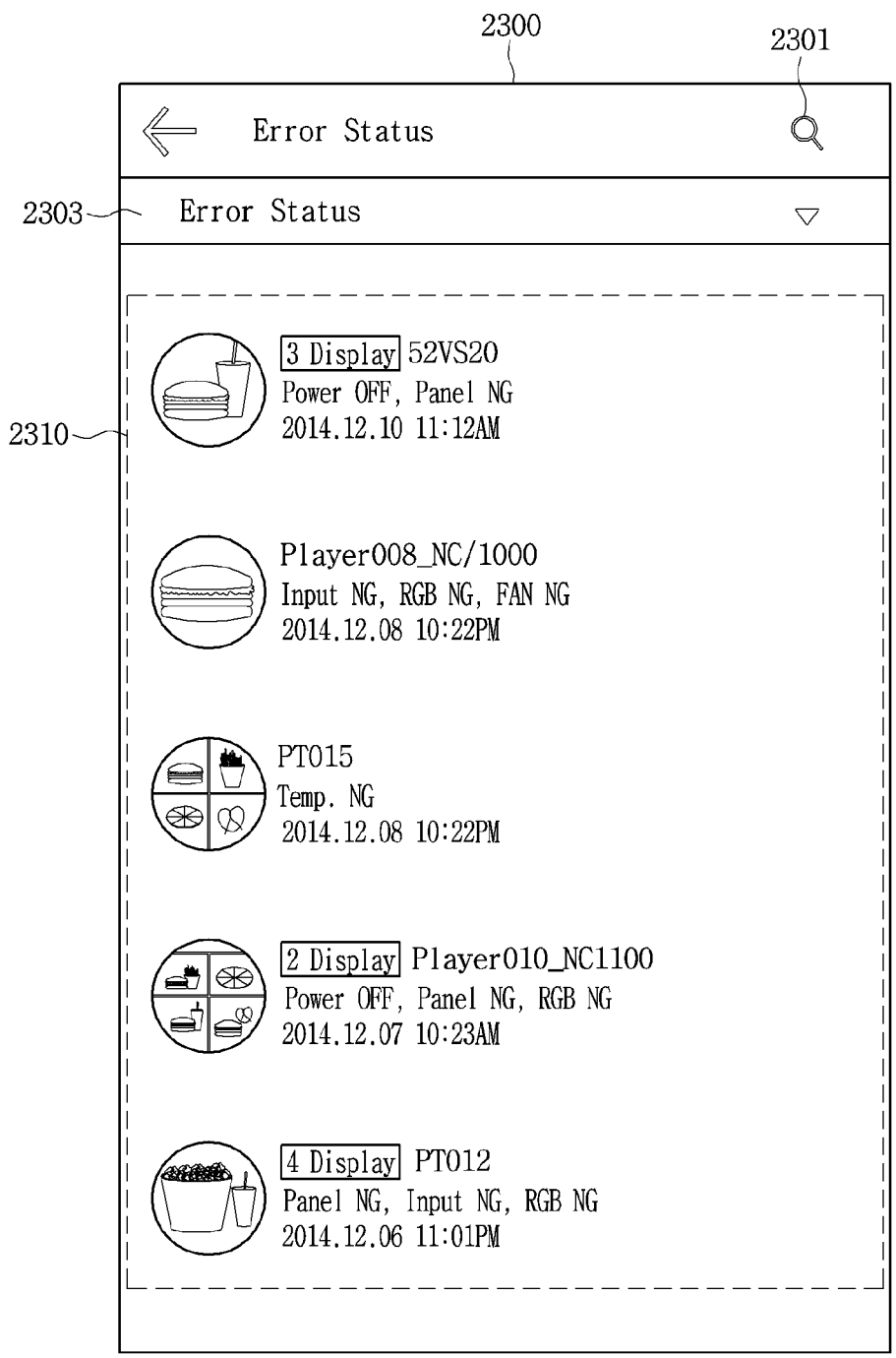

In the case that the whole error status view button 660 is selected from the main screen 600 as illustrated in FIG. 45A, the controller 180 may display the error status screen 2300 of the digital signage device 300 as illustrated in FIG. 45B. The error status screen 2300 may include a search button 2301, an error status sort button 2303, and a player item list 2310.

The search button 2301 is a button for searching for a player item on the player item list 2310. The error status sort button 2303 is a button for sorting player times according to the types of errors.

The player item list 2310 may include information on errors of the player items, player, error status information for notifying an error, which has occurred, among the types of errors, and information on a time in which the error has occurred.

Hereinafter, description will be made with reference to FIG. 46.

Figure 46A:
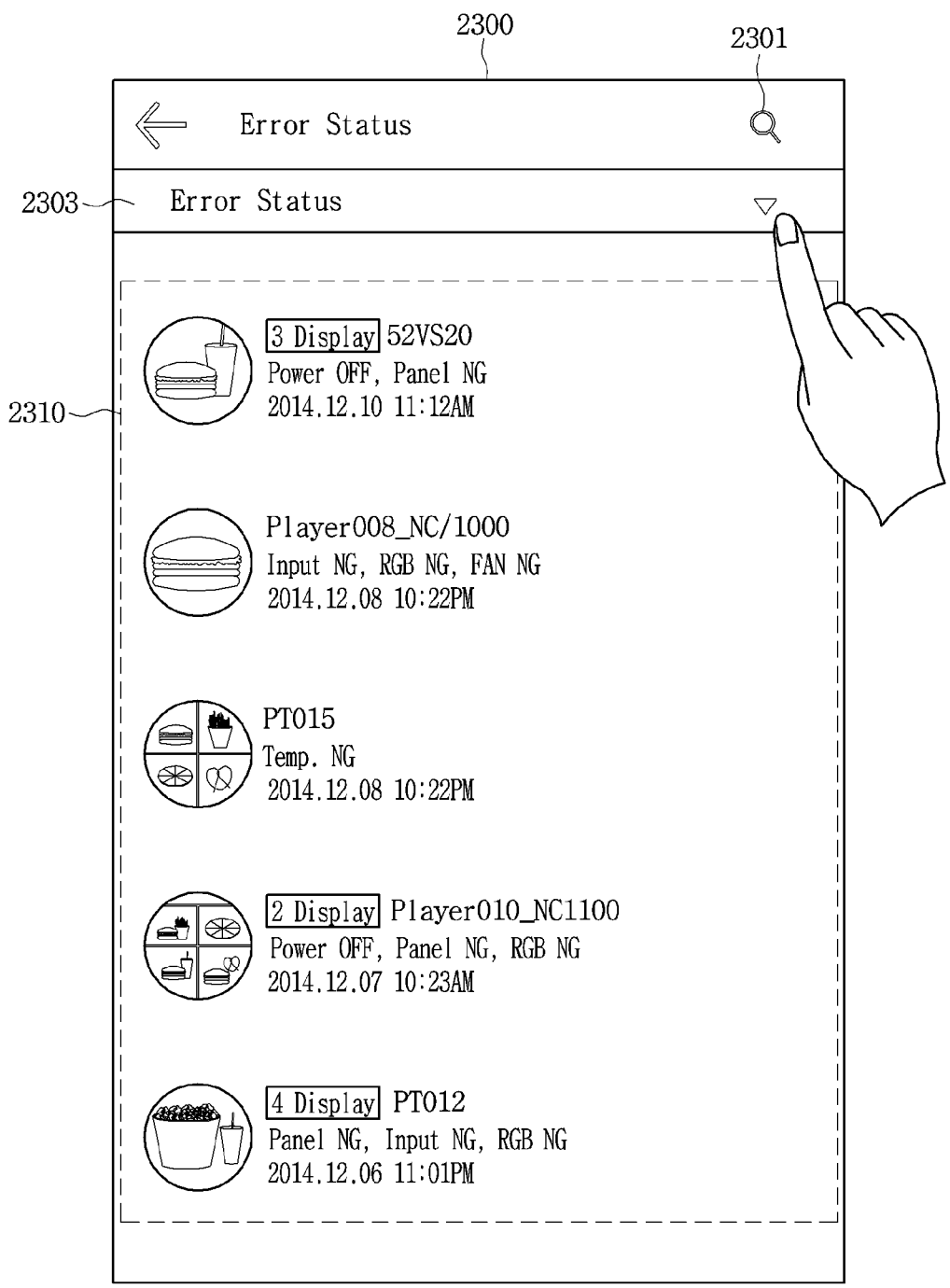
Figure 46B:
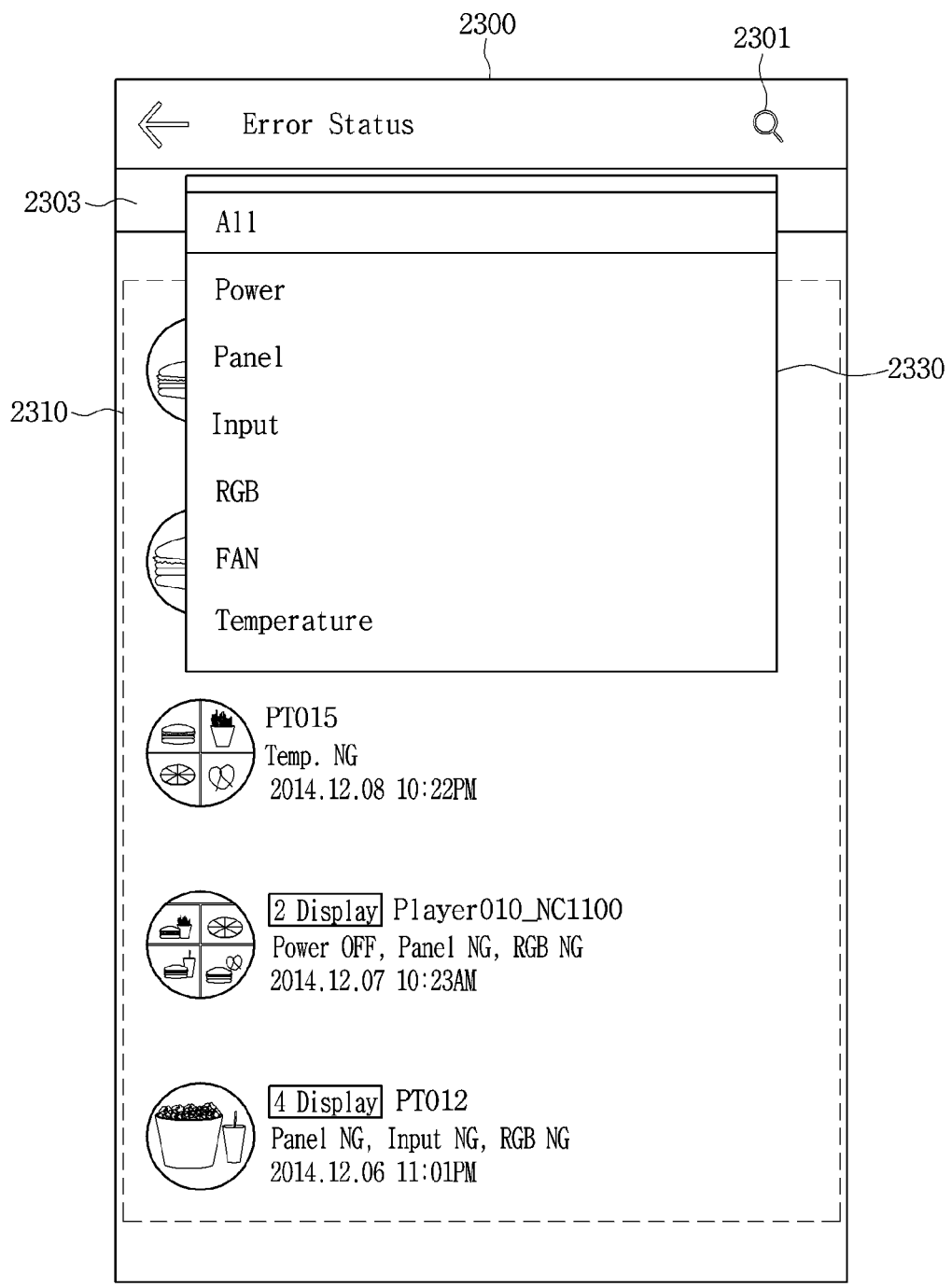

In the case that an error status sort button 2303 is selected as illustrated in FIG. 46A, the controller 180 may display an error type providing window 2330 on the error status screen 2300 as illustrated in FIG. 46B. The error type providing window 2330 may include an "All" tap for providing error status of all player items, a "Power" tap for providing player items having errors occurring in power supplies among the all player items, a "Panel" tap for providing player items having errors occurring in panels among the all player items, an "Input" tap for providing player items having errors occurring in inputs among the all player items, an "RGb" tap for providing player items having errors occurring in RGB sensors among the all player items, a "Fan" tap for providing player items having errors occurring in fans among the all player items, and a "Temperature" tap for providing player items having errors occurring in temperatures among the all player items.

The user may select any one tap from the error type providing window 2330 and may recognize only player items having specific errors.

Meanwhile, in the case that any one icon is selected from icons 671 to 676 included in the error status icon list 670 as illustrated in FIG. 45A, the controller 180 may display player items having errors corresponding to icons selected from the all player items. For example, in the case that a power icon 671 is selected, the controller 180 may display only player items having power errors among the all player items. In this case, the provided screen may be the same as that in the case that the "Power" tap is selected from the error type providing window 2330 as illustrated in FIG. 46B.

As the user selects a specific icon provided in the error status icon list 670, the user may easily recognize only player items having relevant errors.

The present disclosure described above can be implemented in the form of a computer-readable code in a media having a program. A computer-readable recording medium may be any recording device storing data that can be read by computer systems. For example, the computer-readable recording medium may be a hard disk drive (Hdd), a solid status disk (SSd), a silicon disk drive (Sdd), a read-only memory (ROM), a random-access memory (RaM), a compact disk read-only memory (cd-ROM), a magnetic tape, a floppy disk, an optical data storage device, and the like. Also, the recording medium may be implemented in the form of carrier waves, (e.g., transmission over the Internet). In addition, the computer may include the controller 180 of the terminal. Accordingly, the detailed description should not be limitedly interpreted, but be considered only for the illustrative purpose. The scope of the present disclosure should be determined by reasonable interpretation. It is intended that the present disclosure covers all such modifications provided they come within the scope of the appended claims and their equivalents.

The invention claimed is:

1. An operating method of a mobile terminal, the operating method comprising:
   executing a signage application for providing a digital signage service;
   accessing a server as the signage application is executed;
   receiving information on the digital signage service from the accessed server; and
   displaying a main screen for managing a digital signage device based on the received information,
   wherein the main screen includes information on error statuses of one or more digital signage devices managed by the server and a menu icon list including a content menu for providing an approval status of a content item, a schedule menu icon for providing an approval status of a schedule item, a player menu icon for providing an approval status of the a player item, a distribution menu icon for providing an approval status of a distribution item, and a user menu icon providing an approval status of a user item,
   wherein the operating method further comprises:
      displaying a player item detail information screen for providing information on a selected player item in response to a selection of the player item, wherein the player item detail information screen includes an image display area including a content image of media content which is being reproduced by a digital signage device corresponding to the selected player item,
      displaying a distribution approval status screen including a distribution item list in response to a selection of the distribution menu icon, wherein the distribution item list includes information on a name of the distribution item, a scheduled time to play an object to be distributed to the digital signage device included in the distribution item, an approval status of the distribution item, and a distribution status of the distribution, and
      generating a new distribution item in response to a selection of a distribution item addition icon, wherein the new distribution item is generated by:
         displaying a distribution creation screen for selecting a type of the object to be distributed that is associated with the new distribution item, wherein the type of the object to be distributed that includes at least a content distribution item, a schedule distribution item, a regular-shaped video wall distribution item or an irregular-shaped video wall distribution item, wherein the regular-shaped video wall distribution item corresponds to a first layout screen having a set number of columns and rows, wherein the irregular shaped video wall distribution item corresponds to a second layout screen other than the regular-shaped wall,
         displaying a respective distribution target object setting screen for setting the object to be distributed in response to selecting the type of the object to be distributed on the distribution creation screen, wherein each respective distribution target object setting screen is associated with a corresponding type of the object to be distributed,
         displaying a player item selection screen for selecting a player item to which the set object to be distributed is capable of being distributed to in response to setting the object to be distributed on the respective distribution target object setting screen, and
         distributing the set object to be distributed to the selected player item in response to selecting the player item on the player item selection screen.

2. The operating method of claim 1, wherein the displaying of the main screen includes displaying the menu icons, which are included in the menu icon list, while distinguishing between the menu icons according to an authority of a user which is logged into the signage application.

3. The operating method of claim 2, wherein the authority of the user includes any one of a content item management authority that is able to determine the approval status of the content item, a schedule item management authority that is able to determine the approval status of the schedule item, a player item management authority that is able to determine the approval status of the player item, a distribution item management authority that is able to determine the approval status of the distribution item, and an item management authority that is able to determine the approval status of the content item, the schedule item, the player item, and the distribution item.

4. The operating method of claim 1, wherein the content image of the media content is either a captured image of the media content or a real-time image of the media content.

5. The operating method of claim 1, wherein the main screen includes an error status icon list for providing information on digital signage devices having an error according to a type of the error, and
   wherein the type of the error is any one of a power status error, a panel error, an input error, an RGb sensor error, a fan error, and a temperature error of the digital signage device.

6. A mobile terminal comprising:
   a touch screen; and
   a hardware controller configured to:
   execute a signage application for providing a digital signage service,
   access a server as the signage application is executed, receives information on the digital signage service from the accessed server, and
   display a main screen for managing a digital signage device based on the received information,
   wherein the main screen includes information on error statuses of one or more digital signage devices managed by the server and a menu icon list including a content menu icon for providing an approval status of a content item, a schedule menu icon for providing an approval status of a schedule item, a player menu icon for providing an approval status of a player item, a distribution menu icon for providing an approval status of a distribution item, and a user menu icon providing an approval status of a user item, wherein the controller is further configured to control the touch screen to:

display a player item detail information screen for providing information on a selected player item in response to a selection of the player item, wherein the player item detail information screen includes an image display area including a content image of media content which is being reproduced by a digital signage device corresponding to the selected player item, display a distribution approval status screen including a distribution item list in response to a selection of the distribution menu icon, wherein the distribution item list includes information on a name of the distribution item, a scheduled time to play an object to be distributed to the digital signage device included in the distribution item, an approval status of the distribution item, and a distribution status of the distribution, and generate a new distribution item in response to a selection of a distribution item addition icon, wherein the new distribution item is generated by:

displaying a distribution creation screen for selecting a type of the object to be distributed that is associated with the new distribution item, wherein the type of the object to be distributed includes at least a content distribution item, a schedule distribution item, a regular-shaped video wall distribution item or an irregular-shaped video wall distribution item, wherein the regular-shaped video wall distribution item corresponds to a first layout screen having a set number of columns and rows, wherein the irregular shaped video wall distribution item corresponds to a second layout screen other than the regular-shaped wall, displaying a respective distribution target object setting screen for setting the object to be distributed in response to selecting the type of the object to be distributed on the distribution creation screen, wherein each respective distribution target object setting screen is associated with a corresponding type of the object to be distributed, displaying a player item selection screen for selecting a player item to which the set object to be distributed is capable of being distributed to in response to setting the object to be distributed on the respective distribution target object setting screen, and distributing the set object to be distributed to the selected player item in response to selecting the player item on the player item selection screen.

7. The mobile terminal of claim 6,
wherein the controller controls the touch screen to display the menu icons, which are included in the menu icon list, while distinguishing between the menu icons according to an authority of a user which is logged into the signage application.

8. The mobile terminal of claim 7, wherein the authority of the user includes any one of a content item management authority that is able to determine the approval status of the content item, a schedule item management authority that is able to determine the approval status of the schedule item, a player item management authority that is able to determine the approval status of the player item, a distribution item management authority that is able to determine the approval status of the distribution item, and an item management authority that is able to determine the approval status of the content item, the schedule item, the player item, and the distribution item.

9. The mobile terminal of claim 6, wherein the content image of the media content is either a captured image of the media content or a real-time image of the media content.

10. The mobile of claim 6, wherein the main screen includes an error status icon list for providing information on digital signage devices having an error according to a type of the error, and wherein the type of the error is any one of a power status error, a panel error, an input error, an RGb sensor error, a fan error, and a temperature error of the digital signage device.

11. The mobile terminal of claim 6, wherein the controller receives an approval allowance input for allowing an approval of any one of a plurality of items and transmits, the server, an approval completion request to reproduce media content corresponding to the item approved by the digital signage device according to the received approval allowance input.

* * * * *